June 22, 1954
G. W. HOPKINS ET AL
2,681,767
CALCULATING MACHINE
Filed Oct. 12, 1950
30 Sheets-Sheet 4
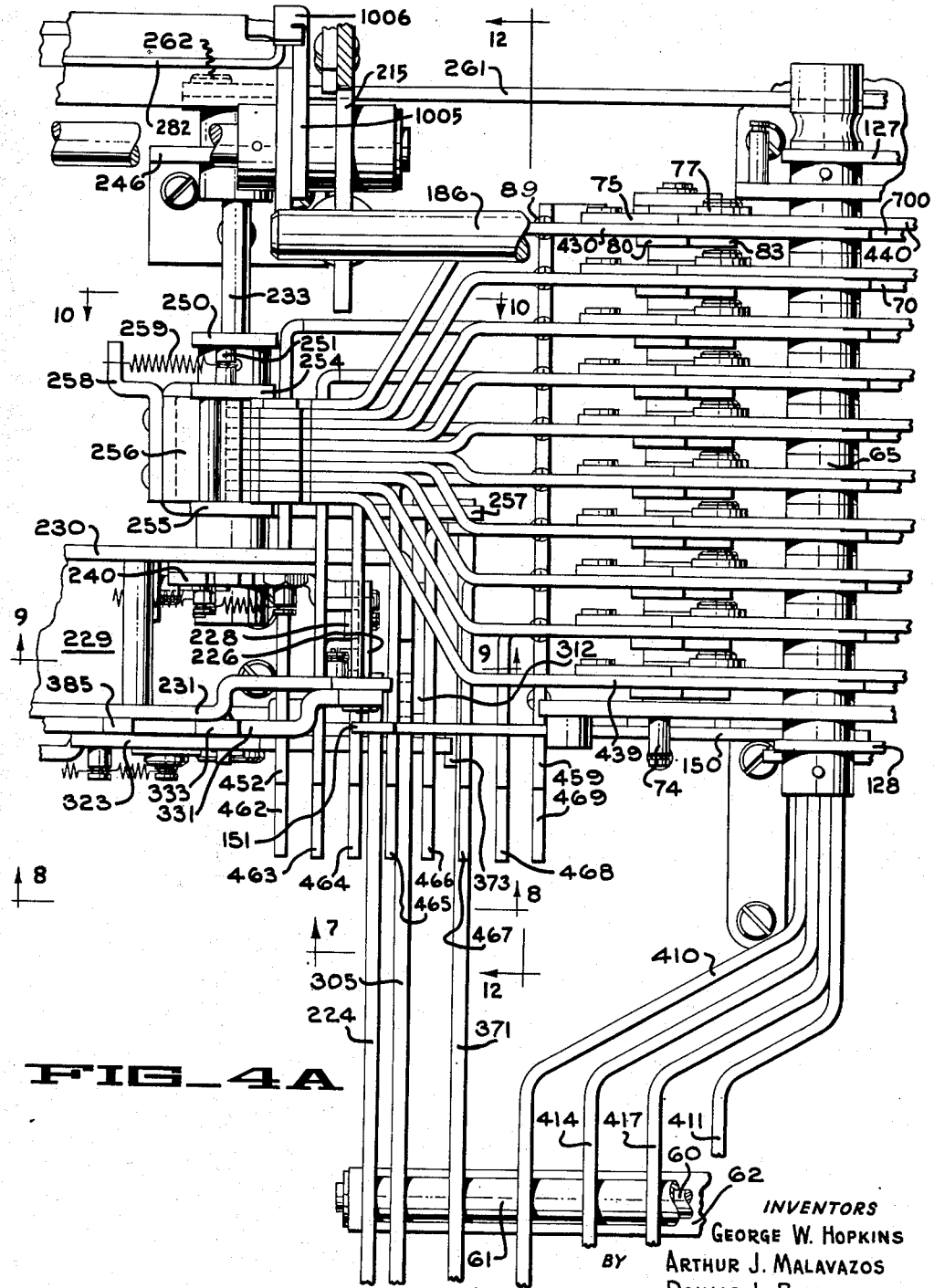
FIG_4A
INVENTORS
GEORGE W. HOPKINS
ARTHUR J. MALAVAZOS
DONALD L. ROLPH
BY

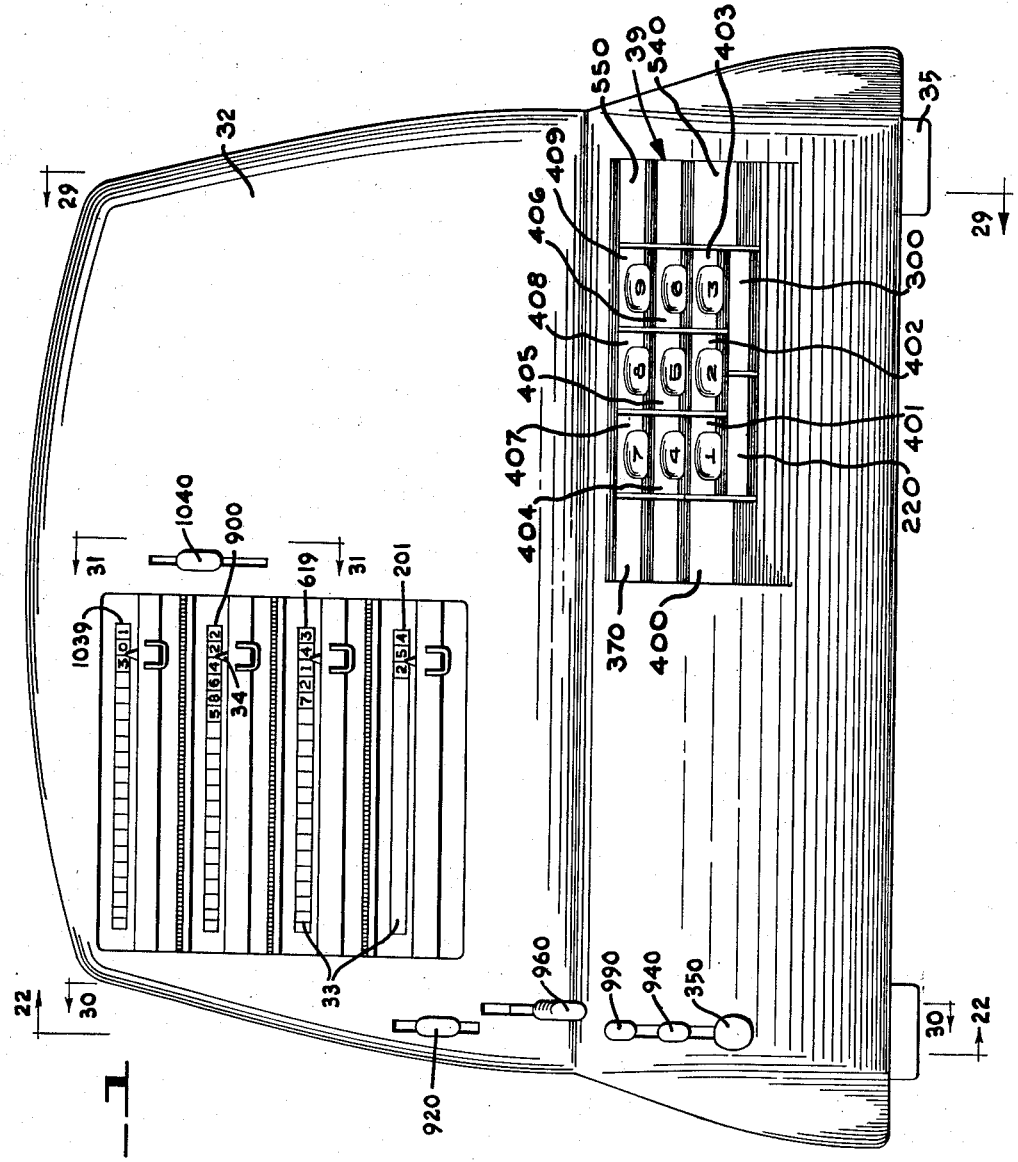

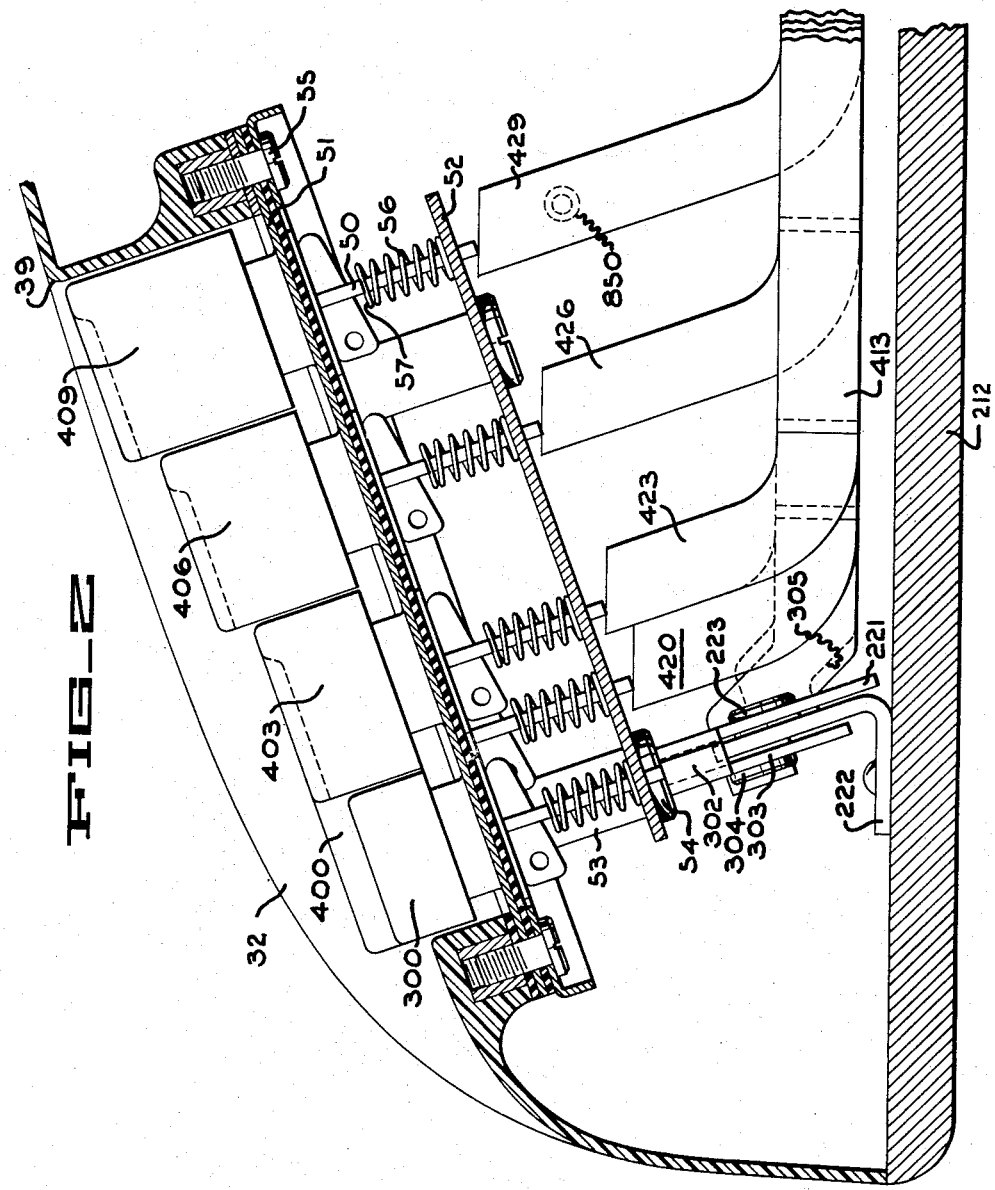

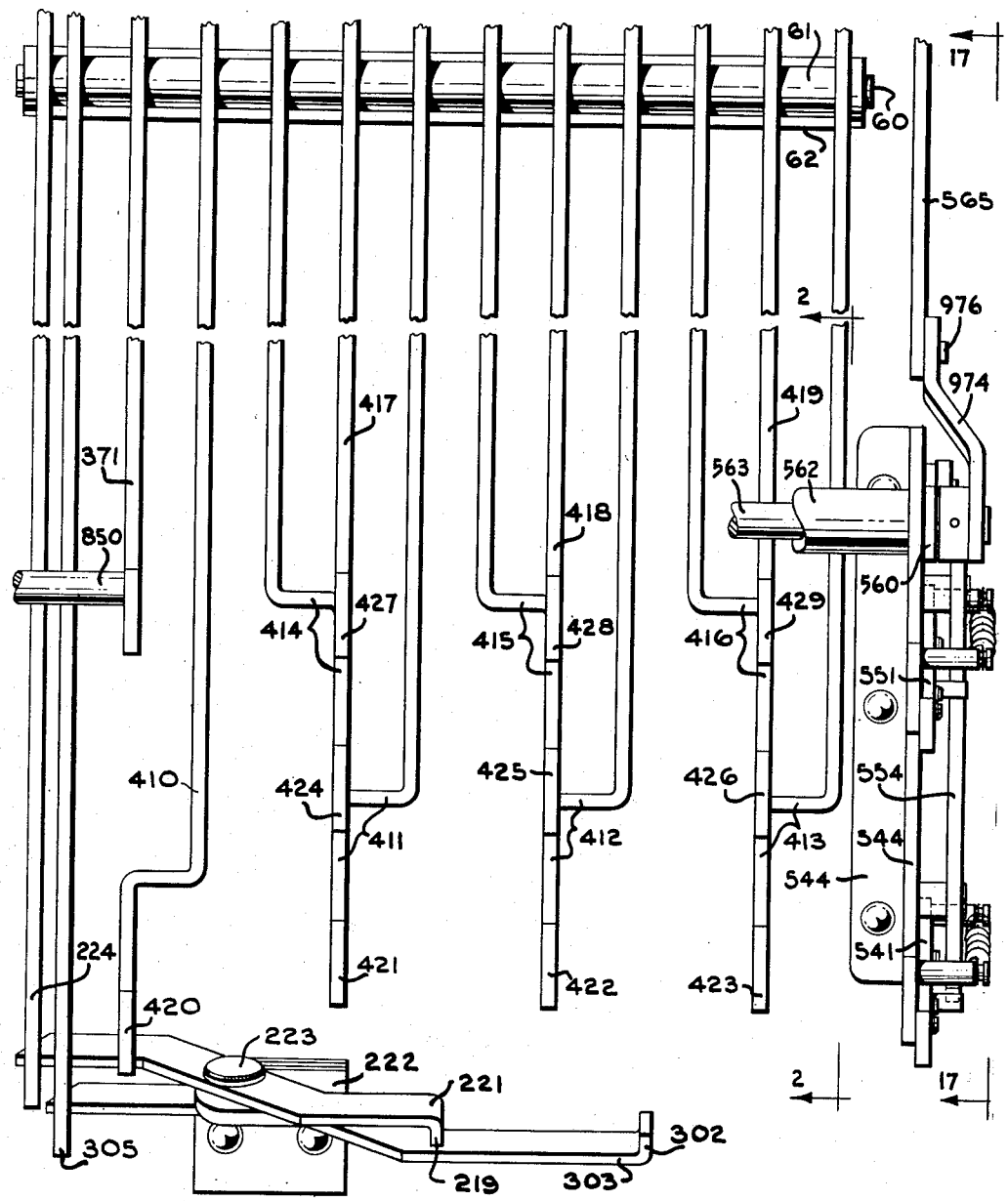

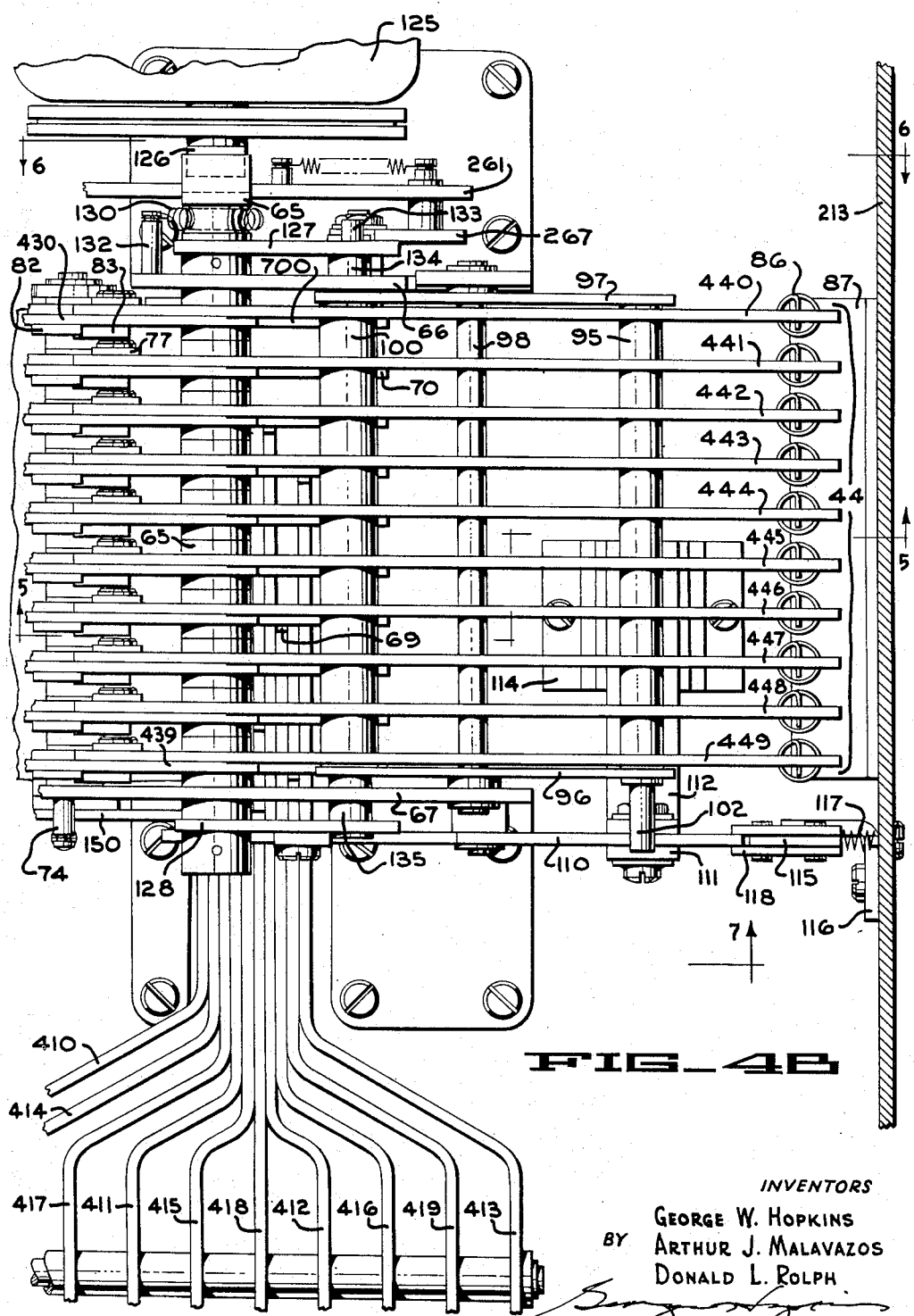

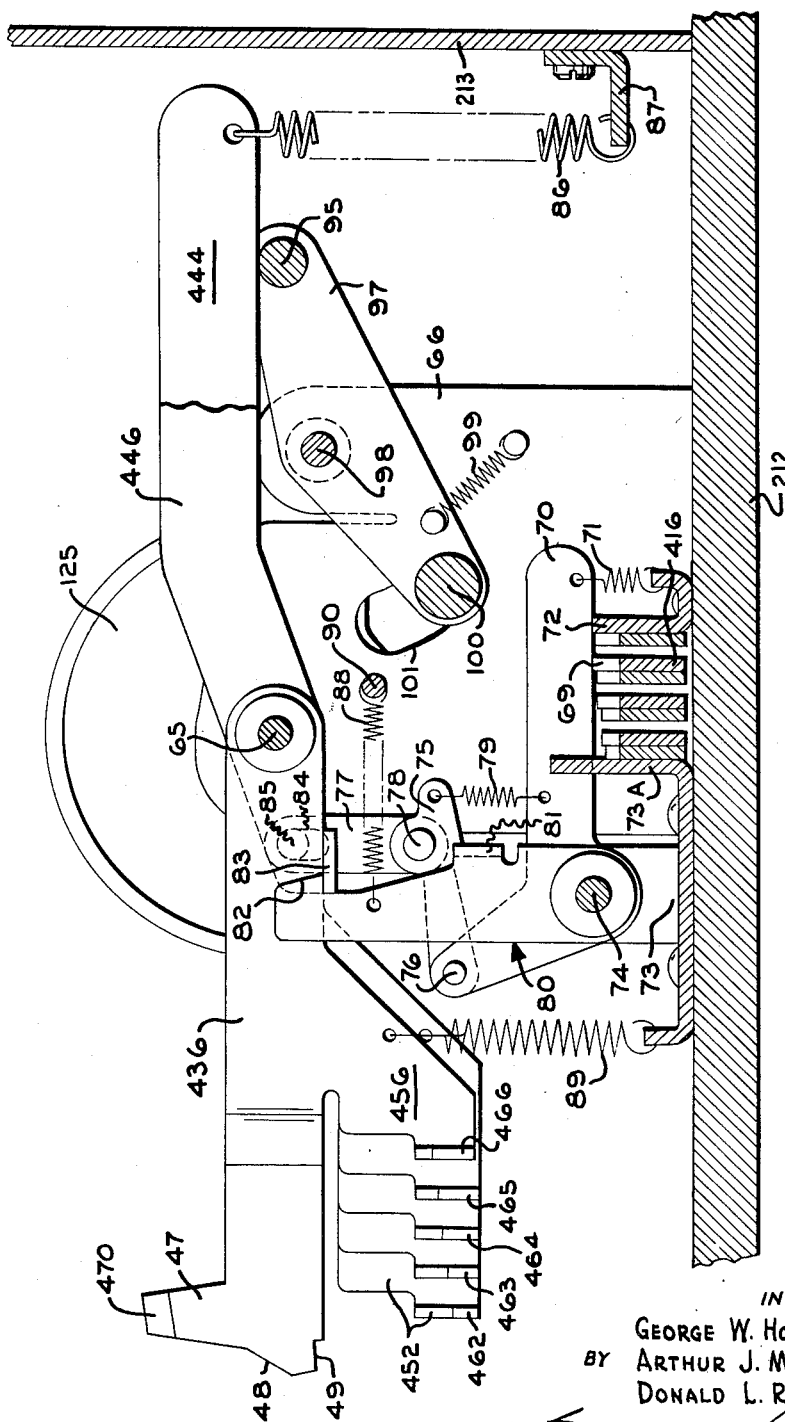

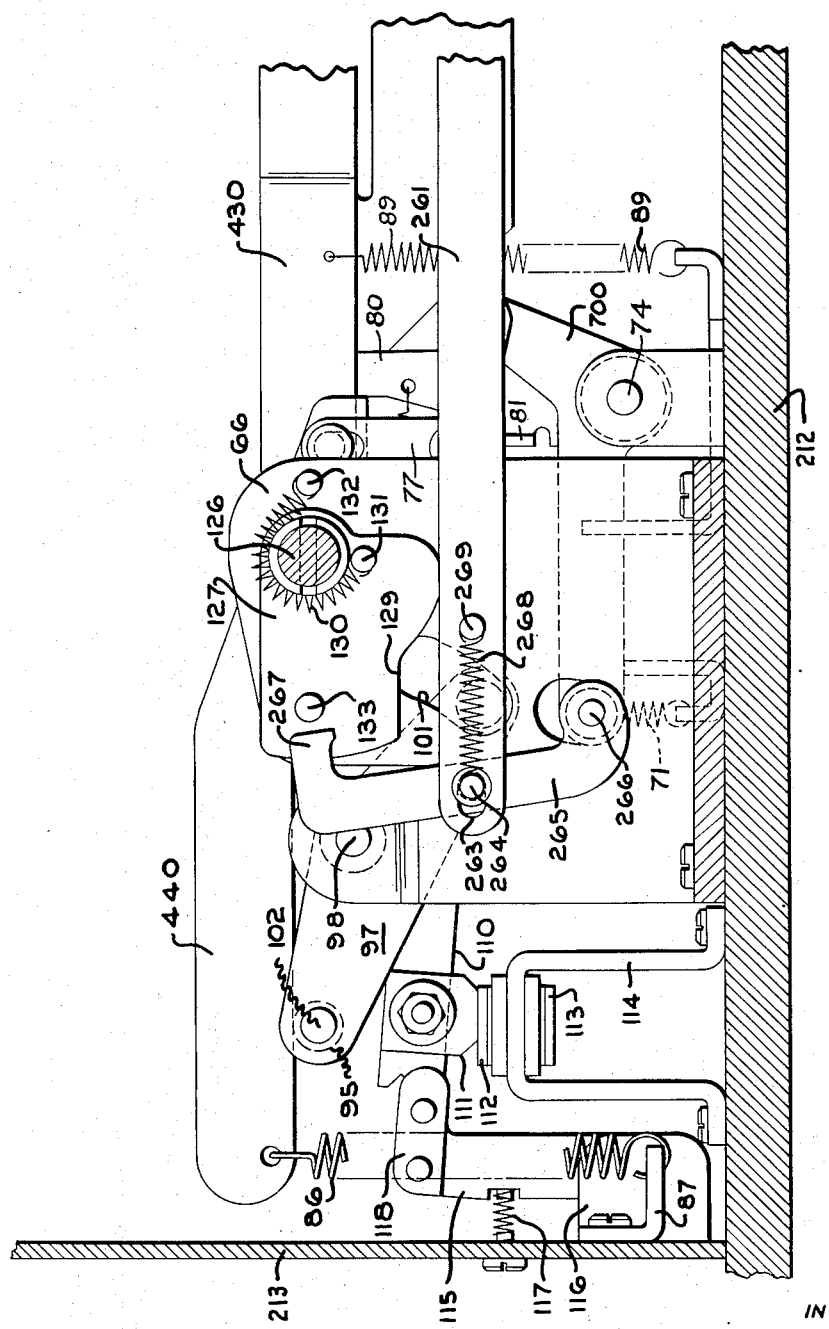

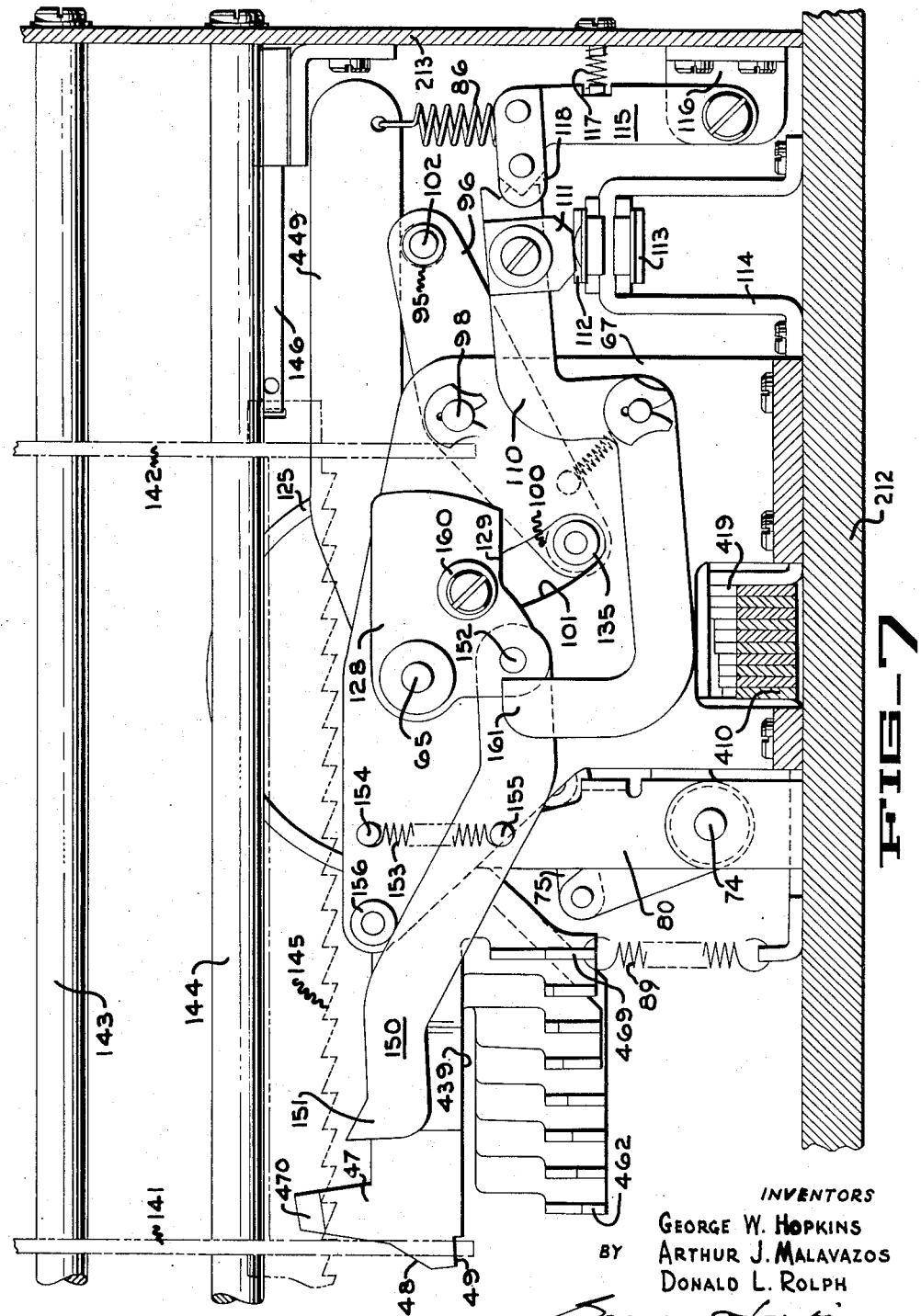

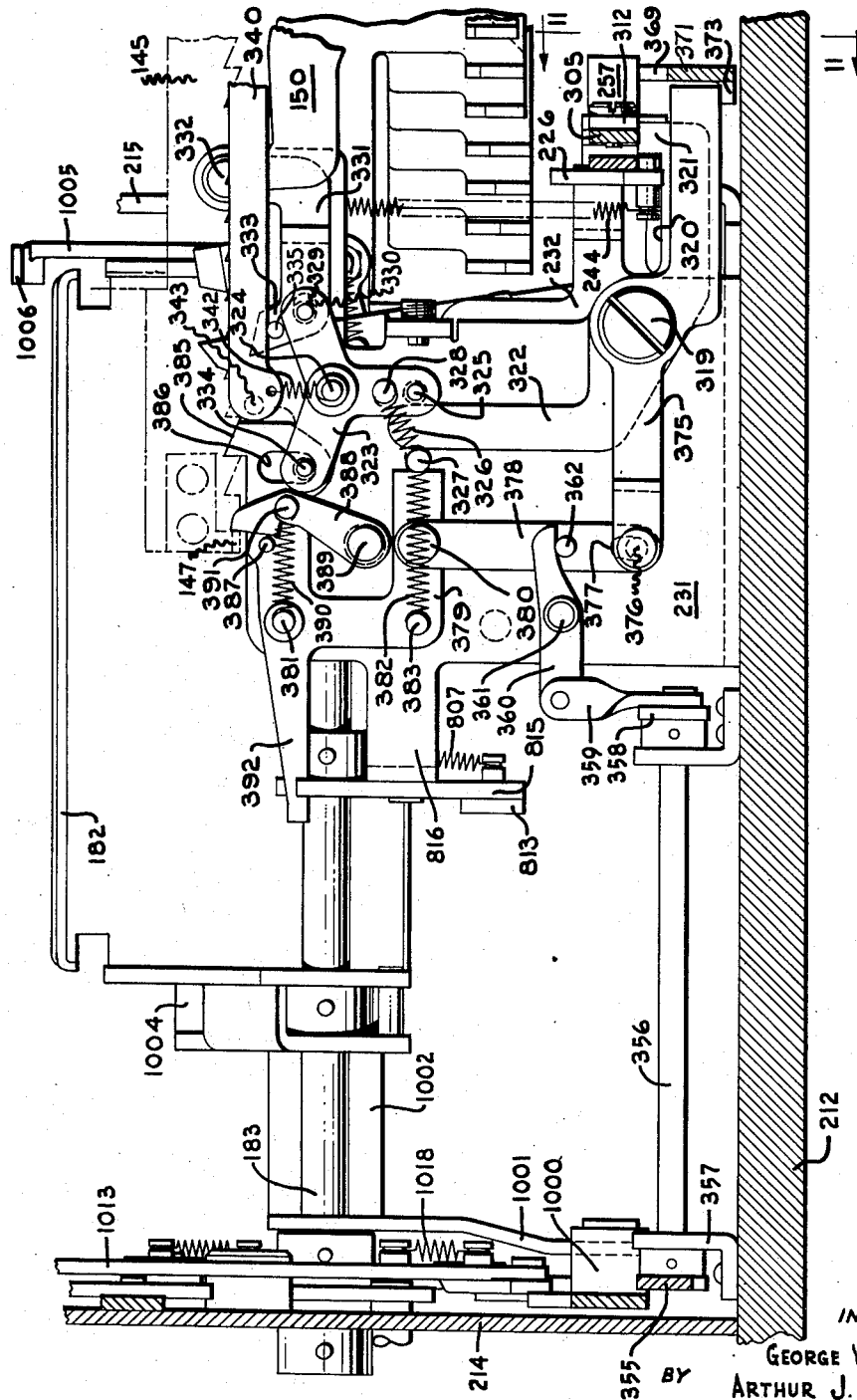

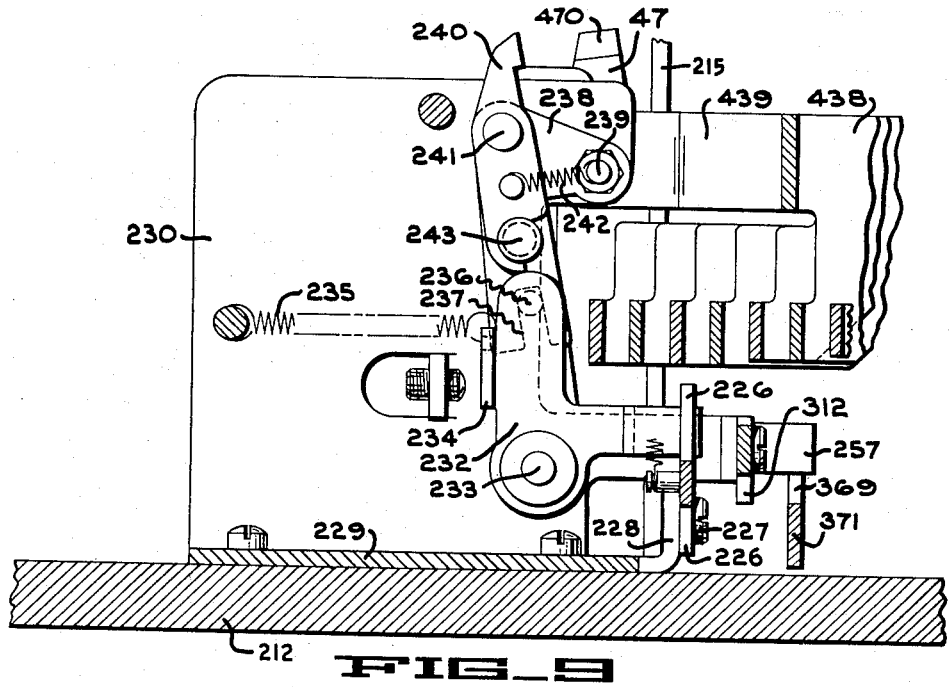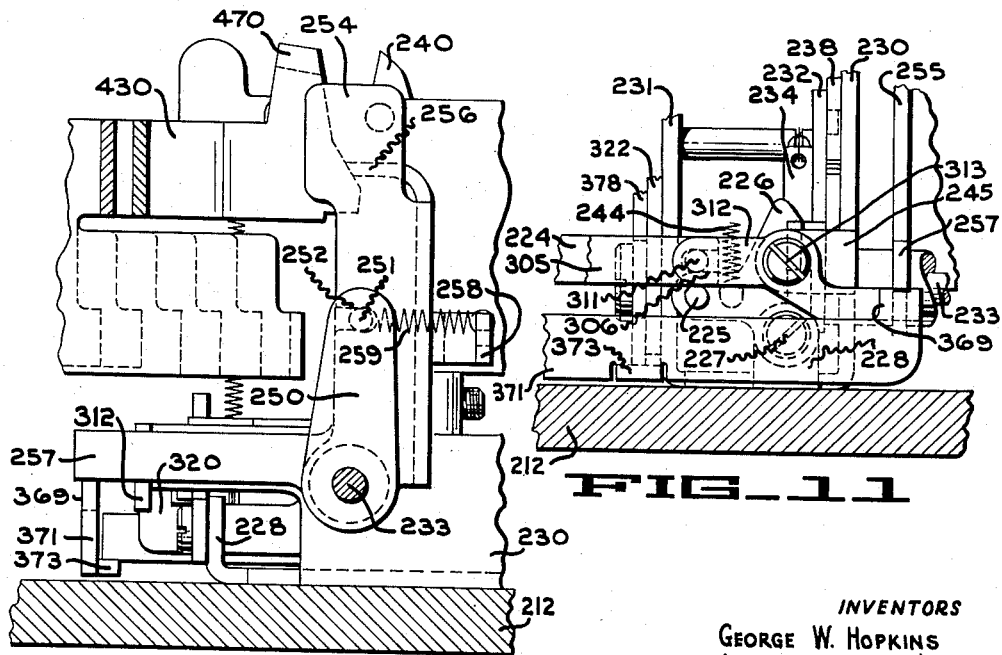

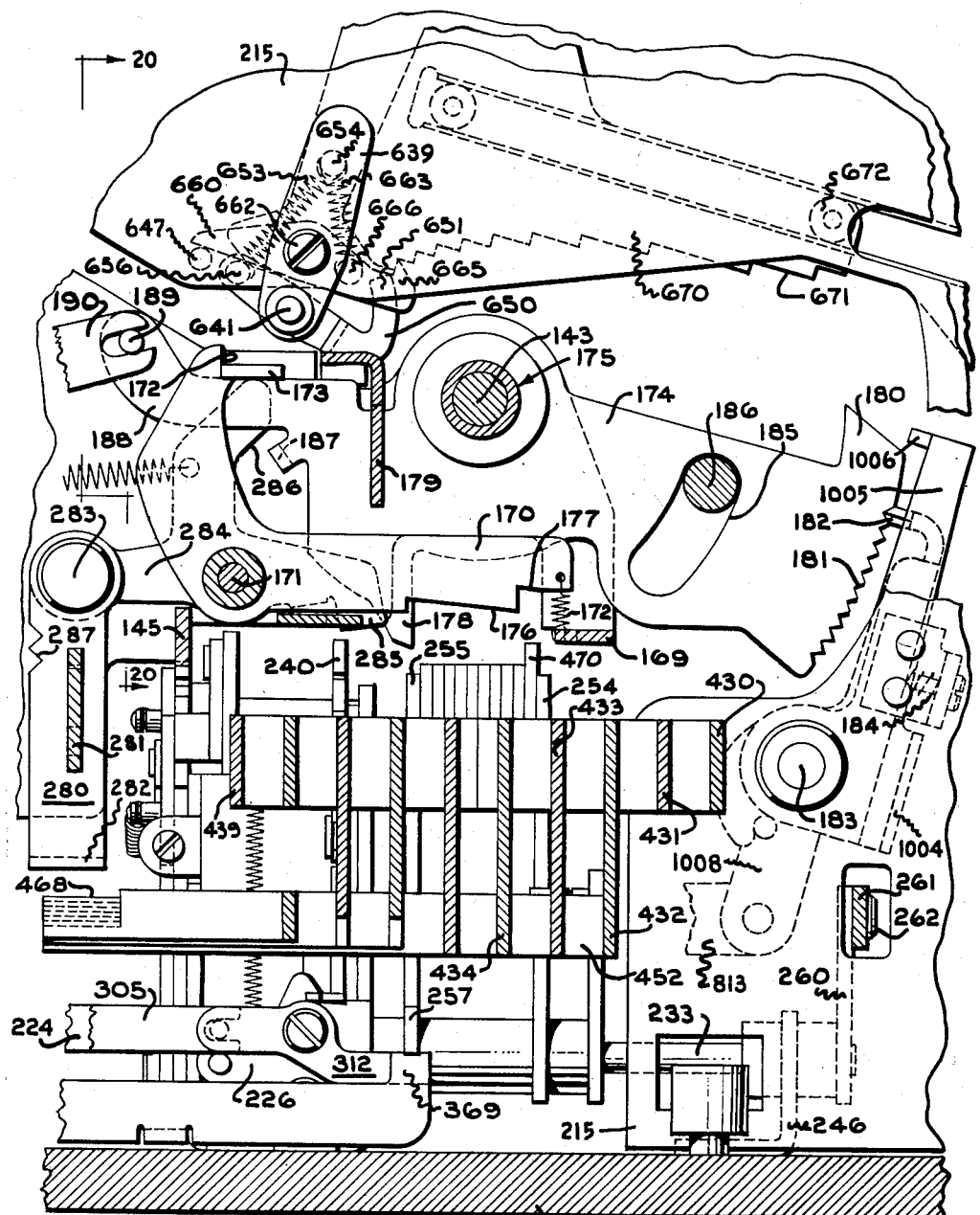

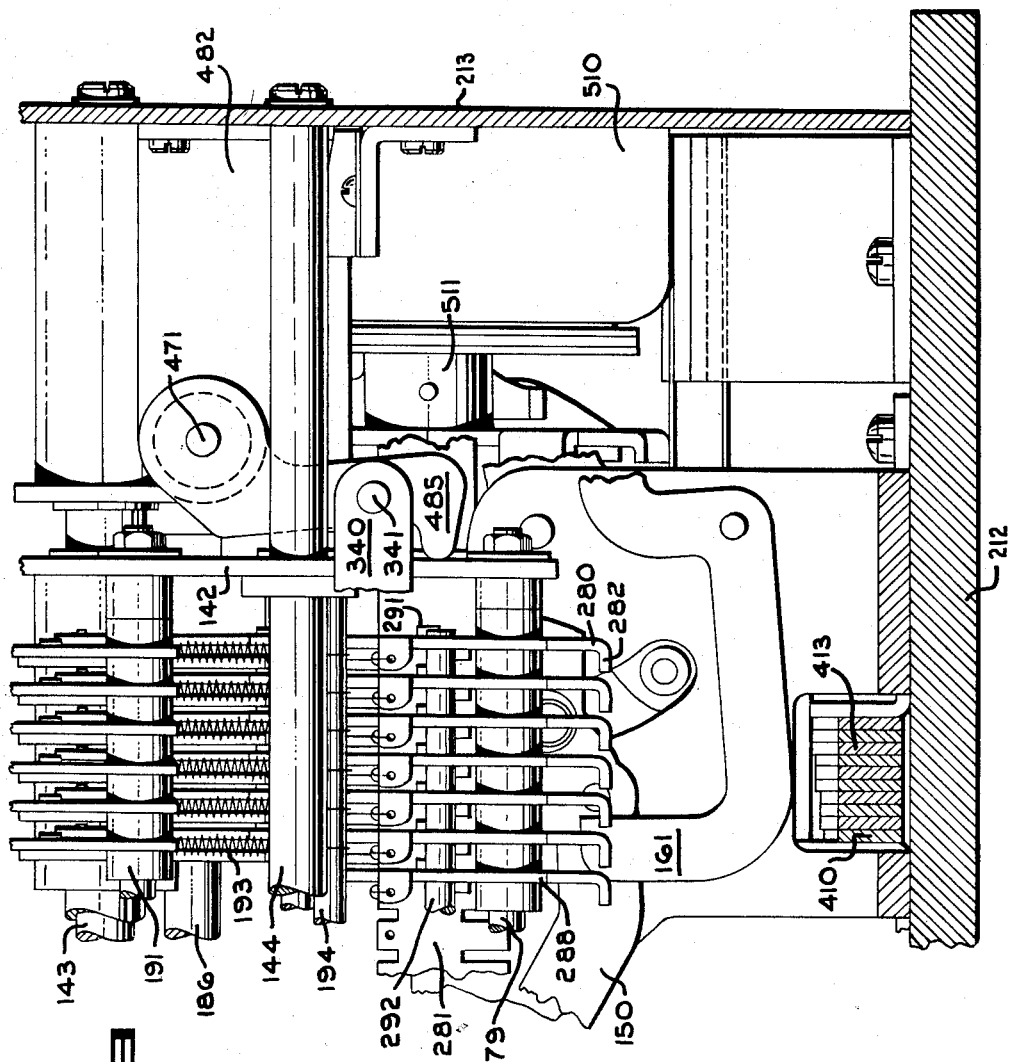

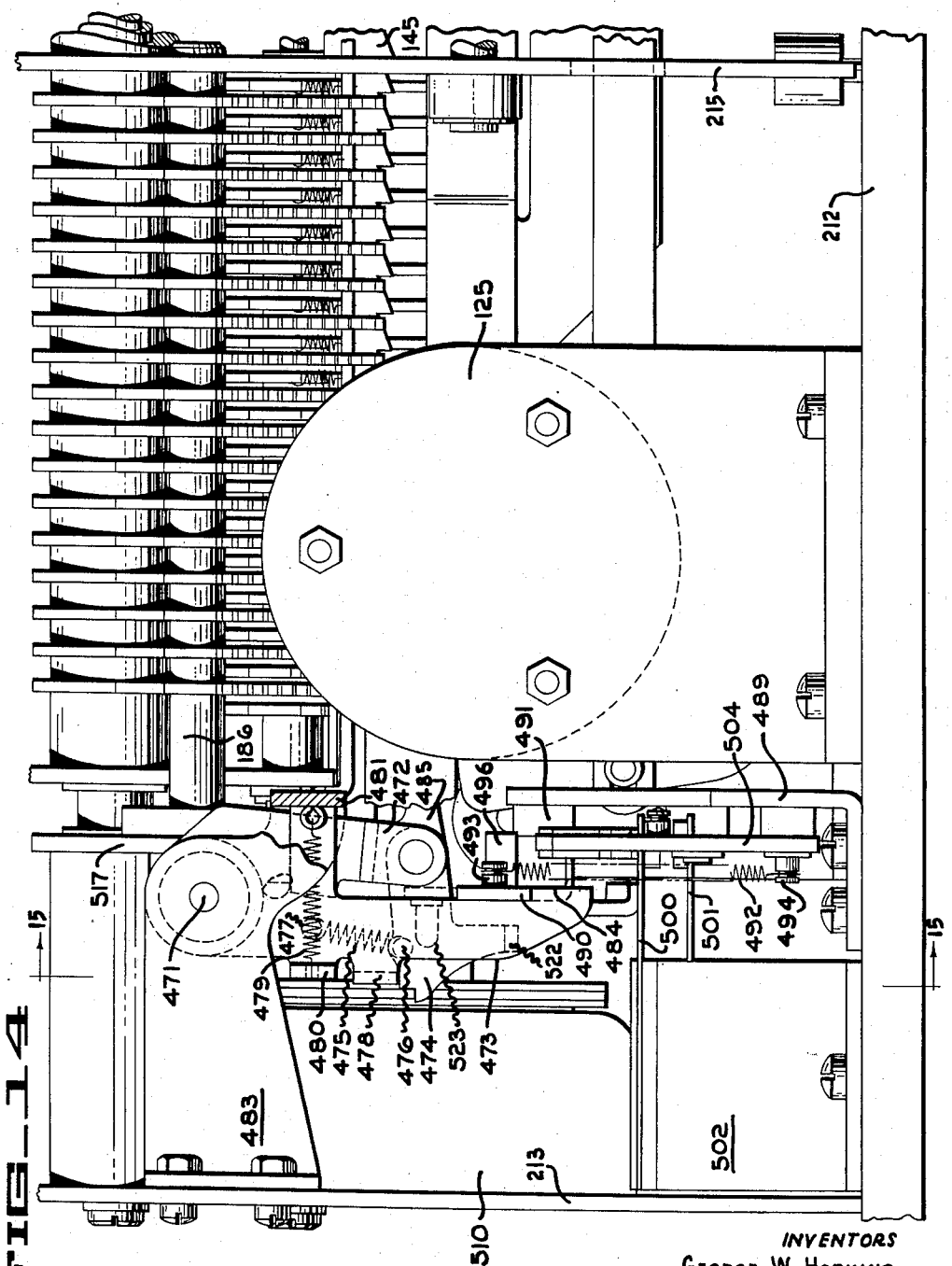

June 22, 1954
G. W. HOPKINS ET AL
2,681,767
CALCULATING MACHINE
Filed Oct. 12, 1950
30 Sheets-Sheet 14
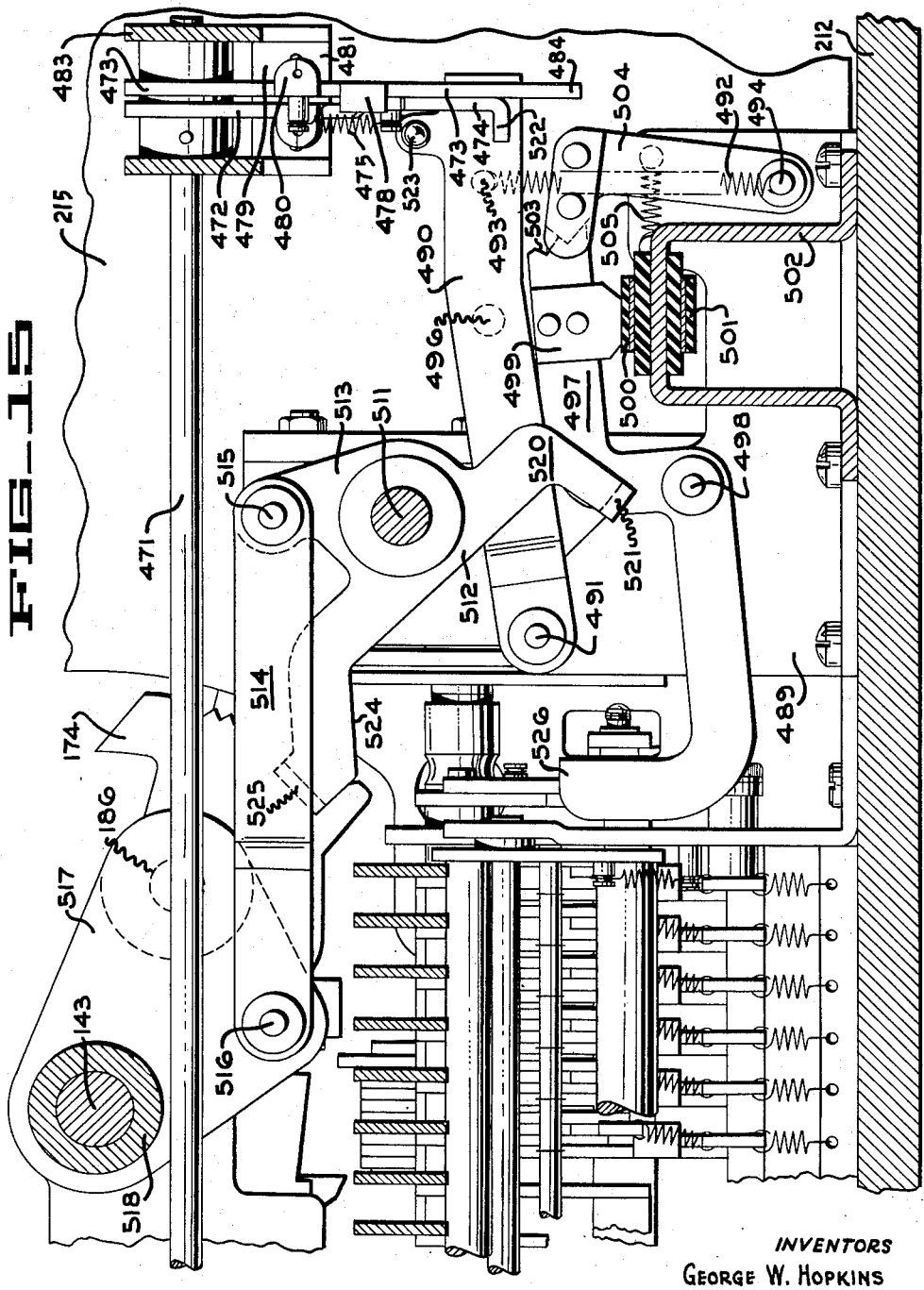
INVENTORS
GEORGE W. HOPKINS
BY ARTHUR J. MALAVAZOS
DONALD L. ROLPH

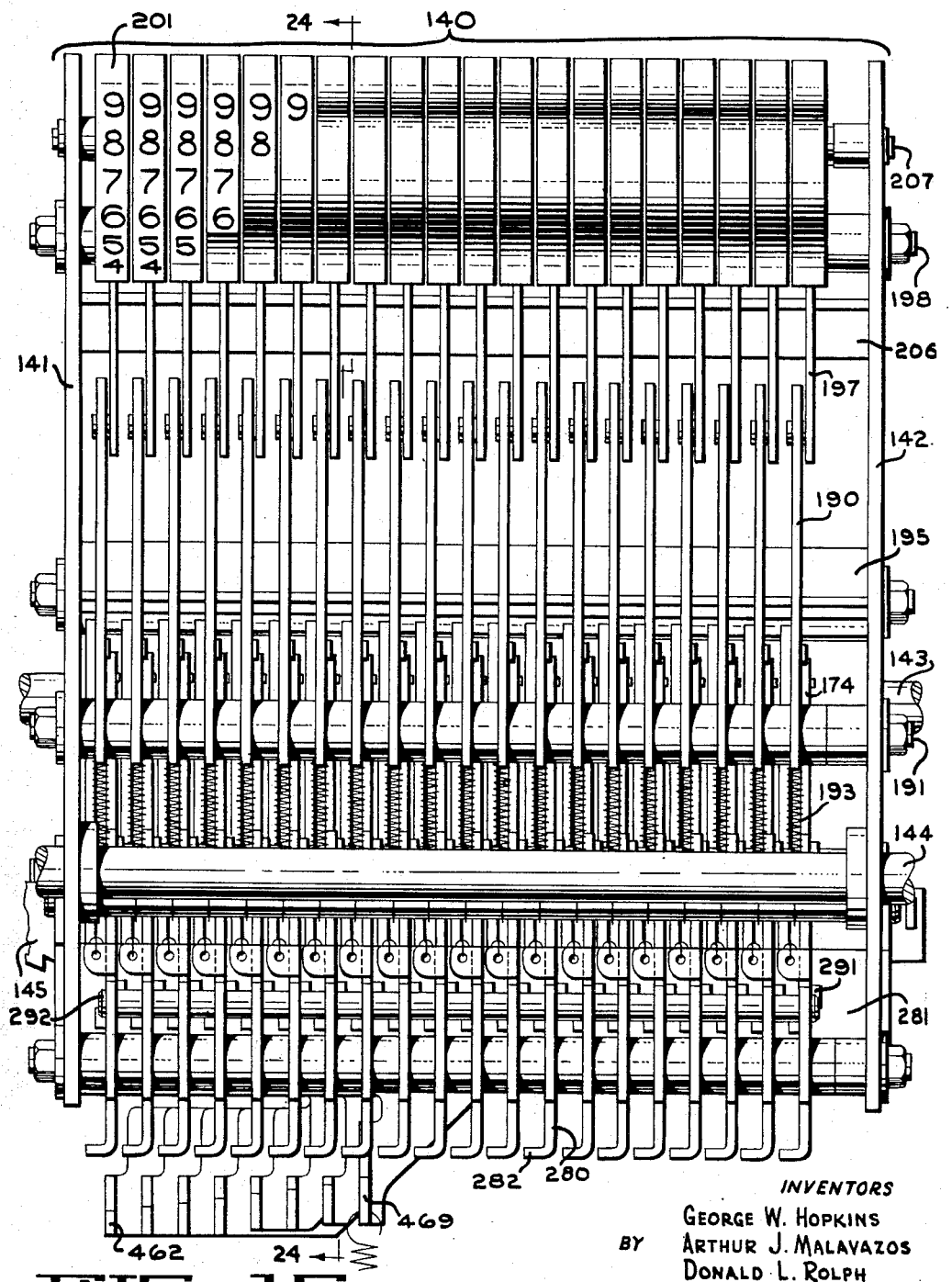

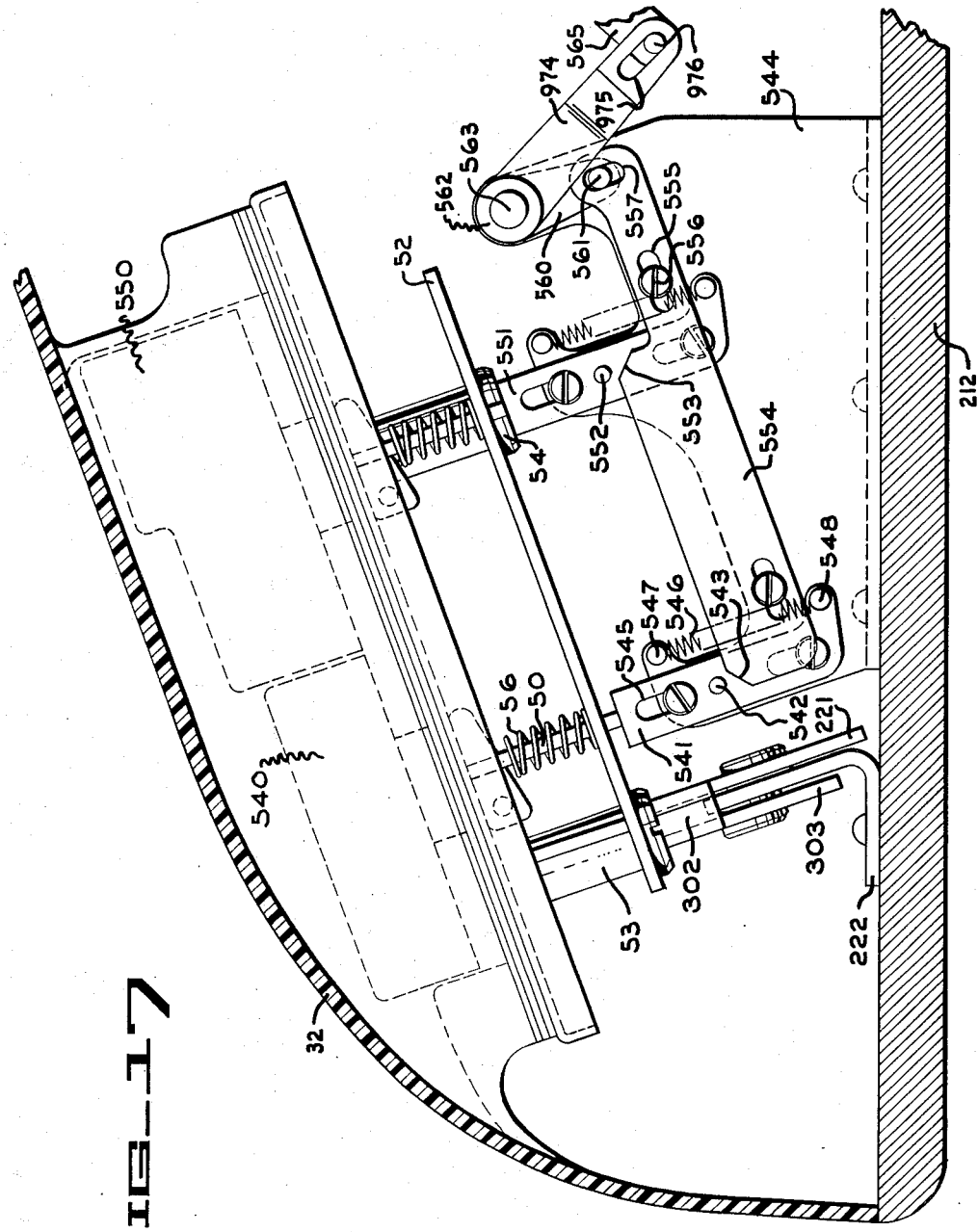

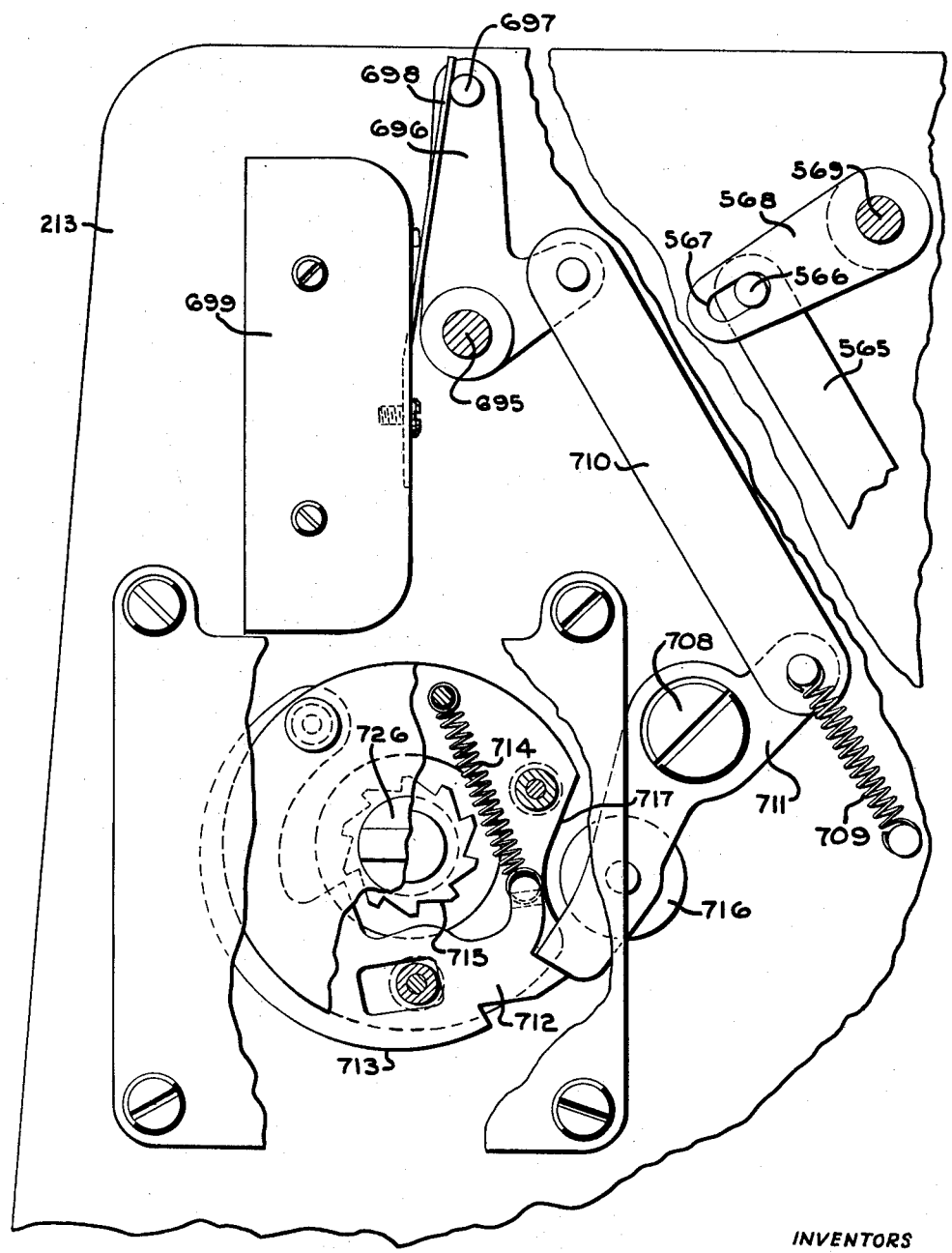

June 22, 1954   G. W. HOPKINS ET AL   2,681,767
CALCULATING MACHINE
Filed Oct. 12, 1950   30 Sheets-Sheet 18

INVENTORS
GEORGE W. HOPKINS
BY ARTHUR J. MALAVAZOS
DONALD L. ROLPH

INVENTORS.
GEORGE W. HOPKINS
ARTHUR J. MALAVAZOS
DONALD L. ROLPH
BY

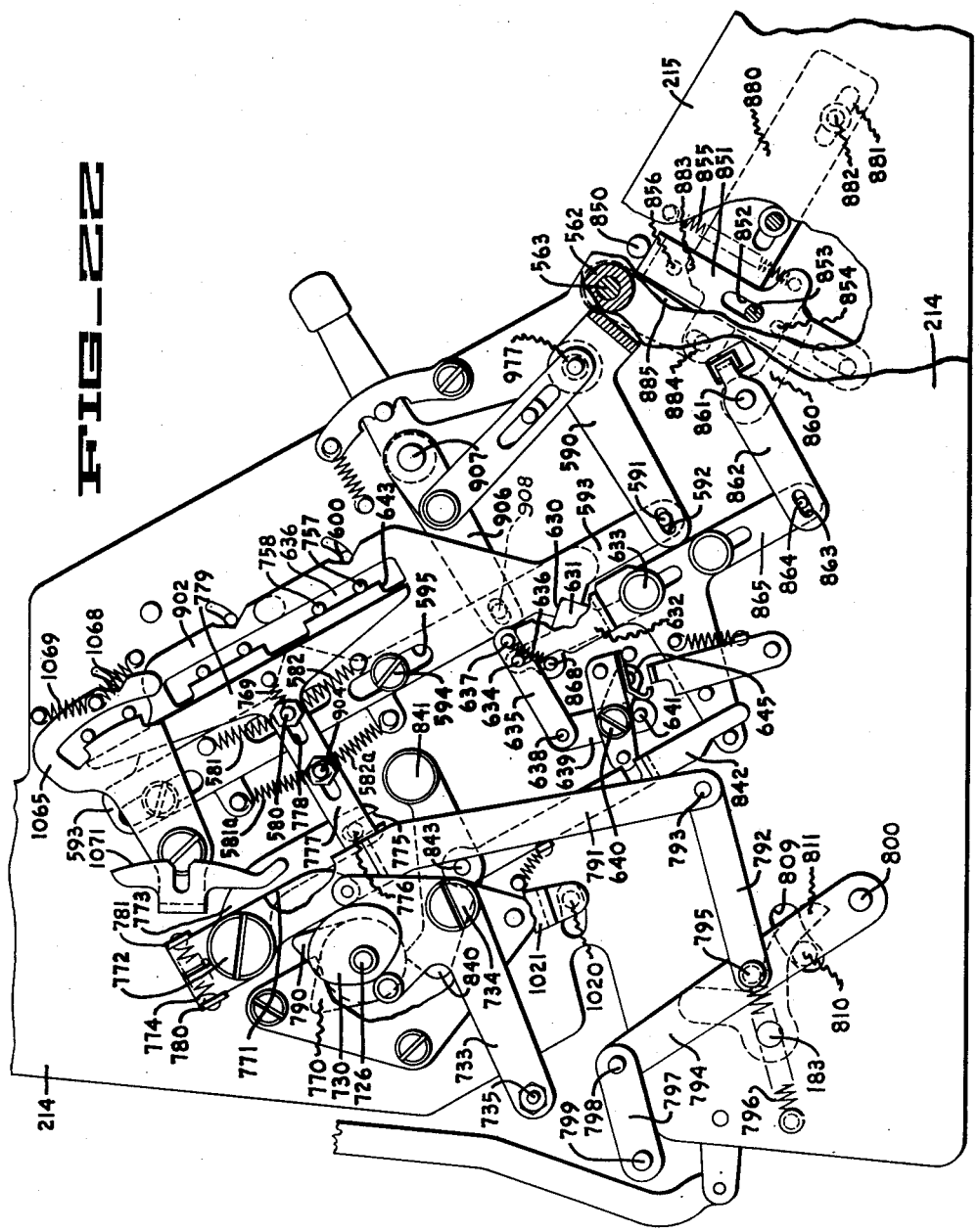

June 22, 1954
G. W. HOPKINS ET AL
2,681,767
CALCULATING MACHINE
Filed Oct. 12, 1950
30 Sheets-Sheet 21
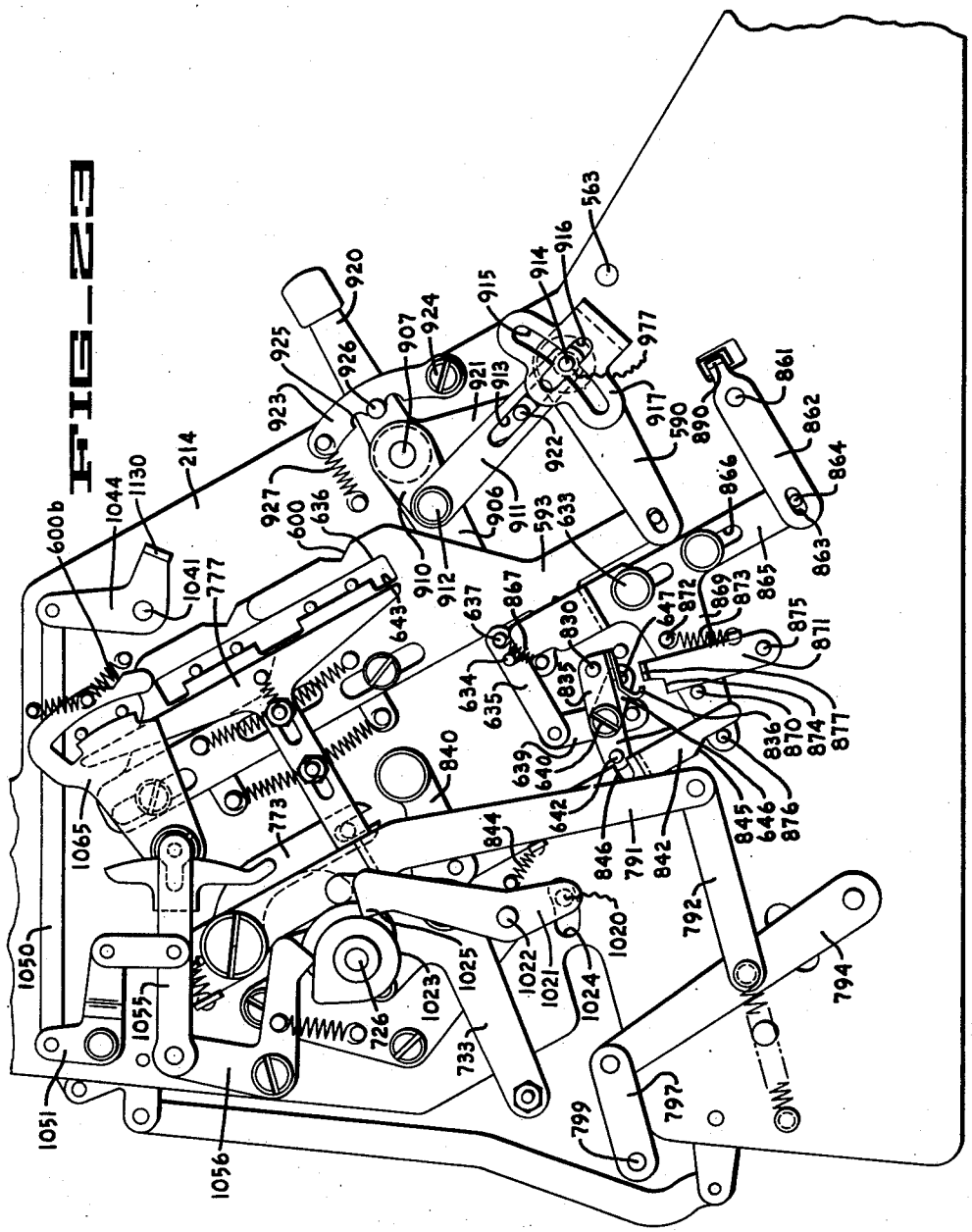
INVENTORS
GEORGE W. HOPKINS
BY ARTHUR J. MALAVAZOS
DONALD L. ROLPH June 22, 1954
G. W. HOPKINS ET AL
2,681,767
CALCULATING MACHINE
Filed Oct. 12, 1950
30 Sheets-Sheet 22
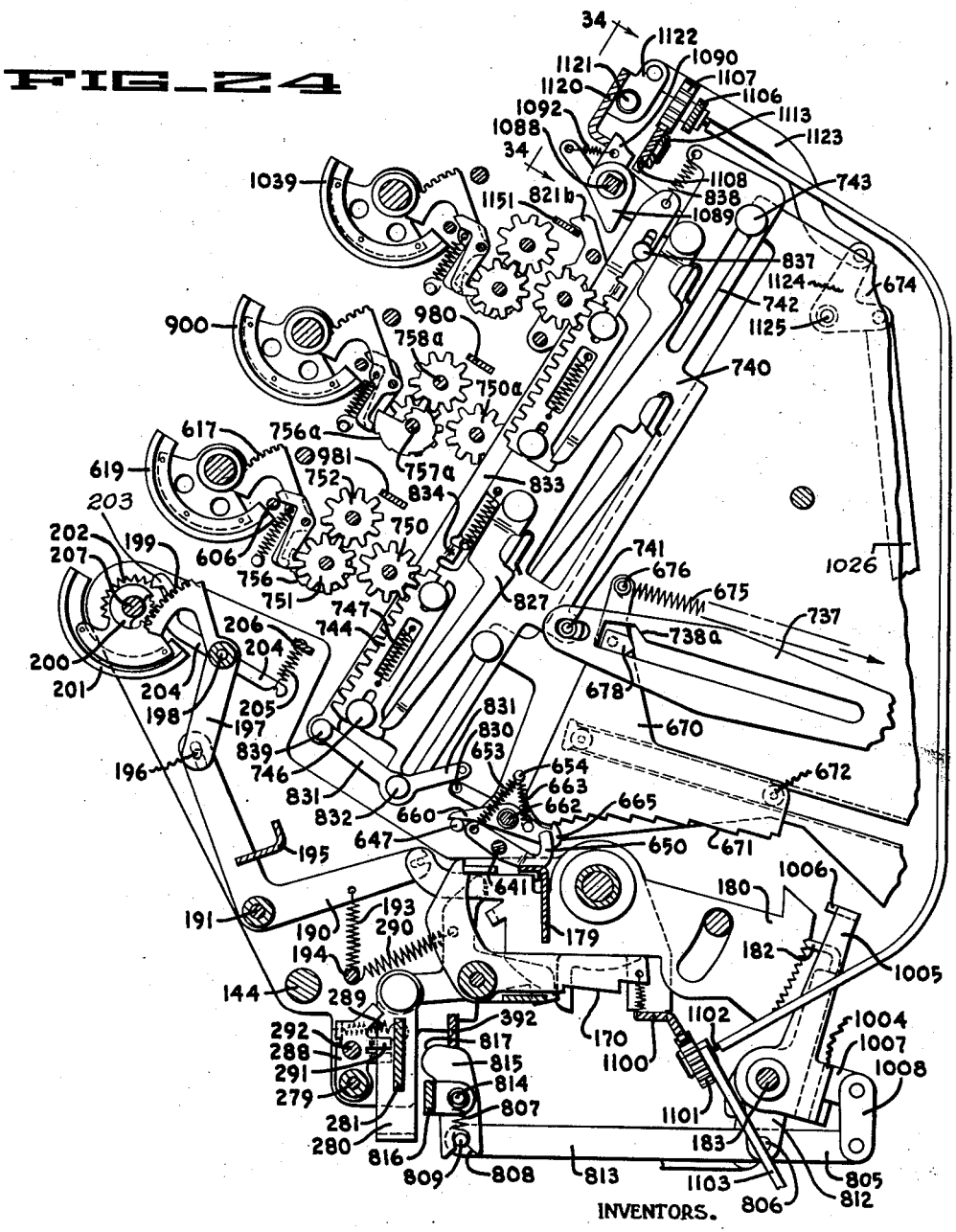
FIG_24
INVENTORS.
GEORGE W. HOPKINS
ARTHUR J. MALAVAZOS
BY  DONALD L. ROLPH June 22, 1954
G. W. HOPKINS ET AL
CALCULATING MACHINE
2,681,767
Filed Oct. 12, 1950
30 Sheets-Sheet 23
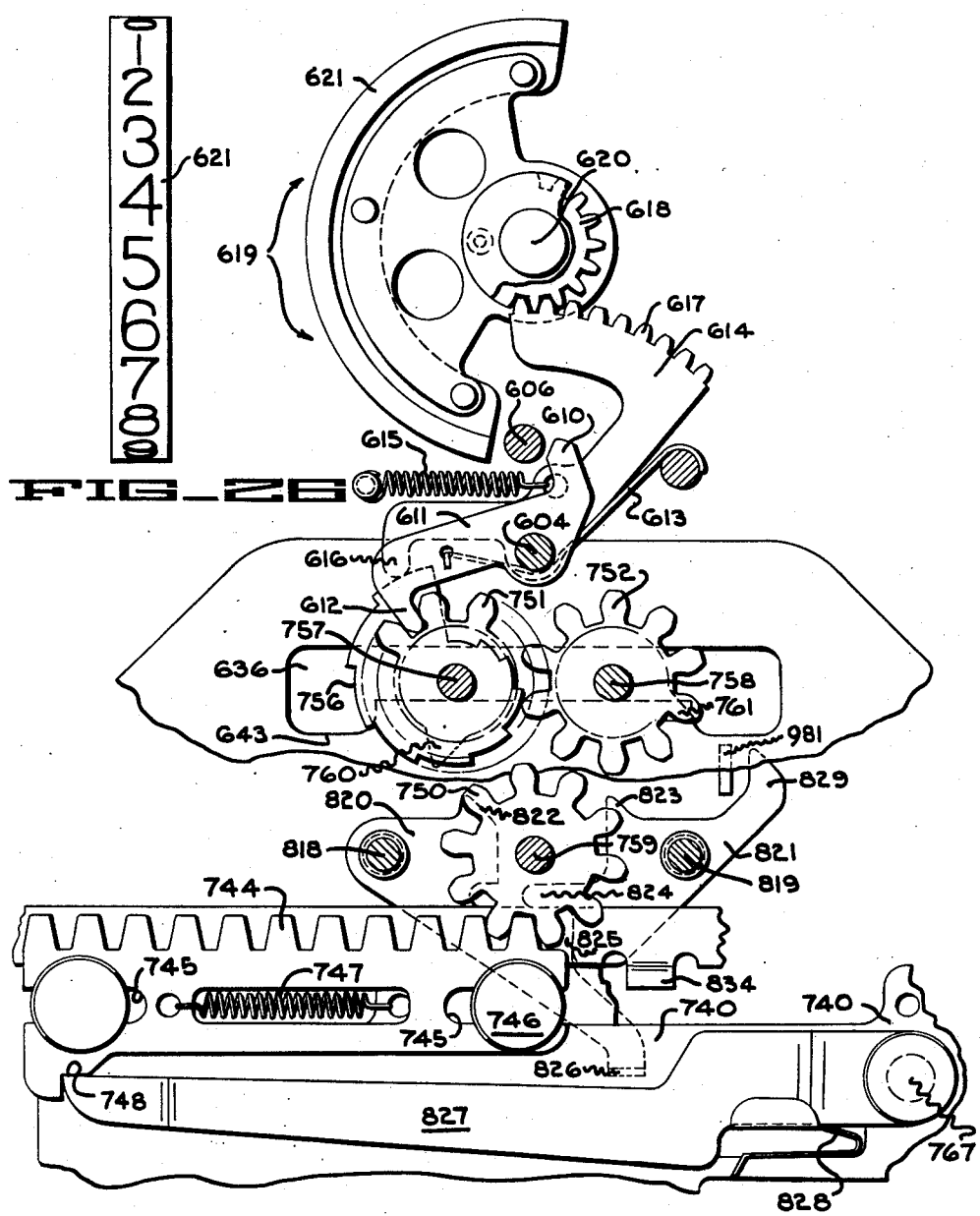
FIG_26
FIG_25
INVENTORS
GEORGE W. HOPKINS
BY ARTHUR J. MALAVAZOS
DONALD L. ROLPH
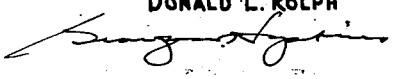

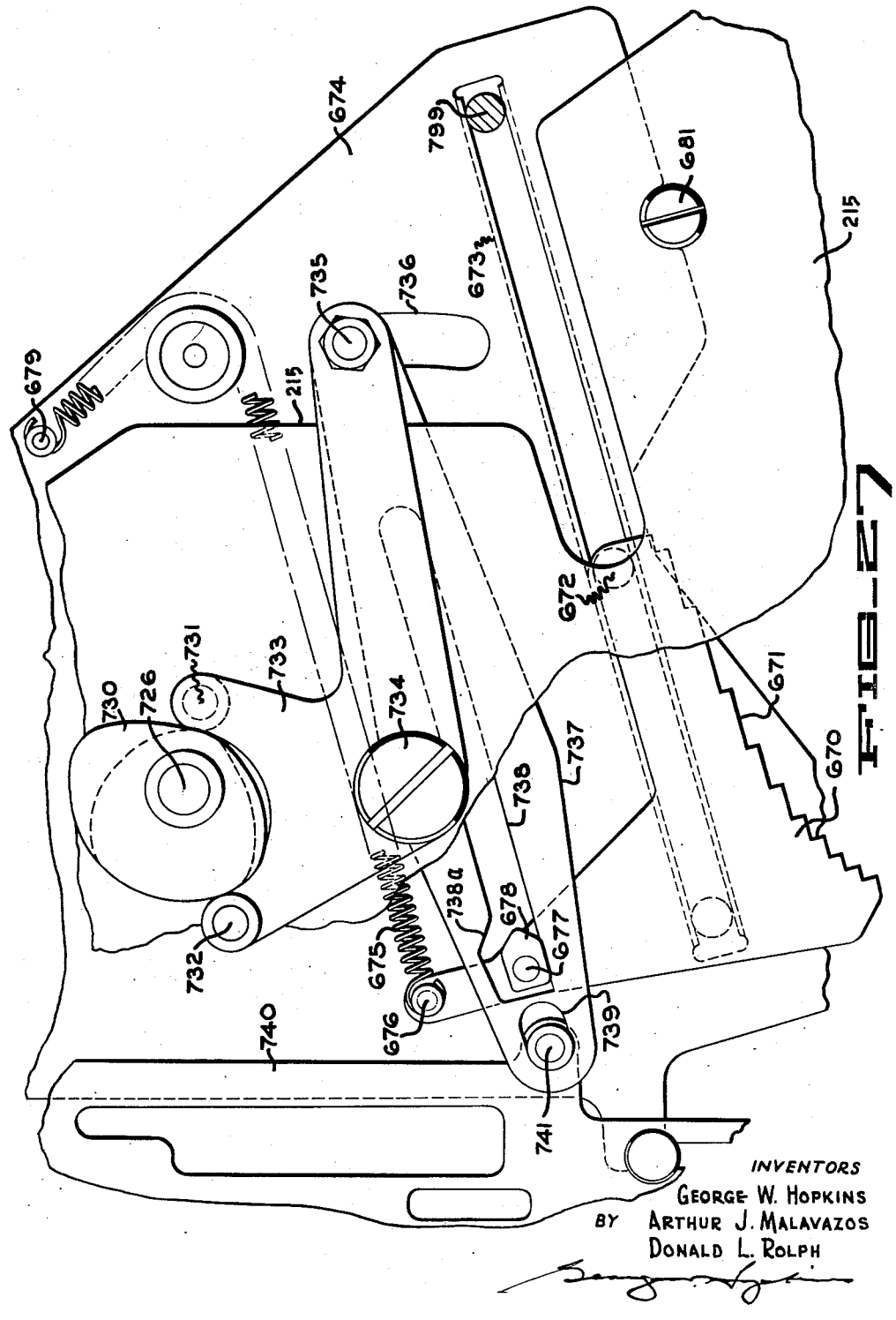

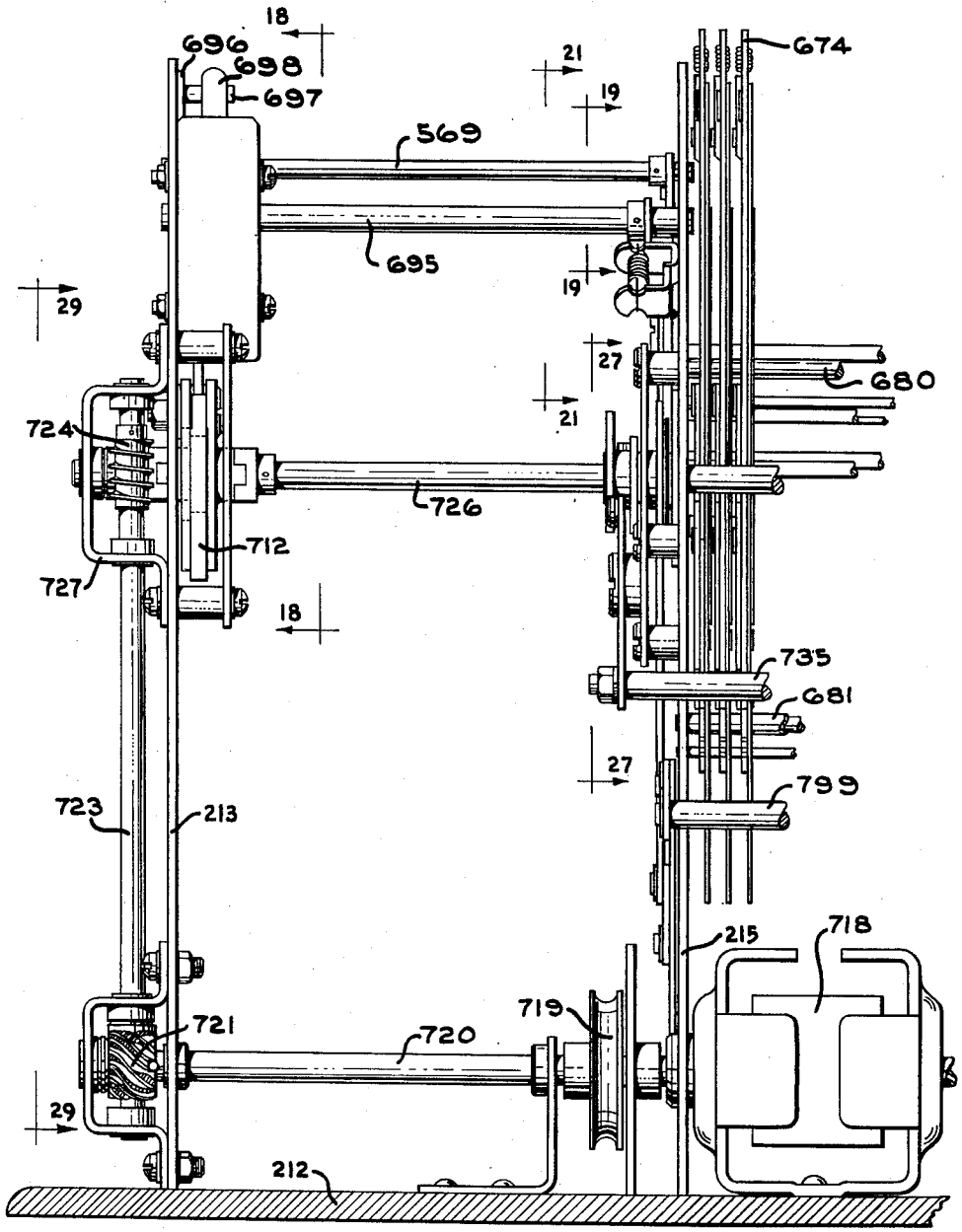

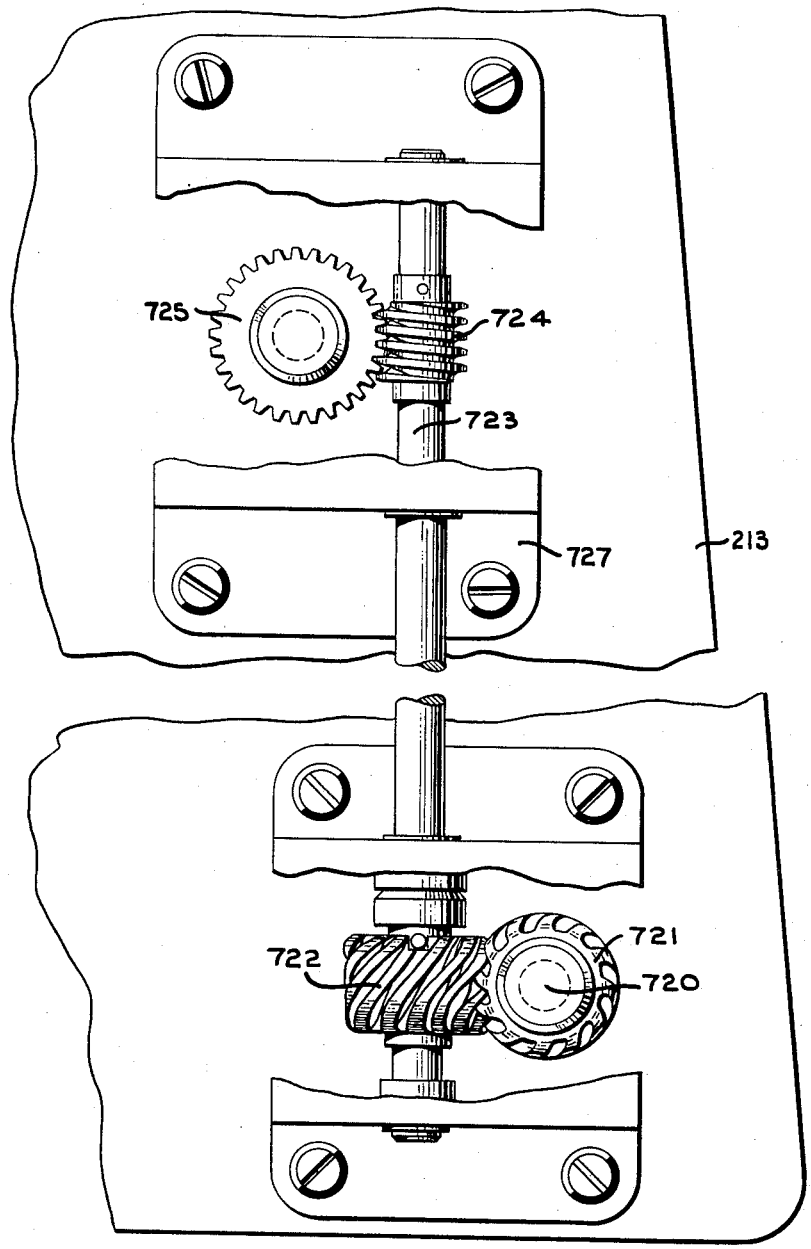
FIG_29

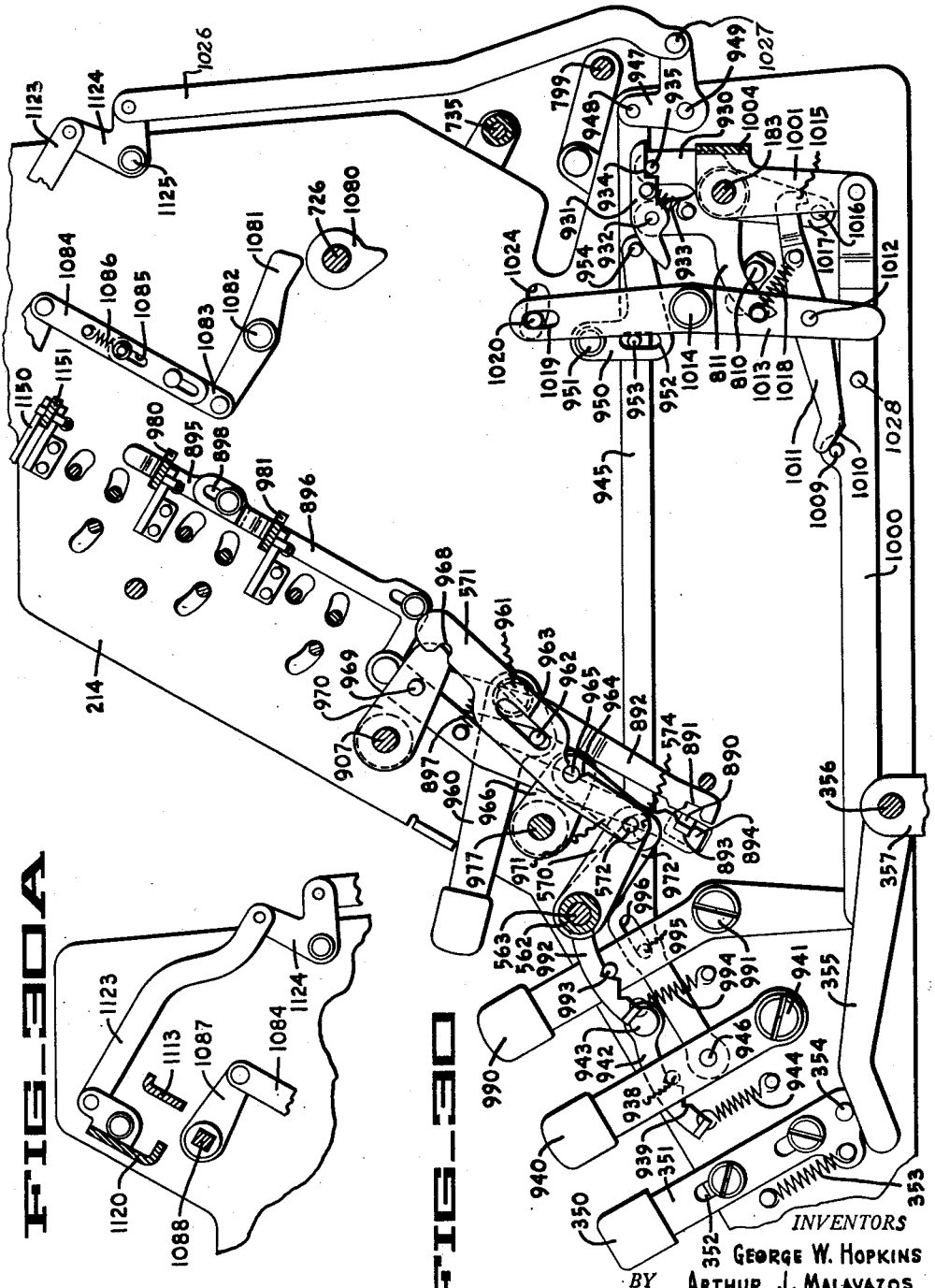

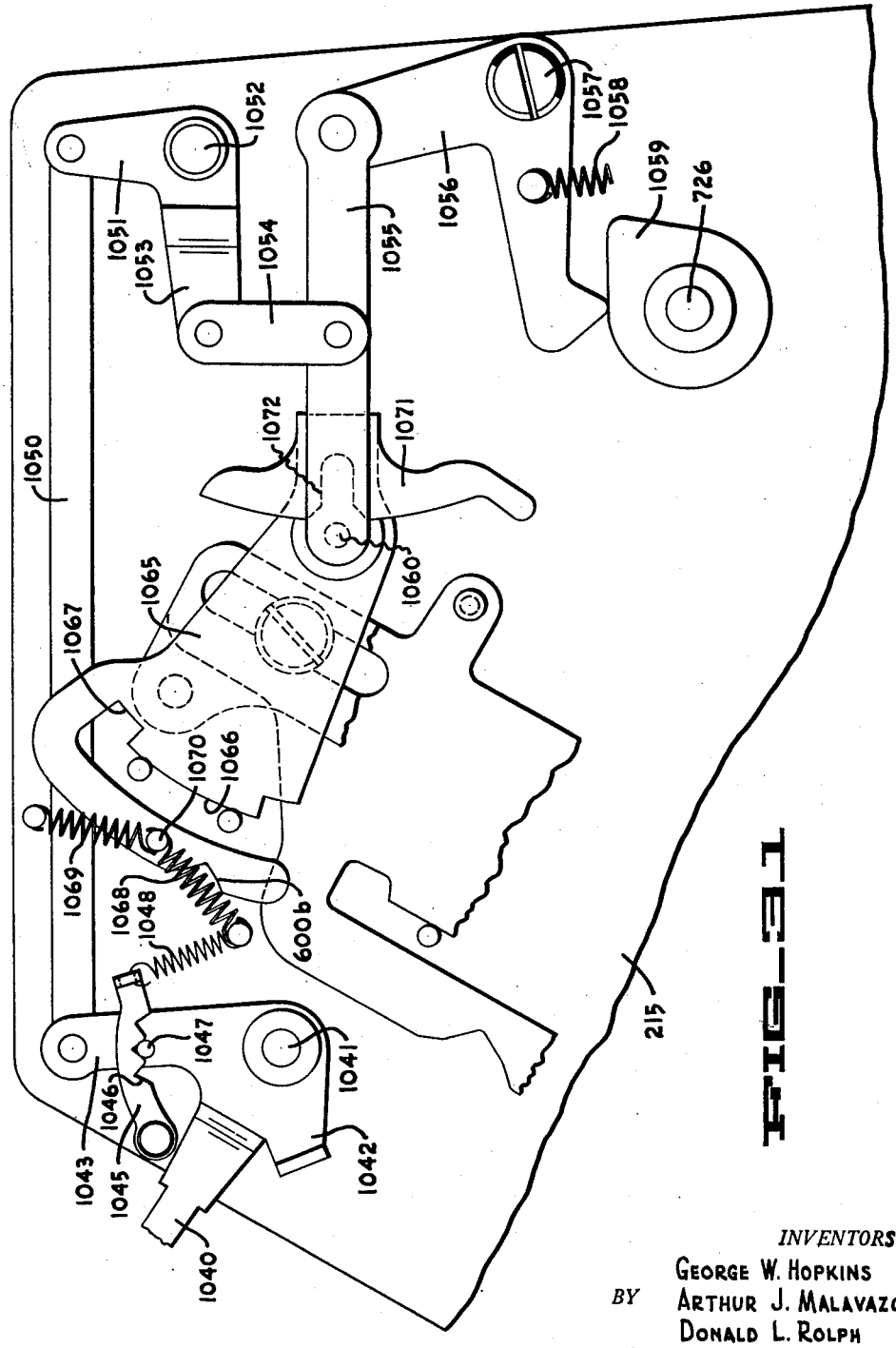

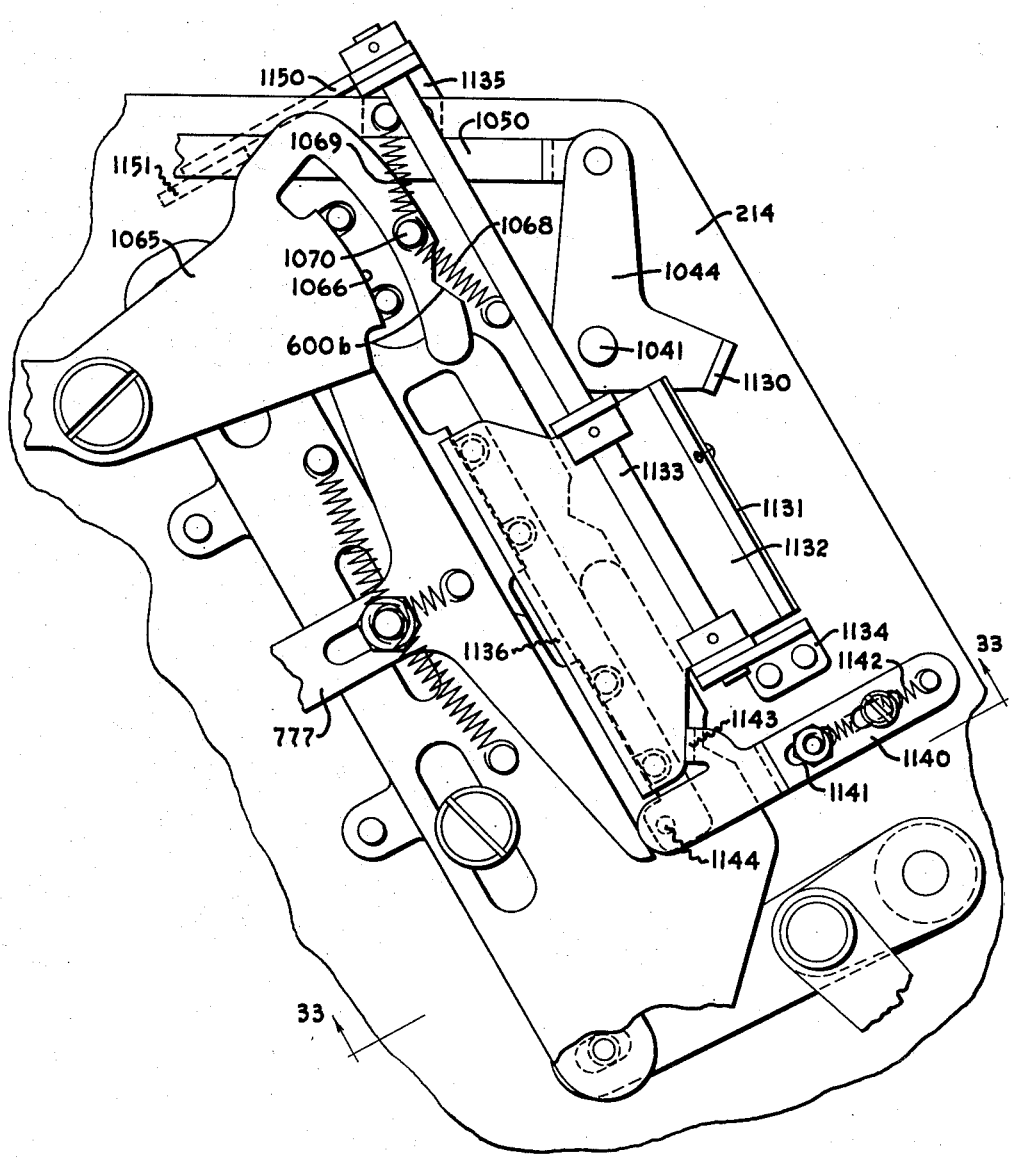
FIG_32

June 22, 1954 G. W. HOPKINS ET AL 2,681,767
CALCULATING MACHINE
Filed Oct. 12, 1950 30 Sheets-Sheet 30
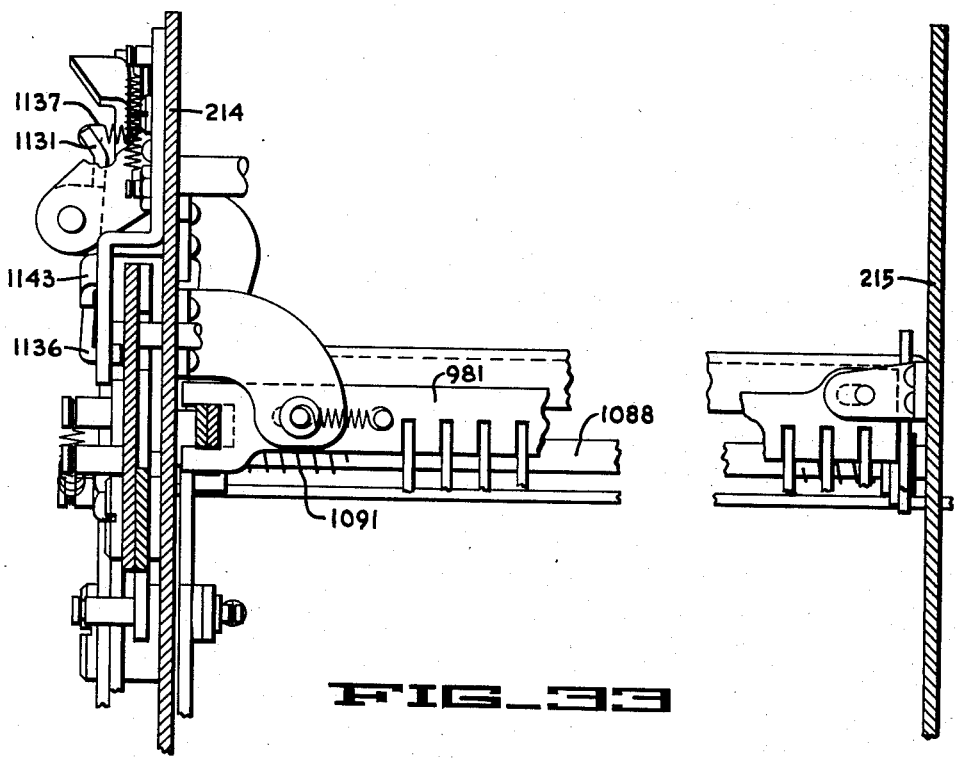
FIG_33
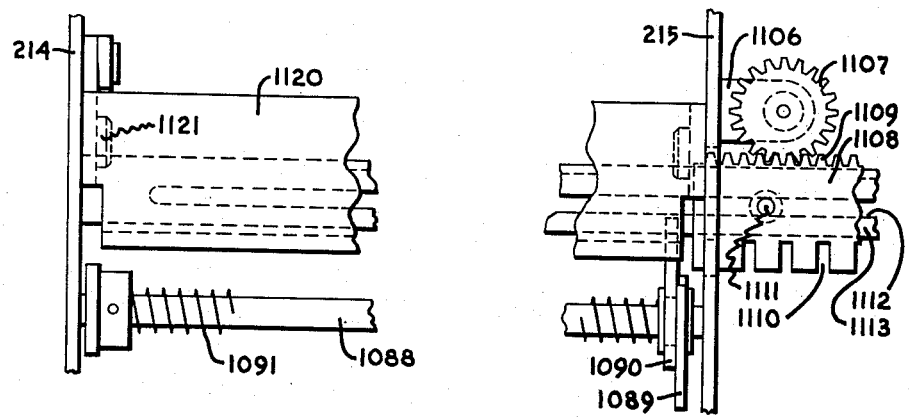
FIG_34
INVENTORS
GEORGE W. HOPKINS
BY ARTHUR J. MALAVAZOS
DONALD L. ROLPH Patented June 22, 1954

2,681,767

UNITED STATES PATENT OFFICE 2,681,767

CALCULATING MACHINE

George W. Hopkins, San Leandro, Arthur J. Malavazos, Oakland, and Donald L. Rolph, Hayward, Calif., assignors to Friden Calculating Machine Co., Inc., a corporation of California Application October 12, 1950, Serial No. 189,842

24 Claims. (Cl. 235—79)

1

This invention relates to a ten key adding and subtracting machine, and is a continuation-in-part of our application Serial No. 125,872, filed November 7, 1949. The continuation-in-part application is related to the copending applications of George W. Hopkins et al. S. N. 141,507 and George W. Hopkins et al. S. N. 141,508, which are divided out of this application.

The primary object of the present invention is to provide an improved 10-key calculating machine which is also capable of efficient use as an adding and subtracting machine, and also as a duplex machine.

An important object of this invention is to provide a small calculating machine having a short key stroke and capable of handling factors of considerable size. In one embodiment of this invention a machine of an overall width of about ten inches was capable of handling factors of twenty digits.

Another important aspect of this invention is the provision of a "light key touch" adding and subtracting machine, i. e., one in which the keys are easily operated. In the present instance we prefer to latch the selecting and control mechanisms against spring pressure tending to operate them, and initiate operation by unlatching the mechanism. Combined therewith is a new and improved restoring means, preferably operated by rotary solenoids to restore parts to normal, or latched, positions, and to effect the necessary movement of parts, incident to setting a factor into the machine.

Another important feature is the provision of a simple and highly flexible "multiple zero" mechanism in which any number of zeros can be entered automatically into a factor by depression of a multiple zero key and the numeral key representing the number of zeros desired to be entered. Such a mechanism avoids the insertion of a plurality of zeros by separately "pumping" them in one-by-one, and permits any number of them to be entered from a single stroke of the hand.

An additional important feature is the provision of an improved clearing mechanism, and particularly one which can be selectively operated to erase the values in the internal carriage and either of the registers or only the values in the carriage.

Another important object of this invention is to provide a back spacing mechanism, operated by depression of a back spacing key, which is effective to erase only the last of a number of digits then standing in the selection mechanism.

2

Another object of the present invention is to provide an improved value selection and value storing mechanism whereby a number (even one containing a great many digits) can be set up from a ten-key keyboard and quickly and easily stored in settable value selection plates or segments from which the value may be transferred selectively into either or both of the accumulators, as desired.

A still further object of the present invention is to provide a novel digitation, or value entering, mechanism for a calculating machine which is positive and fast in its action; which does not require a prolonged cycle to complete a carry; and which is readily adaptable for use with a plurality of totalizers, the factor entered on the single keyboard selectively being added to or subtracted from any one of such totalizers.

Another object of the present invention is to provide a new and improved method of tens carry which is operative during digitation without the possibility of losing a number in the carry.

Another object of the present invention is to provide a simplified register in which the dials, preferably of crescent shape, can be placed in lateral juxtaposition to one another. In this form totals are accumulated in interior gearing of the machine during digitation, and are then sensed by a sensing mechanism which actuates the register dials.

Still another feature of the present invention is a novel repeat mechanism, whereby a value can be locked in the selection mechanism (internal carriage) for a multi-cycle operation, such as multiplication.

One of the important aspects of our invention is the use of novel actuating mechanism designed to permit digitation in a plurality of registers simultaneously; either in like or unlike manner. This feature of the invention provides a highly efficient duplex machine in which selected values can be added or subtracted from either or both of two (or even more) registers, or added in one and subtracted from another.

Another, and similar, aspect of the present invention lies in the provision of a novel transfer mechanism by means of which a value in any register can be transferred into another, at the will of the operator. Thus, in the preferred form of our machine, the operator may accumulate values in a single register, or may accumulate such values simultaneously in two or more registers (simultaneous duplexing), or may accumulate values in one register and thereafter transfer totals from such register into grand totals in another (delayed duplexing). In this latter aspect of the present invention, the values in the registers can be transferred from either to the other, so that either register can be used as an accumulator and the other as a grand totalizer, and the transfer may be either additive or subtractive at the will of the operator.

A still further feature of the present invention is the provision of novel means whereby a value in either register may be automatically transferred into the selection mechanism, and thereby permit its use as a factor in a second operation. This feature permits the solution of problems of the nature of $a \times b \times c$, without the manual setting of the answer to the first problem into the keyboard of the machine.

Still another object of the present invention is to provide an improved counting mechanism, for a ten-key calculating machine, which normally operates in the units order but which is shifted automatically, order-by-order, in multi-cycle operations such as multiplication.

These and other objects of the present invention will be disclosed in the specification and claims which follow:

Throughout the specification the "front" of the machine is that part closest to the operator during normal operation thereof; the "back" or "rear" is that part furthest from the operator; and the "right" or "left" the sides to the operator's right or left, respectively, as the operator faces the front of the machine. Obviously, in views from the rear (such as in Figs. 6, 10, 14 and 28) the right side will appear at the left of the figure. Also, "longitudinal" is used as indicative of something extending from front to back; and "transverse" as extending from left to right across the machine.

The present invention will be readily understood from a reference to the drawings in which:

Fig. 1 is a front view of the calculating machine of this invention.

Fig. 2 is a vertical cross sectional view on an enlarged scale, taken from the right hand side of the keyboard on the vertical longitudinal plane indicated by the line 2—2 of Fig. 3.

Fig. 3 is an enlarged detail plan view of the selection levers immediately under the keyboard which is seen on the lower right hand corner of Fig. 1.

Figs. 4A and 4B are overlapping partial plan views of the selection levers operated by the numeral keys: Fig. 4A being the left-hand portion and Fig. 4B being the right-hand portion of this mechanism.

Fig. 5 is a front view of a selection arm and its associated mechanism, taken along the vertical transverse planes indicated by the line 5—5 of Fig. 4B.

Fig. 6 is a rear view of the selection arm, and its associated mechanism, taken on the vertical transverse plane indicated by the line 6—6 of Fig. 4B.

Fig. 7 is a front view of the carriage shifting mechanism, being taken at a transverse vertical plane immediately behind the keyboard, such as indicated by the line 7—7 on Figs. 4A and 4B.

Fig. 8 is a front view of the carriage latching mechanism, showing mechanism immediately to the left of that shown in Fig. 7, such as along the vertical transverse plane indicated by line 8—8 of Fig. 4A.

Fig. 9 is a front view of a detail of the control mechanism taken along the vertical plane indicated by the transverse line 9—9 of Fig. 4A.

Fig. 10 is a rear view of a detail of the control mechanism taken along the vertical transverse plane indicated by the line 10—10 of Fig. 4A.

Fig. 11 is a right side view of a detail of the control mechanism taken along the vertical longitudinal plane indicated by the line 11—11 of Fig. 8.

Fig. 12 is a cross-sectional view, from the right side of the selection mechanism and the internal carriage, taken along the vertical longitudinal plane indicated by the line 12—12 of Fig. 4A, and showing particularly the relationship between the two mechanisms.

Fig. 13 is a front elevation, similar to Fig. 7, but with the carriage shown in its home position and with certain parts eliminated for clarification.

Fig. 14 is a rear view of the mechanism shown in Fig. 13, showing particularly the control for operating the selection segment restoring solenoid.

Fig. 15 is a right side view taken along the longitudinal vertical plane indicated by the line 15—15 of Fig. 14 and showing particularly the mechanism operative to clear a factor from the selection segments.

Fig. 16 is an enlarged front view of the carriage.

Fig. 17 is an enlarged detail of the plus and minus keys, and their associated slide, taken from the right-hand side, on the vertical longitudinal plane indicated by the line 17—17 in Fig. 3.

Fig. 18 is a left side view of the upper portion of the right side plate, showing the clutch and switch mechanism, taken along the longitudinally extending, vertical plane indicated by the line 18—18 of Fig. 28.

Fig. 22 is a left-hand view of the left side supporting plate, with certain parts removed for simplification, and being taken at the longitudinal vertical plane indicated by the line 22—22 of Fig. 1.

Fig. 23 is another left-hand view of the left side supporting plate, with other parts removed, also taken at the longitudinal vertical plane indicated by the line 22—22 of Fig. 1.

Fig. 24 is a fragmentary right side elevation through the carriage and registering mechanism taken on a vertical longitudinal plane through the machine immediately to the left of the central supporting plate.

Fig. 25 is a right side view of a detail of the registering mechanism.

Fig. 26 is a front view of the register dial.

Fig. 27 is a right side view of a detail of the registration actuator mechanism mounted on the central supporting plate, such as along the longitudinal plane indicated by the vertical line 27—27 of Fig. 28.

Fig. 28 is a rear elevation of the right-hand side of the calculating machine of the present invention, showing the drive mechanism operative to cause digitation.

Fig. 29 is a right side view of the right-hand supporting plate showing the drive mechanism mounted thereon as indicated by the line 29—29 of Figs. 1 and 28.

Figs. 30 and 30A show a right side view of the left-hand supporting plate, showing particularly the control mechanisms mounted thereon, and being taken along the longitudinal vertical plane indicated by the line 30—30 of Fig. 1.

Fig. 31 is an enlarged view of the upper portion of the right side of the central supporting plate, showing particularly the counter control mechanism, being taken along the longitudinally vertical plane indicated by the line 31—31 of Fig. 1.

Fig. 32 is an enlarged left side view of the upper front edge of the left-hand supporting plate showing in detail the counter control mechanism mounted thereon, being taken along substantially the same longitudinally vertical plane as that indicated by the line 22—22 of Fig. 1.

Fig. 33 is a cross-sectional view of the counter control mechanism taken from the front and below the same, such as the oblique plane indicated by the line 33—33 of Fig. 32.

Fig. 34 is an oblique top view of the counter actuator, taken substantially along the oblique plane indicated by the line 34—34 of Fig. 24.

GENERAL ARRANGEMENT

Figure 19:
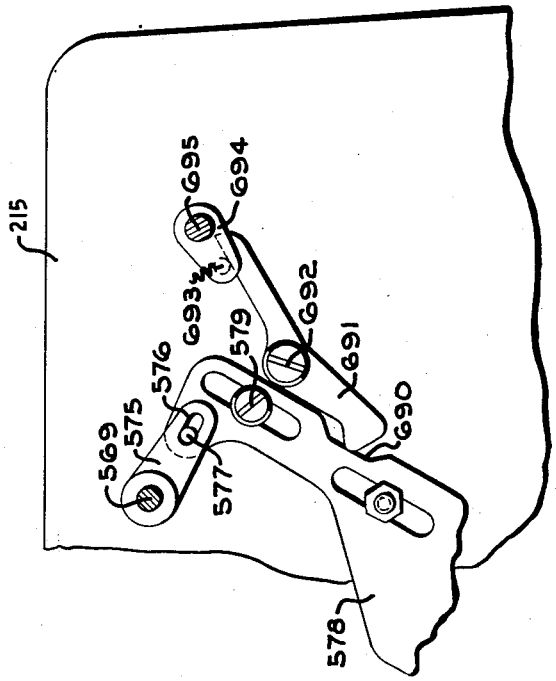
Fig. 19 is a right side view of a detail of the power control mechanism on the central supporting plate, such as along the longitudinally vertical plane indicated by the line 19—19 of Fig. 28.
Figure 20:
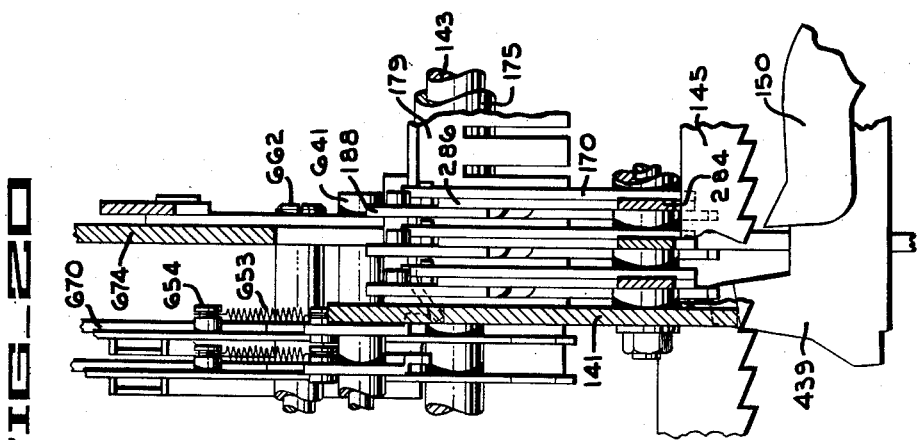
Fig. 20 is a front view of a carriage detail, being taken along the vertical plane indicated by the line 20—20 of Fig. 12.

The general appearance of the calculating machine of the present invention is shown in Fig. 1. The machine is preferably enclosed in a customary cover plate 32. In the upper left-hand corner of the cover plate is a plurality of suitable rectangular apertures 33 for the display of values accumulated in various registers, the counter, and the check dials. In the embodiment here described there is shown, reading from top to bottom: a counter, or multiplier register 1039; a grand totalizer 900 in which values may be accumulated simultaneously with those of the accumulator 619 (either in like or unlike sign as that of accumulator 619) or receiving totals from time to time transferred from the accumulator; an accumulator, or totalizer 619; and check dials 201 on which is indicated the values set into the machine. Slidable decimal indicators 34 may be mounted adjacent the apertures 32 for indicating decimal points in the respective register dials. Preferably the machine is mounted on a plurality of rubber feet 35.

The general arrangement of the mechanisms is as follows: The keyboard comprising the zero key 400 and the 9 numeral keys 401 to 409, inclusive, and the digitation control keys are arranged in the lower right-hand front face of the machine, as shown in Fig. 1. Preferably the value and digitation control keys are mounted in a removable assembly, as shown in Fig. 2, which is inserted through a suitable opening 39 in the lower right-hand face of the cover plate.

The check dials 201 are carried by the internal carriage, hereinafter described, while the register dials are rotatably but non-shiftably mounted in the machine. The internal carriage lies transversely in the machine, and is located slightly below the level of the check dials, and in its home position is located to the right and below the lowermost aperture 33, i. e., somewhat above the keyboard. In this position, no figures can be visible in the check dial aperture 33. The selection mechanism for transposing values selected by depression of the value keys into the internal carriage lies behind and below the keyboard. It will be understood that with the insertion of values into the internal carriage, it (the carriage) is shifted ordinally to the left disclosing the values so inserted in the check dials, digit by digit, as they are entered.

The accumulating mechanism is located behind and below the apertures 33, and utilizes the values inserted into the carriage for adding to or subtracting from the values standing in the accumulator and grand totalizer. In digitation, the accumulating mechanism for each order of the register is differentially operated according to the value standing in the carriage in the same order. In the example shown in Fig. 1, only the first three orders from the right will be operative to add or subtract the figure shown in the check dials, to the corresponding orders of the two registers. While all of the actuating levers (one for each order of the register) are driven during digitation, only the levers in the orders in which a digit is shown on the check dials are effective to cause operation in the registers. Of course, there is a tens carry mechanism, which is operative to the left of the actuated accumulating mechanisms, and this carry mechanism is operative throughout the full width of the register.

Above the grand totalizer 900 is the item counter 1039. Normally a value of "1" is entered in the units order thereof with each digitation cycle of the machine, to give a true count of the number of separate items entered. However, in multi-cycle operations such as multiplication, the counter actuator shifts with the carriage to give a true count, or registration, in the respective orders of the multiplier.

The mechanism of the machine is mounted upon a base plate 212, which in turn is supported by the feet 35. Mounted on the base plate 212 are preferably three supporting plates, a right side plate 213 (Fig. 4B), a left side plate 214 (Figs. 8, 22 or 23) and a center supporting plate 215 (such as is shown in Figs. 14 or 28). Other mechanisms will be supported upon the brackets mounted upon the base plate or on the three major supporting plates as will be from time to time described.

VALUE SELECTION

(a) Operation of selection arms

Values to be entered into the machine are entered by means of a zero key 400 and value keys 401 to 409, inclusive. The value keys, together with necessary control keys are grouped together in the lower right-hand corner of the front of the machine, as shown in Fig. 1. Associated with the keys 400 to 409, inclusive, are the selection levers 410 to 419, inclusive (Figs. 2 and 3). For purposes of simplification, the last digit of the reference characters referring to the numeral keys and the selection mechanism down to the traveling carriage described hereinafter, refer to the value of the key to which such mechanism is associated. For example, the lever 410 is associated with the numeral key 400, for entry of 0; the lever 411 with the key 401 entering the value 1, etc. The forward end of the value entering levers 410 to 419 are provided with upraised ends 420 to 429, respectively, preferably terminating (as shown in Fig. 2) immediately below the key stems 50 associated with each of the numeral keys.

The keyboard of the present machine is preferably of the self-sealing type disclosed in the patent to G. W. Hopkins, No. 2,559,820, issued July 10, 1951. In this type of keyboard assembly (shown in Fig. 2) the keyboard can be assembled separately, and apart from the machine, and inserted into the opening 39 of the machine quite readily. The keys 400 to 409, inclusive, are mounted upon ten identical key stems 50 which are slidably mounted in an upper plate 51 and a lower plate 52. The plates 51 and 52 are separated by spacers 53 and held in rigid spaced relationship by machine studs 54. The assembly is suitably mounted in the cover 30 by any suitable means such as studs 55. The keys are normally maintained in their raised positions by suitable compression springs 56 surrounding each key stem and placed between the bottom plate 52 and a pin 57 in each key stem. As mentioned previously, the forward ends of the key levers 410 to 419, inclusive, are bent upwardly so as to immediately underlie the key stems 50.

It will be seen by reference to Fig. 3 that three of the key levers (preferably 417, 418 and 419) extend straight back, while the others are bent at inverted right angles to provide suitable clearance. As shown in Fig. 3, the key levers 414, 415 and 416 are bent to lie to the left of the key levers 417, 418 and 419, respectively; and key levers 411, 412 and 413 are bent to lie to the right. Behind the keyboard the ten levers are parallel and spaced apart as shown. All of the levers are pivotally mounted on a transverse shaft 60 journalled in a bracket 62 secured to the base plate. The levers are separated by suitable spacers, or sleeves, 61. The rear ends of the key levers are bent laterally to permit their rear ends to lie in juxtaposition, as is shown particularly in Fig. 4B.

The rear ends of each of the levers 410 to 419, inclusive, terminate in ear 69, which ears are positioned at points differentially spaced from one another, as shown in Fig. 4B. In the embodiment shown, the lever 419 terminates closest to the front and the lever 410 terminates furthest to the rear. The terminal ears, or lugs, 69 preferably terminate at stepped elevations as shown in Figs. 5 and 7, in order to provide a uniform level of rise of such ears irrespective of the difference in radial length from the shaft 60 to the respective ear.

Referring to Figs. 4A, 4B and 5 it will be seen that the key levers 410 to 419, inclusive, are operative to position the selection arms 430 to 439, inclusive, which directly enter the values into the carriage to be described hereinafter. Each of the selection arms is positioned by an actuator arm 440 to 449, inclusive, each of which actuator arms is powered by a spring 86, as hereinafter described. The value key levers 410 to 419 operate to release latches holding the respective actuating arms 440 to 449, whereby the spring 86 operates to raise its respective selection arm. Thus, the actual work of setting the selection levers is done by the springs, thus lessening the force required for key depression.

The mechanism for release of the actuator arms 440 to 449, inclusive, to position the selection levers 430 to 439, inclusive, is shown in detail in Fig. 5, which for the most part shows the selection lever for the value "6" (lever 436). It will be understood that each actuator arm is controlled by a separate mechanism, but, as these mechanisms are identical, only one need be described. The rear end of each of the key levers 410 to 419, inclusive, as heretofore mentioned, is provided with an upstanding ear 69 which underlies the horizontal arm of an associated bellcrank 70 (700 for the zero bellcrank). The bellcranks 70 and 700 are mounted on a common shaft 74 suitably supported by a bracket 73 mounted on the base plate. The right-hand edge 73A of the bracket 73 is turned upwardly to form a comb for the proper spacing of the respective bellcranks 70. The upturned comb 73A also serves to confine the rear ends of the levers 410 to 419 against undesirable side motion to the left. A second bracket 72 to the right of the key levers also mounted on the base plate, serves to prevent bending to the right by the key levers. The second bracket 72 also provides a spring seat for the lower end of a spring 71 which is affixed to the bellcrank 70 in order to pull the bellcrank in a clockwise direction.

A latch lever 75 is pivotally mounted on the upwardly extending arm of the bellcrank 70 by any suitable means, such as pin, or stud, 76. The right-hand end of the latch 75 is supported by a link 77 to which it is pivotally connected, as by pin 78. The link 77 is provided with a slot 84 which embraces a pin 85 on the respective actuating arm (in Fig. 5, on arm 446). The latch 75 is pulled in a clockwise direction by a spring 79 tensioned between the right-hand end of the latch and the horizontal arm of bellcrank 70.

Also pivotally mounted on the shaft 74 is rocking arm 80 which is provided with an ear 81 adapted to be engaged by the latch 75. The upper end of the arm 80 is provided with a nose 82 which engages an ear 83 on the corresponding actuating lever (in Fig. 5, on actuator arm 446). The rocking arms 80 are normally pulled to the right by springs 88 tensioned between the arms and a common bar 90 extending between transverse brackets 66 and 67.

It is thus obvious that depression of any numeral key will raise the rear end of the associated numeral lever to rotate the bellcrank 70 in a counter-clockwise direction. Such movement pulls the latch 75 to the left. The latch 75 is engaged over the ear 81 of the rockable arm 80, thereby pulling the arm 80 in a counter-clockwise direction. Such movement of the arm 80 pulls its nose 82 off the ear 83, thus unlatching the corresponding actuator arm. Each of the actuator arms 440 to 449, inclusive, is pulled in a clockwise direction by means of a heavy spring 86 tensioned between the respective arm and a common bracket 87 mounted on the right-hand supporting wall 213. Thus, depression of a key serves to unlatch the corresponding actuator arm and permits spring 86 to pull the actuating lever in a clockwise direction.

The various selection arms 430 to 439, inclusive, and their associated actuating arms 440 to 449, inclusive, respectively, lie immediately adjacent each other and are both loosely mounted on the longitudinal shaft 65. The hubs of these two arms, as shown in Figs. 4A and 4B, provide suitable spacing of the mechanism. The selection arm (436 in Fig. 5) lies between its actuator arm (446 in Fig. 5) and the associated rotatable arm 80. Thus, the arm 436 overlies the ear 83 on the associated actuator arm 446, so that the rotation of the actuator arm, when the nose 82 is unlatched from the ear 83, lifts the associated selection arm (436 in Fig. 5) likewise in a clockwise direction.

The selection arms 430 to 439 are normally pulled counterclockwise by means of light springs 89, tensioned between the arms and the bracket 73. The spring 86 is considerably stronger than the spring 89, so the former will rock both arms clockwise immediately upon the nose 82 being pulled off the ear 83.

The left, or free, end of the selection arm is provided with an upstanding nose 47. It can be mentioned, as will be obvious from a perusal of Fig. 12, that the noses 47 of the various arms terminate in a single plane with the exception of the nose 470, associated with the "0" selection arm, which rises to an elevation somewhat above the others for a purpose to be hereinafter mentioned. The nose of each selection lever is provided with a camming face 48 and with a latching notch 49 adapted to cooperate with the detent 256, shown in Fig. 10. The detent, as is shown in Fig. 4A, is of modified U shape, having the sides 254 and 255 enclosing the ends of the selection arms, and having the central portion 256 turned under to form a nose which is cammed outwardly during upward movement of a selection arm and then immediately engages the notch 49 to latch the selection arm in its raised position. The detent carries a spring arm 258 on which is mounted a spring 259, the other end of which engages shaft 251. The detent is thus normally urged in a latching direction (counterclockwise in Fig. 10).

It will be obvious that upon depression of a key and the unlatching of the actuator arm, the selection segment arm of the selection arm is raised and latched in the raised position. This raising is utilized, as will hereinafter be explained, to enter the corresponding value in the selection segments mounted in the traveling carriage. As each value is entered, the upward motion of the selection arm moves the detent to release whatever arm had theretofore been latched in a raised position. Thus, only one selection arm at a time will be in raised position, but any arm so raised will remain latched in its raised position after the actuator arm is restored to normal, the carriage stepped to the left and, normally, until a new value is inserted in the next order.

(b) Restoration of actuator arm

Underlying the actuating arm is a common bail 95 (Figs. 4B, 5 and 6). The bail is mounted in rockable end plates 96 and 97 which in turn are mounted on a shaft 98 suitably journalled in brackets 66 and 67. The bail assembly is pulled in a counter-clockwise direction by any suitable means such as spring 99. A bracing bar 100, operating through slots 101 in the brackets 66 and 67, also connects the plates 96 and 97 and thus holds them in rigid spaced relationship, and in correct alignment.

The forward end of the bail 95 is provided with a stud 102 which overlies the switch arm 110 (Figs. 4B and 6). The switch arm 110 carries an insulated member 111 which engages the upper leaf 112 of a contact switch comprising the leaf 112 and a second, or lower, leaf 113. The switch is mounted by any suitable means such as bracket 114 affixed to the base plate. The arm 110 is held in either adjusted position by a detent 115 mounted on bracket 116 and urged into engagement with the switch arm 110 by any suitable means, such as compression spring 117. Preferably the detent 115 is provided with guide plates 118 engaging the sides of switch arm 110 in order to prevent relative lateral displacement between the switch arm and the detent.

It is seen from the foregoing description that depression of a numeral key releases the corresponding actuator arm and permits it to be pulled clockwise in Fig. 5, or counter-clockwise in Fig. 6. Depression of the actuator arm depresses the bail 95 against the tension of the spring 99, thereby lowering the switch arm 110 to cause a closing of the switch 112—113.

The switch 112-113 is connected to an actuator restoring solenoid 125 (Figs. 4B and 5). Preferably this solenoid is of the rotary type, of well known manufacture, which provides a rotary throw of about 45°. The solenoid 125 rocks a stud shaft 126 (Figs. 4B and 6) which is keyed to the shaft 65. A pair of identically shaped cams 127 and 128 are pinned to the shaft 65 to rotate therewith, one cam being located at each end of the shaft 65 (Fig. 4B). The shape of the cams is shown in Figs. 6 and 7. Each cam is provided with a camming face 129 adapted to engage studs 134 and 135, respectively, at the back and front end of the bracing bar 100 upon actuation of the solenoid, thereby rocking that bar and the associated bail assembly (clockwise in Fig. 6 and counter-clockwise in Fig. 7). Such rocking of the bar 100 raises the outer end of the actuating arm, permitting it to again be latched by the spring-pressed pivot arm 80. The solenoid, shaft and cams are returned to their original position by any suitable means, such as spring 130, one end of which is attached to a pin 131 mounted on cam 127 and the other end of which is attached to a pin 132 mounted on the bracket 66 (Fig. 6).

Thus, depression of any numeral key releases the corresponding actuator arm, which is pulled clockwise by the spring 86. Such movement of the arm depresses the bail 95 to close the switch 112-113, which in turn operates the solenoid to depress the bar 100 and immediately restore the actuator arm to its original position, in effect as a part of its operating throw. It will be noted, in Fig. 5, that the operating throw (clockwise rotation) of the actuator arm raises link 77, which in turn lifts the latch 75 from engagement with the ear 81 of the arm 80. Thus, the arm 80 is immediately returned to its latching position regardless of how long the key in question is depressed. The slot 84 in the link 77 permits displacement of the link and latch upwardly when the key is released and the bellcrank 70 returns to its normal position. In this manner, the force of the spring 86 and the speed of the solenoid 125 acts to raise the selection arms to operative position and instantaneously restore the actuating arm to its latched position.

Simultaneously, with the restoring of the actuator arm to its normal position, the switch 112—113 is opened so as to interrupt current to the restoring solenoid 125. The means for breaking the circuit is shown in Fig. 7 and comprises an arm 161 extending from the switch lever 110 to a point adjacent the cam 128. A roller 160 mounted on the cam engages the arm 161 of the switch lever and forceably moves the switch arm to the disengaged position, in which position it is held by the detent 115.

(c) Entry of values into internal carriage

The mechanism for the entry of values from the selection arms into the selection segments of the carriage is best shown in Fig. 12. The carriage 140, which is shown in outline in Fig. 7 and in detail in Fig. 16, comprises the side plates 141 and 142 held in spaced relationship by suitable cross bars such as 179, 195, 206 and 281.

For the present it is sufficient to note that the carriage slides on transverse bars 143 and 144 Figs. 7 or 24) and is provided with a rack 145 which is adapted to be engaged by a carriage shifting pawl 150 to move the carriage to the left (Fig. 7). The carriage is normally pulled to the right-hand, or home, position by a strong spring 146, as shown in Fig. 7.

As shown in Fig. 12, a sleeve 175 surrounds the supporting shaft 143. On this sleeve 175 is rotatably mounted a number of differentially settable selection segments 174, one for each order of the capacity of the machine. Associated with each segment 174 is a setting mechanism. As the selection segments and the cooperative mechanisms are identical, only one need be described in detail.

A shaft 171 extends lengthwise of the carriage (transversely across the machine), and is shown in cross-section in Fig. 12. On this shaft is mounted a number of bellcrank latches 170, one for each selection segment 174. The upper arm of each bellcrank 170 is provided with a latching notch 172 which normally engages an ear 173 on the selection segment. It will be noted that the lower edge of the bellcrank latch 170 is provided with a notch 176 adapted to be engaged by the noses of the selection arms 431—439. The edge of this notch is placed at an angle to the side of the bellcrank, as it is desired to have a uniform stroke of the latch 170 irrespective of the distance from the shaft 171 at which the latch is engaged. The nose 470 for the zero selection lever 430 stands above the others for the purpose hereinafter to be described, and so requires an additional, and deeper, notch 177 whereby when it engages the bellcrank 170 it will move the crank only a distance equal to that of the other arms. The latch 170 is pulled clockwise into latching position by a suitable tension spring 172 stretched between the end of the latch 170 and a common bracket 169 carried by the carriage.

The entry of a value into the selection arms, by causing their noses 47 to rise, disengages the latch 170 and permits the selection segment 174 to rotate counter-clockwise under the influence of spring 193 (Fig. 24). The segment 174 is provided on its lower edge with a stop 178 which engages the upwardly latched nose of the selection arm and thereby stops rotation of the selection segment. In our preferred form, the amount of rotation of segment 174 is inversely proportional to the value of the key depressed. In the form shown eleven values are possible: a blank, the numerical values of 9 to 1, inclusive, and zero. In Fig. 12 the segment stands in the blank position, which is the position in which the selection segment is normally latched. The 9 value is next and represents the smallest amount of rotation of the selection segment. The value of zero is at the other extreme and represents extreme amount of rotation. For this reason the nose 470 of the zero selection arm 430 is sufficiently high to always stop the selection segment at the zero position, if no numeral key is latched in raised position (as will happen when a multiple zero is entered into the machine.)

The selection segments are held in properly spaced relationship by a comb 179 which extends lengthwise of the carriage (transversely in the machine). The upper surface of the comb also serves as a camming face to lift the right-hand end of hook members 650 for the purposes hereinafter described.

The upper right-hand portion of the selection segment is provided with a nose 180 adapted to engage the respective notches 671 of the selection slide 670 to be described hereafter. The right-hand edge of the selection segment is provided with a rack 181 of eleven teeth corresponding to the blank, the 9 to 1, and zero positions (reading from top to bottom). The selection segment is normally latched by the bellcrank 170 in the blank position, in which it is shown in Fig. 12. The carriage is moved one step to the left almost simultaneously with the setting of a value into the selection segment and as the selection segment has stopped at a differential position corresponding to the value entered, the notch 181 corresponding to such value will engage and slide upon the long detent 182 (see also Fig. 8), and thereafter be latched in that position. The detent 182 is pinned to a shaft 183 and is spring-pressed to engaged position by a suitable spring 184.

The selection segment is also provided with a forwardly extending arm 188 which carries a pin 189 engaging the bifurcated end of a bellcrank 190. The bellcrank 190, as shown in Fig. 24, is rotatably mounted on a shaft 191 extending across the carriage. The bellcrank is pulled clockwise by a relatively strong spring 193, one end of which is connected to the bellcrank and the other end to a bar 194 mounted in the carriage. A comb 195 holds the bellcranks 190 in proper operational relationship. The upper end of the bellcrank 190 has a suitable pin and slot connection 196 with a second bellcrank 197 rockably mounted on a shaft 198. The free end of the bellcrank 197 carries a gear segment 199 which engages a gear segment 200 mounted on the check dial 201, which is rotatably mounted on shaft 207. Thus, the check dial displays the value set in the selection segment 174. The check dial 201 also carries a gear segment 202 which is engaged by the nose 203 of a pawl 204 pressed into engagement with the check dial by a spring 205 tensioned between the free end of the detent 204 and a spacing bar 206 extending across the carriage.

The values differentially set in the selection segments 174 can be cleared by operation of the clear bail 186, the operation of which will be described hereafter.

(d) Carriage shifting

The carriage is shifted step by step to the left from its home position upon entry of a value in each order. The mechanism for stepping the carriage to the left is shown in detail in Fig. 7. As previously mentioned, the bail assembly for restoring the actuating arms is operated by a pair of identical cams 127 and 128, pinned to shaft 65, the cam faces of which contact the studs 134 and 135 of bar 100 to rotate the bail 95 counterclockwise as viewed from the front. The cam 128 carries a carriage shifting pawl 150 which is pivotally mounted thereon by any suitable means, such as stud 152. The outer end of the pawl has a nose 151 adapted to engage the rack 145 of the carriage. The outer end of the pawl 150 is urged against a roller 156 by a tension spring 153, one end of which is inserted over pin 154 on the bracket 67 and the other end of which is fastened to the pawl by any suitable means, such as pin 155. When the cam 128 is in its normal, or inoperative, position, the pawl is prevented from engaging the rack 145 by roller 156 mounted on the bracket 67. However, as the cam 128 rotates clockwise (in Fig. 7) to re-latch the actuator arm in its normal position, the pawl 150 is pushed to the left and thereupon can engage the rack 145, pushing the carriage one step to the left. The carriage is held in the adjusted position by means of a holding pawl 385 shown in Fig. 8 and described in detail hereafter.

(e) Multiple zero entry

The machine of the present invention is provided with a mechanism for the automatic entry of from 2 to 9 zeros as desired by the operator. For this purpose a multiple zero, or tabulating key, 220 is provided. This key is shown in Fig. 1 as located below the value keys 1 and 2. This key is preferably mounted on a key stem 50 similar to those of the value keys. The key stem for this key engages an ear 219 on the right-hand end of a lever 221 (Fig. 3) which is rockably mounted, as by pin 223, to a bracket 222 mounted on the base plate below the keyboard. The left-hand end of the lever 221 underlies the forward end of a tabulating lever 224 which is pivoted on shaft 60. The rearward end of the tabulating lever terminates adjacent the upstanding end 228 (Figs. 4A and 11) of the bracket member 229, which bracket member has two relatively high sides 230 and 231 extending transversely of the machine and a relative low, longitudinally extending end 245.

The rearward end of the tabulating lever 224 overlies (Fig. 11) stud 225 on the latch 226 which is pivoted, as by pin 227, to the upstanding end 228 of the bracket 229. The nose of the latch 226 overlies (see also Fig. 9) the horizontal arm of a bellcrank 232. The bellcrank is pinned to a longitudinal shaft 233 suitably journaled in the bracket 229. The upper end of the bellcrank 232 carries an ear 234 to which is attached the tension spring 235, the free end of which is affixed by any suitable means to the side of the bracket. This spring tends to rotate the bellcrank 232 counter-clockwise as viewed from the front (e. g., Fig. 9).

The upper arm of the bellcrank carries a pin 236 which is engaged by the bifurcated end 237 of a second L-shaped lever 238 pivoted to the side 230 of the bracket, as by stud 239. A live pawl 240 is rockably mounted on the L-shaped lever, as by rivet 241, and is pulled counter-clockwise by a tension spring 242. A stop pin 243 carried by the L-shaped lever prevents the pawl 240 from rotating counter-clockwise beyond the position shown. The effect of the depression of the tabulator key 220 is, therefore, to release bellcrank 232, which is pulled counter-clockwise by spring 235 to rotate the L-shaped lever 238 and the live pawl 240 clockwise (Fig. 9) to position it in operative relationship with the nose 285 of the three-armed lever 284 (Fig. 12) mounted in each order of the carriage.

Simultaneously with the depression of the tabulating key 220, the operator will depress the numeral key corresponding to the number of zeros to be entered into the factor. As shown in Figs. 4A, 5 and 12, each of the selection arms 432 to 439, inclusive, carries a lower tabulating arm 452 to 459, inclusive, respectively, which is turned toward the front of the machine. The arms 452 to 459, inclusive, terminate in the respective tabulator stops 462 to 469, inclusive, arranged in a straight line across the machine as shown in Fig. 4A. These arms are differentially spaced a distance from each other corresponding to the spacing between adjacent orders in the carriage. The tabulating ears are differentially cut, as shown in Figs. 5 and 16, so that when elevated by depression of the key each rises to the same level. Obviously, the tabulating ears 462 to 469, inclusive, are raised with the operation of the selection arm. The tabulating arms are not necessary for the keys 431 or 430, as tabulation will always be for a plurality of zeros. If a single zero is to be entered, the regular zero key would be used.

A tabulating mechanism is mounted on the carriage and is shown in detail in Fig. 12. This mechanism comprises a plurality of tabulating slides 280, one for each order of the machine. The slides 280 are mounted in the carriage upon a comb member 281 holding the slides against lateral displacement but permitting vertical sliding thereon. Each of the slides has a horizontal ear 282 at the lower end, as shown particularly in Figs. 13 and 16. It is seen from these figures that the upward movement of the tabulating arms 452 to 459 engages the slide thereabove, thereby moving such slide upwardly. If we refer to Fig. 16, it is obvious that elevation of the tabulating arm 462 (operated by the "2" key) will raise the leftmost slide, while depression of the 9 key would raise the slide 280 spaced 8 positions to the right.

The upper end of each slide 280 is pivotally connected to the left arm (as viewed in Fig. 12) of the three-armed lever 284 by any suitable means such as pin 283. The lever 284 is also mounted on the shaft 171, lying behind the latch member 170 and the selection segment 174. The operation of the slide by one of the tabulating arms lowers the right-hand nose 285 into a position to be engaged by the live pawl 240. The upper arm 286 of this lever is adapted to be engaged by the ear 187 on the selecton segment, upon restoration of the segments to their blank or normal position, thereby rotating the three-armed lever counter-clockwise and depressing the slide to normal position.

The slides 280 are provided with a pair of detent notches 287 with which are associated latches 288 pivoted on shaft 279 (shown in Fig. 24). The latches are pulled clockwise into latching position by a suitable spring 289. The latches may be provided with guides 291 to prevent lateral displacement with respect to their associated slides. A spring 290 attached to the three-armed lever 284 pulls the lever counter-clockwise and returns the slide 280 to normal position whenever the latch 288 is rocked counter-clockwise. The respective latches are held together by a tie bar 292, so that when any latch is rocked counter-clockwise by the raising of any slide 280 by its associated tabulating arm 452 to 459, all other latches are also rocked to release any previously set slide. Thus, whenever a new value is placed in the tabulating mechanism by any of the tabulating arms 462 to 469, any previously set arm 284 is returned to its inoperative position.

The shaft 233 upon which the bellcrank 232 (Fig. 9) is mounted extends from the bracket 230 rearwardly, the rearward end being journaled in bracket 246 (as shown in Fig. 4A). Adjacent the detent 256 an arm 250 is pinned to the shaft 233 (see Figs. 4A and 10). This arm carries a pin 251 which engages in a slot 252 in the wall 254 of the detent. Thus, the rocking of the bellcrank 232 (counter-clockwise in Fig. 9) causes the arm 250 to rock the detent 256 (clockwise in Fig. 10) out of engagement with all of the selection arms and holds the detent out of engagement as long as the tabulating mechanism is in operation. It follows, therefore, that upon initial depression of a numeral key, simultaneously with the multiple zero key 220, the respective selection arm 432 to 439 is raised to rock the bellcrank 170 and unlatch the respective selection segment 174. The segment rotates counter-clockwise (Fig. 12) until temporarily stopped by the upraised nose of the selection arm in question. However, as the detent is positively held out of engagement with the selection arm, the arm will immediately be returned to normal position by its spring 89 regardless of whether the operator holds the key depressed. Thereupon, the selection segment 174 will continue its rotation counter-clockwise until its nose 178 engages the elevated nose 470 of the zero selection arm.

At the extreme rearward end of the shaft 233 is pinned an arm 260 (Fig. 12). A link 261 is pivotally attached to the arm 260, as by a pin 262. The right-hand end of the link 261 (shown to the left of Fig. 6, which is a rear view of the mechanism) is provided with a slot 263 which embraces the pin 264 carried on arm 265. The arm 265 is pivotally mounted to the zero bellcrank 700 by means of pin 266. The upper end of the arm 265 is provided with a hook member 267 adapted to engage pin 133 fixed on cam 127. A tension spring 268 is mounted on the pin 264 and a pin 269 carried on link 261. Thus the rocking of shaft 233 (counter-clockwise in Fig. 9) causes movement of the link 261 to the left of the machine (to the right in Fig. 6). The spring 268 pulls the arm 265 until the tip of its hook 267 engages the pin 133. Thereafter, the cam is rotated (counter-clockwise in Fig. 6) by the solenoid, whereupon the hook portion 267 latches over the pin 133. When the cam returns (clockwise in Fig. 6), the hook 267, latched over the pin 133, raises the bellcrank 700. This clockwise rotation of the bellcrank 700 serves to rock the arm 80 (Figs. 5 and 6) and thereby release the "0" actuator arm 440 to automatically initiate the entry of another zero into the carriage. This automatic entry of the zero into the carriage continues until the tabulating mechanism is disengaged. Thus, the value entered in the selection segments and in the check dials will always be zero when a value key and the tabulating key 220 are simultaneously depressed.

This disengagement of the tabulating mechanism occurs as follows: the live pawl 240 engages the nose 285 of the three-armed lever one order before the selected positon. Movement of the carriage to the final position rocks the live pawl 240 counter-clockwise (as shown in Fig. 9), pivoting the pawl, and the arm 238 on which it is mounted, counter-clockwise. Such motion rocks the bellcrank 232 clockwise into position to become engaged by the latch 226. Such rocking of the bellcrank also rocks shaft 233, on which it is mounted, to return the detent 256 to its normal position to engage the noses of the selection arms and also pushes the link 261 to disengage the hook 267 from the pin 133 on cam 127. Thus, the entry of zeros into the selection segments and the step-by-step movement of the carriage to correspond thereto, is automatically terminated.

(f) Carriage clearing

Provision is made for clearing the register 619 and for erasing the value set in the selection mechanism (which also erases the value set in the check dials 201) by depression of a single key 370 (Fig. 1). The depression of this key operates two separate mechanisms, one for erasing values set in the selection mechanism and the second for initiating an operation to clear values accumulated in the accumulating mechanism and shown in the register 619. The first will now be described, while clearing of the accumulator will be described later in connection with the operation of the accumulating mechanism.

The clear key and its associated stem are essentially the same as those of the value keys. Preferably, the key 370 is mounted above and behind the zero key 400 on the keyboard while the clear key lever 371 lies to the left of the zero key lever 410 (Fig. 3). The up-raised forward end of the lever 371 carries a fixed stud 850, as shown in Fig. 3, which depresses the key slide 851 (shown in Fig. 22). This slide 851 operates the mechanism for clearing the register, which will be described hereafter.

The clear key lever 371 is pivotally mounted on the bar 60 and terminates (Figs. 4A and 8 to 12) in an upstanding ear 369 that underlies the long arm 257 which forms the extension of side 255 of the detent 256. Thus, depression of the clear key moves the detent to its releasing position and permits any selection arm then locked in a raised position to be returned to its normal position.

Simultaneously with the release of the selection levers by operation of the detent 256, the clearing mechanism operates to release the carriage rack 145 for return to its home, or blank, position by means of the spring 146. The mechanism for accomplishing this purpose is shown particularly in Fig. 8.

Adjacent the forward wall 231 of the bracket 229 (Fig. 8) the clear arm 371 is provided with a horizontal ear 373 which underlies a two-armed lever 375 rockably mounted on the bracket 231, as by pin 319.

A pin 376 on the left end, as viewed in Fig. 8, of the lever 375 engages a slot 377 in vertical link 378. The link 378 is pivotally secured to an h-shaped member 379 by means of pin 380. The h-shaped member 379 is rotatably mounted on the bracket 231 by means of pin 381. A spring 382, stretched between a pin 383 on the h-shaped member and stop pin 327 mounted on the bracket, pulls the h-shaped member counter-clockwise. Thus, the holding pawl 385 formed on the upper arm of the h-shaped member normally engages the rack 145 of the carriage. However, depression of the clear key rocks the clear key lever 371 to depress the forward end and raise the rearward end thereof. Raising the rearward end of the clear key lever 371 rocks the lever 375 (counter-clockwise in Fig. 8) which pulls the h-shaped member 379 clockwise to disengage the pawl 385 from the rack, thereby permitting the carriage to be pulled to the right to its home position by the spring 146.

We prefer to provide means for latching the h-shaped member in disengaging position, so that the clear key may be released immediately without terminating operation of the carriage clear mechanism. This is accomplished by means of a latch 388 which is rockably affixed to the bracket 231, such as by means of pin 389. The nose of the latch 388 is adapted to engage a pin 387 mounted on the upper arm of the h-shaped lever, when the h-shaped lever is rocked clockwise by depression of the clear key. The latch is pulled counter-clockwise by means of spring 390 tensioned between a pin 391 on the latch and the pivot pin 381. Thus, the h-shaped member is latched in disengaging position and the carriage can be returned to its home position by the spring even though the clear key is released.

The rack 145 is provided with an ear 147 which engages the latch 388 one space before reaching the home position of the carriage, whereby movement of the carriage to the home position pushes the latch off of the pin 387. Thereupon the spring 382 rocks the h-shaped member counter-clockwise to re-engage the pawl 385 with the rack 145.

It is necessary, also, to restore the selection segments 174 to their blank position, as part of the clearing operation. This is accomplished by operation of the clearing bail 186 (Figs. 12 to 15). The bail 186 is mounted on a rockable plate 517 (Fig. 15) rockably mounted on shaft 143. This bail is located adjacent the right side of the machine, and does not shift with the carriage. The bail itself, as shown in Fig. 14, extends only through the home position of the carriage, so that its operation will clear only those segments which lie to the right of the units order of the register. Such a bail is necessary in order to permit clearing of a single selection segment if that is desired, as will be explained hereafter.

The mechanism for initiating operation of the clearing bail 186 is shown in Figs. 13, 14 and 15. As shown in these figures, a longitudinal shaft 471 is journalled in suitable bearings in brackets 482 and 483 secured to the right side wall 213, to the right of the home position of the carriage. At the forward end of the shaft 471, as shown in Fig. 13, is pinned an arm 485 which is engageable by the right side wall 142 of the carriage. Engagement occurs one space before home position so that return of the carriage to its home position rocks the arm 485 and shaft 471 counter-clockwise in Fig. 13 (clockwise in Fig. 14).

The rear end of the shaft 471 (refer to Figs. 14 and 15) carries two arms, the first of which, arm 472, is pinned to the shaft 471. Immediately adjacent the pinned arm 472 is an arm 473 which is rockably mounted on the shaft. A latching member 474 is pinned to the lower end of the pinned arm 472 and is pulled upwardly (clockwise in Fig. 14) by a spring 475 tensioned between a pin 476 on the latch 474 and pin 477 on the rotatable arm 473. The arm 473 carries an ear 478 adapted to be engaged by the latch 474 when the pinned arm 472 is rocked (counter-clockwise in Fig. 14), when the carriage leaves its home position and permits the arm 485 to rock one space to the left when viewed from the front (e. g., Fig. 13). Thus with the insertion of the initial digit into the carriage, the carriage shifts one space to the left, permitting the arm 485 to follow it to rock the shaft 471 and the pinned arm 472 (counter-clockwise in Fig. 14). This pulls the latch 474 sufficiently far to enable it to engage the ear 478. When the carriage is returned to its home position, it rocks the arm 485, shaft 471, and the pinned arm 472 in the reverse direction. This then rocks the rotatably mounted arm 473 (clockwise in Fig. 14). The arm 473 is normally pulled counter-clockwise by a spring 479 tensioned between an ear 480 on the arm and crosspiece 481 of the mounting bracket 483.

The lower end of the loosely journalled arm 473 is provided with a latching nose 484 which underlies the switch actuating arm 490. The switch actuating arm is pivotally mounted on the supporting bracket 489, as by means of pin 491, and is pulled downwardly (clockwise in Fig. 15) by means of tension spring 492 stretched between a pin 493 on the switch actuating arm and a pin 494 on the bracket 489. Thus, the clockwise rocking of the pivotally mounted arm 473 (Fig. 14) releases the spring-powered switch-actuating arm 490. The switch-actuating arm 490 carries a stud 496 which engages the switch arm 497 pinned at 498 to the bracket 489. The switch arm 497 carries an insulating member 499 which engages the upper leaf 500 of a contact switch to press it against the lower leaf 501. The switch 500—501 is mounted on bracket 502 affixed to the base plate. The right-hand end (Fig. 15) of the switch arm 497 is provided with two detent depressions 503 which are engaged by the nose of a detent 504 pivotally journalled on the pin 494. The detent 504 is pulled into engagement with the detent depressions 503 in the switch arm by a tension spring 505.

A clearing solenoid 510 (Figs. 13 and 14), preferably of the rotary type previously mentioned, receives its power supply through the switch 500—501 and is thereby actuated when the switch is closed by the means previously described. The solenoid 510 is keyed to an actuating shaft 511 (Fig. 15). A three-armed lever 512 is rigidly affixed to the shaft 511 and is thereby rocked by the solenoid. One arm 513 of the three-armed lever is pivotally connected to a link 514, as by pin 515. The other end of the link 514 is pivotally mounted on the bail operating plate 517, as by pin 516. The plate 517 which carries the restoring bail 186, is rotatably mounted on shaft 143, as by means of hub 518. Rocking of the restoring bail 186 restores all selection segments 174 lying within the home position of the carriage back to the blank position (one space beyond 9).

A second arm 520 of the three-armed lever 512 is provided with an ear 521 which, upon rocking of the lever, lifts the switch actuating arm 490 to its normal (open) position, in which position it is held by the nose 484 of arm 473.

The third arm 524 of the three-armed lever carries an ear 525. When the shaft 511 and the lever 513 are rocked, the ear 525 will engage the extended upper arm 526 of the switch lever 497, thereby rocking the switch lever counter-clockwise to disengaged position.

The switch actuating arm 490 carries a pin 523 which, when the switch operating arm is allowed to drop, engages the ear 522 on the lower end of the latching arm 474. Thus, release of the switch actuating arm automatically disengages the latch 474 from the ear 478, permitting the pivotally mounted arm 473 to return to its normal position where it can latch the switch actuating arm upon its immediate return to raised position. It will be understood, as was the case of the solenoid operated bail for restoring the actuator arms 440 to 449, that practically simultaneously with the release of the switch actuating arm 490 the switch is closed to energize the solenoid 510 to rock the bail 186, and simultaneously relatch the switch actuating arm 490 in its raised position and to rock the switch arm 497 to open the switch. Thus, there is an instantaneous and single actuation of the restoring solenoid upon return of the carriage to the home position.

(g) Carriage return

We also provide means for causing the return of the carriage to its home, or blank, position without effecting the clearing of the registers. A preferred form is shown in the drawings, particularly in Figs. 30 and 8. A return clear key 350 is provided to initiate this operation. The key preferably is mounted on the inside of the left side plate 214 and rather close to the front of the machine. This puts the carriage return clear key in the lower left-hand corner of the machine, as shown in Fig. 1. The key 350 (see Fig. 30) is affixed to a conventional key stem 351 which is slidably mounted on the supporting plate by means of pin and slot connections 352. The key is normally maintained in its elevated position by means of a spring 353 tensioned between a stud on the frame plate and the lower part of the key stem. A stud 354 is riveted on the lower end of the key stem 351, in cooperative relationship with a lever 355 pinned to a transverse shaft 356, journalled in brackets 357 mounted on the base plate 35. The shaft 356 terminates in the interior of the machine, adjacent the bracket 229 (as shown in Fig. 8). On the interior end, the shaft 356 is provided with a horizontal arm 358 which is pinned to a link 359, the upper end of which is pinned to a two-armed lever 360 pivotally mounted on the bracket 229 by any suitable means, such as stud 361. Cooperating with the lever 360 is a pin 362 affixed to the link 378, heretofore described.

It follows that depression of the carriage return key 350 will rock the forward end of lever 355 downwardly, thereby elevating the rear end of the horizontal lever 358. The rocking of the lever 358 upwardly rocks the lever 360 clockwise, the right-hand end of which engages the stud 362 to depress the link 378. This action will rock the h-shaped lever 379 clockwise, disengaging the latch 385 from the carriage rack 145. This motion is sufficient to latch the h-shaped member in its clockwise position by means of latch 388 heretofore described. Result of this action, therefore, is to latch the h-shaped member in its clockwise position to permit the carriage to be returned to its home, or right-hand, position. Its return to this position will clear the carriage, i. e., restore the selection segments mounted therein to their blank position, as heretofore described.

*(h) Back spacing*

Provision is also made for back spacing the carriage a single step and restoring only the last selection segment set. This permits the correction of an error in the entry of a digit into the machine without completely erasing the other figures of the factor. Initiation of such a mechanism is by depression of a back space key 300 which, as shown in Fig. 1, may lie immediately below the value keys and to the right of the multiple zero, or tabulating, key 220. The key stem of the back space key 300 engages, when the key is depressed, an ear 302 on a two-armed lever 303, likewise pivotally mounted on bracket 222 (Figs. 2 and 3), as by pin 304. The left-hand end of the lever 303 underlies a back space lever 305 pivoted on the shaft 60. The lever 305 extends rearwardly to a position intermediate the bracket walls 230 and 231, as shown in Figs. 4A and 11. This lever 305 terminates in a bifurcated end 306 which embraces a pin 311 carried on the forward end of a two-armed lever 312 which is pinned, as at 313, to a forwardly extending ear 245 of the bracket 230. The other end of the lever 312 extends rearwardly to underlie the extended arm 257 of the detent 256, so that depression of the back space key, which lowers the rear end of lever 305, raises the arm 257 to move the detent to releasing position.

Depression of the back space key also operates to release the carriage for a single step toward the right. The mechanism for accomplishing this single step is shown in detail in Fig. 8. A bellcrank lever 320 is pivotally mounted on the pin 319. The right-hand end of the bellcrank lever carries an ear 321 which immediately underlies the arm 305, so that the bellcrank 321 is rocked (clockwise in Fig. 8) immediately upon depression of the back space key. The other arm 322 of the bellcrank extends upwardly, as shown. A Y-shaped member 323 is pivotally mounted on the bracket wall 231, as on stud 324. The lower arm of this three-armed lever 323 carries a pin 325 which lies against the upwardly extending arm 322 of the bellcrank, so that clockwise rotation of the bellcrank rocks the Y-shaped member counter-clockwise. The Y-shaped member 323 is normally pulled clockwise by a spring 326 tensioned between the stop pin 327 riveted to the bracket 231 and a pin 328 carried by the Y-shaped member.

The rightwardly extending arm of the Y crank carries a pin 329 which engages a slot 330 in a half-step pawl 331, which is pivoted to the bracket 231, as by stud 332. The pawl 331 has a nose 333 adapted to engage the rack 145 when the Y-shaped member is rocked counter-clockwise. This pawl 333 engages the rack teeth in the half-step position so that the pawl nose 333 engages the rack 145 approximately half way between adjacent teeth of the rack, immediately upon rocking of the Y-shaped member, after which the rack is released to travel a half step only toward the right before being stopped by the pawl 333.

The third, or leftwardly extending, arm of the Y-shaped member carries a pin 334 which lies in the slot 386 in the h-shaped member 379. Thus, the rocking of the Y-shaped member 323 also depresses the holding pawl 385 to permit the rack to move to the right until stopped by the half-step pawl 333. However, the slot 386 is so arranged that the holding pawl 385 cannot be depressed sufficiently to permit the latch 388 to engage the pin 387—that is, the motion imparted to the holding pawl 385 by the Y-shaped member 323 is only a portion of that imparted through depression of the clear key or carriage return key, in order that the pawl cannot be latched in disengaged position by the back spacing mechanism. When the back space key is released, the bellcrank 320 and the Y-shaped member 323 will return to their normal position, from the force of the spring 326. Such rocking of the Y-shaped member will withdraw the half-step pawl 333 from engagement with the rack and simultaneously re-engage the holding pawl 385 with the rack thereby limiting the motion of the carriage to a single step toward the right.

The operation of the Y-shaped member to permit the stepping of the carriage a single space to the right also operates to close the switch 500—501 to energize the clearing solenoid 510. As mentioned before, however, the clearing bail 186 extends only to those selection segments lying to the right of the center plate 38. Thus, the restoring bail 186 will restore only the one segment which has just been returned on space and will not effect restoration of those segments lying to the left thereof.

The mechanism by means of which the switch 500—501 is closed with each back stepping of the carriage is shown for the most part in Fig. 8. The pawl 331 carries a pin 335 which supports the left end of a link 340. The right end of the link 340 is pinned to the lever 485 (see Fig. 13) by any suitable means, such as stud 341.

A stud 343 is affixed to the left end of the link 340 and so positioned that when the Y-shaped member 323 is rocked counter-clockwise to raise pawl 331, the stud 343 engages one of the teeth of the rack 145. The movement of the carriage to the right will, therefore, push the link 340 to the right to rock the actuating arm 485 counter-clockwise. It would be understood that the first motion of the rack 145 to the right is only half a step, due to the positioning of the pawl 333, and such motion preferably will be insufficient to rock the arm 485 sufficiently to close the solenoid switch. However, when the back spacing key is released by the operator, the auxiliary pawl 333 is withdrawn from the rack 145 and simultaneously the holding pawl 385 moves into engagement with the rack, whereupon the rack moves another half step to the right. This latter step completes the rocking of the arm 485 sufficiently to close the solenoid switch 500—501.

The release of the auxiliary pawl 333 will not cause disengagement of the pin 343 of link 340 from the teeth of the rack 385. The half step movement of the carriage and rack will have pushed the link 340 to the right (in Fig. 8) half an ordinal spacing, thereby rocking arm 485 (Fig. 13) and shaft 471. This movement forces arms 472 and 473 (Fig. 14) against the tension of spring 479. This spring pressure will be sufficient to hold the stud 343 in engagement with the teeth of rack 145. Release of the auxiliary pawl and the further movement of the rack to the right until blocked by holding pawl 385, and the subsequent closing of the solenoid switch, operates to drop latch 474, whereby arm 472 becomes disengaged from arm 473. Spring 479, which always exerts a force against arm 473, will thereupon have no effect upon arm 472, so that shaft 471 on which it is mounted rocks freely. The free rocking of shaft 471 permits the pin 343 and link 340 to become disengaged from the teeth of the rack. The link 340 is gently urged counter-clockwise by a light tension spring 342 stretched between the right end of the link and the pin 324. The link 340 will therefore drop to disengage the pin 343 from the rack 145 as soon as the link 340 and arm 472 are free from restraint of spring 479.

Thus, with each back spacing of one order the segment restoring bail is actuated to restore to blank position the segment which has just returned to the home position of the carriage (i. e., the segment for the first order of the factor is as it appeared before such back spacing). However, those segments, and their associated check dials, which lie to the left of the first order are not affected by such operation.

DIGITATION

Digitation in the present machine is controlled by depression of a plus or minus key to either add or subtract the figure set in the carriage by the selecting mechanism just described. Depression of either of these keys will set the various control mechanisms and initiate digitation, after which the racks and carriage are restored to their original positions. Specifically, depression of either key sets the following controls:

(a) Engages either the plus or minus gears with the driving gear.

(b) Disengages the gear detents.

(c) Disengages all sensing arms from the step cams, thereby rotating all dials to blank position.

(d) Drops selection plate latches in those orders engaged by the carriage to enter the value set on the selection segments into the machine.

(e) Closes the main motor switch.

(f) Operates the clutch dog to engage the clutch and permit the driving motor to operate the digitation mechanism.

(g) The main motor then drives all of the actuating, or value entering, racks to positions determined by the selection mechanism, thereby entering the values locked in the selection plates into the accumulator step cams.

(h) During the same cycle of operation the motor operates the mechanism to disengage the gears, simultaneously allowing the control slides to return to their neutral position. The return of the control slides to neutral position: (1) re-engages the detents with the gears, thereby locking them in adjusted position, (2) re-enables the sensing mechanism to record values accumulated in the accumulator cams on the register dials, (3) conditions the selection plate latches for relatching them in operative position, (4) conditions the clutch for disengagement and the motor switch for opening, at full cycle position.

(i) The main motor then actuates a restoring bail to return the selection plates to their home (latched) position and (j) Simultaneously releases the carriage for return to its home position and consequent clearing of values contained therein. The same operation also restores all transfer racks which had been released during digitation to their proper position.

(k) Thereafter the drive mechanism completes its cycle, which opens the clutch and opens the main motor switch.

The plus key 540 and the minus key 550 are shown in Fig. 1 as lying to the right of the keyboard. It is obvious the exact location is not critical as these keys can be placed in any convenient location. These keys are mounted upon key stems 50 (see Fig. 17) which preferably are identical with those related to the value entering keys. The keys are maintained in their elevated position by the springs 56. A plus key slide 541 underlies the stem of the plus key 540, and is mounted for vertical sliding movement by any suitable means, such as pin and slot connections 545, upon a bracket 544 affixed to the base 212. The slide is maintained in its elevated position by means of a spring 546 tensioned between a pin 547 on an upstanding ear on the bracket and a pin 548 mounted on the toe of the slide. The slide carries a pin 542 adapted to engage the cam face 543 of the plus-minus slide 554 after a short movement of the key stem. The plus-minus slide 554 is mounted for substantially horizontal movement on the bracket 544 by any suitable means, such as slots 555 which encompass pins 556.

Similarly the minus key 550 is mounted on a similar key stem, which engages a minus slide 551 slidably mounted on the bracket 544. The minus slide 551 carries a pin 552 which is adapted to engage, after slight motion of the slide, the camming face 553 of plus-minus slide 554. It is obvious, from the side view of the slide, shown in Fig. 17, that depression of the plus key 540 pushes the plus-minus slide 554 toward the rear while depression of the minus key pushes that slide toward the front of the machine.

The various control mechanisms required for securing the sequential steps previously mentioned are actuated by a pair of setting slides, such as 578 mounted on the right-hand side of the center supporting plate 215 (Fig. 21) and 593 mounted on the left-hand side of the left-hand supporting plate 214 (Fig. 22). These two slides directly control the sequential operation of the digitation mechanism for entry of a value into the accumulator. A pair of similar setting slides 901 and 902 control the same sequence of operations for digitation in the grand totalizer. The two pairs of setting slides can be operated in unison (either for like or unlike operation) or either can be operated alone.

The machine of the present invention is designed for use as a duplex calculating machine, i. e. one in which totals can be accumulated in two registers with the clearing of either selectively. In the present machine duplexing can be secured simultaneously in the accumulator register and in the grand total register, or by the "delayed" method in which totals are accumulated in the accumulator first and then transferred into the grand total register. It is believed simpler to first describe the operation of the accumulator register completely and then describe the duplexing mechanism and grand total register, and their cooperation with the accumulator register.

The rearward end of the plus-minus slide is provided with a slot 557 (Fig. 17) which embraces a pin 561 on the arm 560. The arm 560 is pinned or otherwise rigidly secured to the transverse quill shaft 562. The quill shaft 562 encloses a solid shaft 563, both shafts extending transversely of the machine to the left-hand side plate. An arm 570 (see Fig. 30) is rigidly mounted on the left end of the quill shaft 562. The lower end of the arm 570 is pinned to a link 571 by any suitable means such as pin 572. This link 571 is adjustable to either a lower or raised position, being set by a clear control lever 960 which is pivotally mounted on the left-hand side frame by any suitable means such as pin 961. The lever 960 carries a pin 962 on a small projection, or toe, which pin is embraced with a slot 963 in the link 571. The lower forward edge of the link 571 is provided with a slot 964 which is adapted to engage a pin 965 mounted on the lower end of arm 966, when the forward end of the link is lowered (as shown in Fig. 30). The arm 966 is pinned to a shaft 977. The upper rearward edge of the link 571 is provided with a slot 968 adapted to engage when the rear end of the link is in raised position, the pin 969 mounted on the lower end of arm 970, which in turn is pinned to the cross shaft 907. It will be apparent that when the clearing control lever 960 is in its forward position (the counterclockwise position shown in Fig. 30) the link 571 will be lowered so that slot 964 engages the pin 965, and the arm 966 will therefore rock simultaneously with the rocking of arm 570. On the other hand, if the control lever 960 is in its backward position (clockwise of that shown in Fig. 30) then the slot 968 will engage the pin 969 and the arm 970 will rock simultaneously with the arm 570.

The pin 965 carried by the arm 966 is also utilized to carry a link 971, the forward end of which is pinned to an arm 972 by any suitable means, such as stud 574. The arm 972 is pinned to the solid shaft 563 so that whenever the clear control lever 960 is in its forward position, the arm 966 is linked to both arms 570 and 972 and both shafts 562 and 563 rock in unison. The right-hand end of shaft 563 (as shown in Fig. 17) carries an arm 974 rigidly mounted thereon. This arm 974 has a slot 975 which engages a pin 976 on the forward end of link 565. The other, or rearward end, of the link 565 (as is shown in Fig. 18) carries a pin 566 which is journalled in the slot 567 in the arm 568 pinned, or otherwise rigidly secured, to the shaft 569. The shaft 569 extends transversely from the right-hand plate 213 to the center plate 215 (as shown in Fig. 28).

Adjacent the center plate 215, as is shown in Fig. 19, the shaft 569 carries an arm 575 pinned, or otherwise rigidly mounted, thereon. The free end of the arm 575 has a slot 576, embracing the pin 577 on the setting slide 578 which is slidably mounted on the center supporting plate 215. The mounting for the setting slide is shown more in detail in Fig. 21 and comprises a plurality of slots 579 which encompass screws, or studs, 580 attached to the central supporting plate 215. The slide is normally held in its central, or inoperative position by a pair of opposed springs 581 and 582 which are tensioned between the middle supporting stud 580 and studs 583 and 584, respectively, affixed to the slide 578.

The short shaft 977 (Fig. 30), on which is mounted the arm 966, extends through the left-hand supporting plate as is shown in Fig. 22. An arm 590 is pinned to this end of the shaft 977, on the outside of the left supporting plate 214. This arm has a slot 592 which engages a pin 591 on the forward end of the left-hand setting slide 593. The left-hand setting slide 593 is also normally held in a central, or inoperative position by a pair of opposed springs, as shown. This plate is also slidably supported on screws or studs 594 which cooperate with slots 595 in the slide.

The two setting slides (578 mounted on the center supporting plate and 593 mounted on the left-hand supporting plate) are, therefore, operated in unison by the plus-minus slide 554, assuming, of course, that lever 960 is in its forward position. Both setting slides are supported for longitudinal sliding movement on their supporting plates, and both are normally held by yieldable means in a central, inoperative position. It is obvious from Fig. 22 that the setting slide 593, mounted on the left-hand plate 214 is moved from the lever 590 mounted at the lower and forward end thereof. The setting slide 578, mounted on the center supporting plate 215, on the other hand is actuated by the lever 575 which is at the back and rear of the slide. Although these two slides derive their motion from different shafts and different arms, their component parts are so constructed and arranged that the two slides, which are quite similar in form and size are always in alignment and always move simultaneously at the same velocity.

*(a) Plus or minus gear engagement*

The two setting slides 578 and 593 (Figs. 21 and 22) are provided with identical flat, somewhat U-shaped slots 636 having a raised center portion 644 and a downwardly turned notch 643 at each end, as shown. Supported in their apertures 636 are two parallel gear shafts 757 and 758 which are maintained in spaced relationship by links 755 (Fig. 21).

Figure 21:
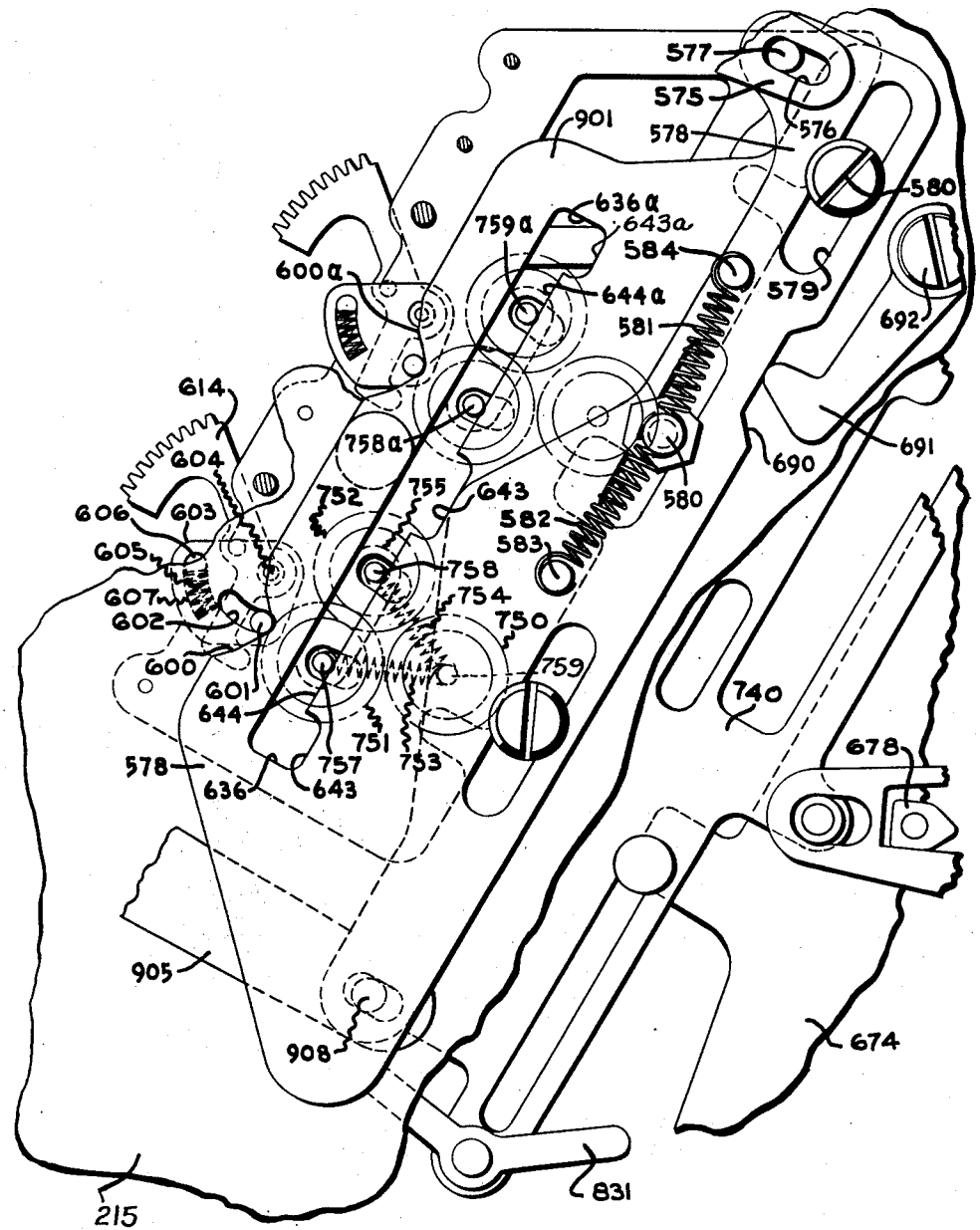
Fig. 21 is a right side view of the accumulator setting slides mounted on the central supporting plate, taken along the vertical longitudinal plane indicated by the line 21—21 of Fig. 28.

Referring now to Fig. 25 it will be seen that rotatably mounted on the shafts 757 and 758 are the plus gears 751 and minus gear 752, respectively, which are held in constant engagement with each other by the links 755 (Fig. 21). It will be understood that there is a plus gear 751 and a minus gear 752, as well as a drive gear 750, for each order of the register. In their normal position the shafts 757 and 758 are in the central or raised portion 644 of the U-shaped aperture and the gears 751 and 752 are disengaged from the drive gear 750 rotatably mounted on a suitable shaft 759. The gears 751 and 752 are yieldably urged into engagement with drive gear 750, as by spring 753 tensioned between shafts 757 and 759 and spring 754 tensioned between shafts 758 and 759 (see Fig. 21). Thus if the setting slides 578 and 593 are moved rearwardly, the plus gear 751 will drop into engagement with the driving gear 750, as the shaft 757 is permitted to drop into the lower depression 643 of the aperture 636. Conversely if the slide is moved forwardly, the shaft 758 can drop into the upper depressions of the slots, thereby engaging the minus gear 752 with the driving gear 750. By this means the plus or minus gearing is engaged with the driving gear upon the first motion of the setting slides resulting from depression of either the plus or minus key. In this connection, it can be noted here that the dropping of either shaft 757 or 758 into the notches 643 locks the setting slides 578 or 593 in an operative position. Thus, digitation will continue to completion even though the operating control key 549 or 550 be released. The slides are automatically unlatched when the gears are positively disengaged, as hereafter explained.

(b) *Gear detents*

The plus and minus gearing, as shown in Fig. 25, is normally locked against rotation by means of a detent 611 mounted on the shaft 604. The detent 611 has a nose 612 adapted to engage between the teeth of gear 751 and at the other end is provided with a nose 610 adapted to become engaged by movement of bail 606 as hereinafter described. The detent 611 is normally held in gear engaging position by the torsion spring 613. Means will hereafter be described for rocking bail 606 in timed relation to the digitation cycle. For the present, it can be noted that the bail is rocked (to the right in Fig. 25) practically simultaneously with the engagement of the plus or minus gear and rocked in a reverse direction as the gears are later disengaged.

(c) *Value sensing (register)*

A step cam 756 is rigidly secured to the plus gear 751, as shown in Fig. 25. This cam has 10 steps corresponding to the values 9 to 1, and zero. This cam serves as the actual accumulator and values are accumulated thereon. The register serves merely as an indicator which senses and displays the values so accumulated on the step cam 756.

The dials 621 of the accumulator register 619, as shown in Fig. 25, are preferably of crescent, or arcuate, shape displaying the values zero to 9 and having an eleventh or blank position. The dials are loosely mounted on a common shaft 620. A gear segment 618 is rigidly secured to each dial. The dials are positioned by a sensing member 614 pivotally mounted on the shaft 604. The sensing member comprises a rocker arm having a nose 616 engaging the step cam 756 and at the other end a gear segment 617 engaging the gear segment 618. The sensing member is normally pulled counter-clockwise by a tension spring 615 as shown.

Referring now to Figs. 21 and 22 it will be seen that the setting slides 578 and 593 have similar camming depressions 600 on their upper edges. Associated with each of these depressions is a pin 601 mounted on rockable plates 603 (one associated with each slide). These plates are rotatably mounted on the shaft 604 on the side of the supporting plate opposite that of the associated slide, the pin extending through a slot 602 in the supporting plate. Each of the rockable plates 603 has an arcuate slot 607 in which is mounted the opposite ends of a common bail 606 extending across the register mechanism. The bail 606 is yieldably held in the slots 607 by a suitable compression spring 605, as shown in Fig. 21.

Thus, the second effect of movement of the setting slides 578 and 593 is to rock the rockable plate 603 (clockwise in Fig. 21) to rock the bail 606 to first engage the detent 611 and disengage it from the gear 751 and immediately thereafter to rock the sensing member 614 to return the register dials 621 to the blank position.

(d) *Release of selection plates*

Movement of the setting slide 593 simultaneously releases the selection plates 670 (Figs. 12, 24 and 27) of those orders in which the values have been set, thereby setting the mechanism for the differential actuation of the respective plus gears 751. The mechanism by which this is accomplished is shown in Fig. 22. The lower edge of the setting slide, or plate, 593 is provided with a camming depression 630 in which sets the nose 631 of a selection plate latch disengaging arm 632. This arm is pivotally mounted on a stud 633 riveted or otherwise affixed to the left side supporting plate 214. The free, or upper, end of the arm is provided with a pin 634 which engages a slot in the link 635. The link 635 is pivotally mounted on a pin 638 carried by a bail operating arm 639. The link 635 is pulled clockwise by a spring 636 tensioned between a pin 637 on the upper end of the link and a pin 868 carried by the lever 632. The bail operating arm 639 is pivotally mounted on the supporting plate 214, as by screw 640, and carries a bail 641 (which is also shown in Figs. 12 and 24). The sides of the depression 630 are sufficiently long to cam the selector plate latch disengaging arm 632 counterclockwise and hold it in that position so long as the setting slide is held in an operative position. It is obvious that counter-clockwise rotaton of the arm 632 also causes counter-clockwise rotation of the bail operating arm 639 and rocking of the bail 641, both of which are held in adjusted position during digitation (i. e. so long as the setting slide is in its operative position).

Each selection plate 670, of which there is one for each order of the register, is supported by a pair of rollers 672 operating in a race way 673 in the adjacent separator plates 674 (see Fig. 27). It can be noted that the various orders of the accumulator are separated by a plurality of separator plates 674 rigidly mounted in the accumulator section of the machine by any suitable means such as spacing bars 680 and 681 (see Fig. 28). The lower edge of the selection plates 670 is provided with a plurality of steps 671 which are adapted to be engaged by the nose 180 of the subjacent selection segment 174. The selection plate 670 is formed with an upstanding arm on which is mounted a stud 676. A strong tension spring 675 has one end secured to the stud 676 and the other to a pin 679 mounted on the separator plate 674. Thus, the plate is always under spring tension to the rear (right in Fig. 27), and unless latched in a forward position will move to the rear to a position determined by the nose 180 of the selection segment.

The selection plate 670 also carries a fulcrum 678 pivotally mounted thereon, as by pin 677. Movement of the selection plate 670 positions the fulcrum member 678 in a slot 738 of actuator lever member 737 for the purposes hereinafter mentioned. Such position is of course determined by the engagement of one of the steps 671 with the nose 180 of the subjacent selection segment 174.

It will be noted from Figs. 24 and 27 that the forward end of the slot 738 is enlarged as shown at 738a. It is obvious that the forward end of the lever 737 will be rocked differential amounts depending upon the location of the fulcrum 678 in the slot 738. In those instances when no value is to be entered in an order of the register it will be necessary to prevent rocking of the forward end of the lever 737. This is done by the enlargement 738a which permits the lever to rock, from the rocking of the bail 735, about the pivot point 741—the enlargement 738a being designed to permit such rocking without the sides of the slots 738 engaging the fulcrum when in the "0" position. As the selection plate 670 moves to the right to the value of "1," the fulcrum will have passed into the lower portion of the slot where the sides of the fulcrum 678 are engaged by the sides of the slot 738, whereby the fulcrum operates to provide differential rocking of the forward end of the lever 737.

The selection plates 670 are normally held in their forward position by a latching member 660 pivotally mounted on the cross shaft 662 (see Figs. 12 and 24). The latch is pulled in a counterclockwise direction about its pivot point by spring 663 tensioned between a pin 666 on the latch and a pin 654 mounted on the separator plate. Thus the nose 665 of the latch 660 normally latches on the leftmost step of the selection plate 670 and holds it in its leftmost position. The pin 666 is also adapted to be engaged by the disengaging arm 650 under certain conditions.

The disengaging arm 650 is pivotally mounted on the bail 641. The disengaging arm is urged in a clockwise direction by means of spring 653 tensioned between the pin 654 on the supporting plate and a pin 656 on the arm. The nose 651 of the arm is normally pulled by the spring 653 to a position below the pin 666 on the latch member. However, as the carriage moves to the left, its spacing comb 179 cams the superposed disengaging arms 650 upwardly, whereby the hook end 651 thereof engages the pin 666 on the latch. Thereafter, when the plus or minus key is depressed, the setting plate, or slide, 593 operates as hereinbefore described to rock the bail 641, which in turn pulls the disengaging arm 650 to the left (as shown in Figs. 12 and 24). Such motion of the arm 650 disengages the latch 660 from selection plate 670, permitting the plate to be spring-pulled to the right until one of the steps 671 thereon engages, and is stopped by, the nose 180 of the subjacent selection segment.

(e) Motor operation

The setting of the control mechanisms abovementioned occurs almost simultaneously during the first part of the movement of the setting slides 578 and 593, i. e. during the first part of the depression of the plus or the minus key. The further depression of such key causes closing of the motor switch, thereby energizing the motor to operate the digitation mechanism. This mechanism is shown in Figs. 18, 19 and 28.

It will be recalled that depression of a plus or minus key causes a longitudinal translation of the setting slides 578 and 593. The first portion of such translation is utilized to effect the setting of the control mechanisms as above-mentioned. In addition to the other controls which it actuates, the slide 578 (Fig. 21), after a movement sufficient to set the various control mechanisms, initiates closing of the motor switch and the engagement of the clutch. The upper end of the slide 578 is provided with a relatively long depression 690 (Figs. 19 and 21), the sloping ends of which serve as camming faces to rock the two-armed lever 691. This lever is pivotally mounted on the center supporting plate 215, as by pin 692. Referring to Fig. 19, it is seen that the free end of the lever 691 engages a stud 693 on an arm 694, which is pinned to the shaft 695. The shaft 695 extends from the center supporting plate to the right supporting plate (as shown in Fig. 28). Referring now to Fig. 18, it is seen that the right-hand end of the shaft 695 carries a bell-crank 696 rigidly mounted thereon. The upper end of the bell-crank carries a stud 697 riveted thereto. The stud is adapted to engage the arm 698 of a suitable switch 699. Thus, longitudinal movement of the slide 578 rocks the bellcrank 696 (counterclockwise in Fig. 18) to close the switch 699, and thereby energize the motor 718.

(f) Clutch engagement

The clutch 713 is engaged almost simultaneously, but slightly later than, the energizing of the motor. The clutch engaging mechanism is also shown in Fig. 18. A link 710 is pivotally connected to the second arm of the bellcrank 696 and to a two-armed lever, or clutch pawl, 711. This lever is rockably mounted on the supporting plate by any suitable means, such as screw 708. The bellcrank 696 and the two-armed lever 711 are normally rocked clockwise by a tension spring 709, as shown. The free end of the lever 711 serves as a pawl to engage the clutch dog 712 of a clutch 713 of conventional construction. The clutch mechanism need not be described as such clutches are well known in the art. It can be noted, however, that normally the spring 709 pulls the clutch pawl 711 into a position to block the dog 712, and thereby disengage the clutch. Whenever the bellcrank 696 is rocked against the tension of the spring 709 to close the switch to the motor, it also serves to disengage the clutch pawl from the clutch dog. Such disengagement permits a clutch spring 714 to pull the clutch dog 712 into engagement with ratchet 715 mounted on the driving shaft, thereby engaging the clutch to drive the actuator shaft 726. Preferably the clutch is provided with means for positively maintaining the clutch engaged for a full cycle and then permitting disengagement at the end of the cycle. One such means is shown, i. e. a roller 716 mounted on the pawl 711 lies in a depression 717 in the periphery of the clutch plate when the clutch is in normal, or full cycle position. When the clutch is engaged, the turning of the plate cams the roller, and thus the pawl, into its disengaging position until the clutch returns to its full cycle position.

The motor drive is shown particularly in Figs. 28 and 29. The motor 718 is connected by means of a slip clutch 719, or other drive connection, to the horizontal shaft 720. The gear 721 mounted on the outer end of the shaft engages a gear 722 on the vertical shaft 723. The shaft 723 is suitably journalled in brackets 727, as shown. A worm 724 mounted on the shaft 723 engages a gear 725 which is keyed to the driving ratchet 715 of the clutch (see Fig. 18). A horizontal shaft 726 connects the driven side of the clutch 712 with the actuating mechanism to be described hereafter.

(g) Digitation

The drive shaft 726 extends transversely across the machine from the right to the left side plates. Adjacent the center and left side plates (Figs. 27 and 22 respectively) pairs of complementary cams 730 are pinned to the shaft. Each of these pairs of complementary cams is engaged by a pair of complementary cam follower rollers 731 and 732 mounted on a bellcrank 733. The bellcranks are pivotally mounted on their respective supporting plates, as by screw, 734. The outer ends of the bellcranks support a common bail 735 which extends across the machine between the left-hand and the center plates, the bail operating through arcuate slots 736 in the separating plates 674. It is obvious with each revolution of the shaft 726, the bail 735 will be rocked downwardly through a path of constant length and then rocked back to its starting position. The complementary cams are designed to provide a dwell at the end of the downstroke, and also to provide for harmonic motion of the cam followers 733 and bail 735 during both strokes. The dwell at the bottom of the down stroke is quite long, in order to provide a period sufficiently long to disengage the register gearing and to set various controls (e. g. in clearing) before starting the return stroke. Thus, the down stroke can be utilized for the entry of values into the register, after which the gears are disengaged and the return stroke of the bail 735 has no effect upon the registering mechanism.

A plurality of slotted levers 737 (one for each order of the register) are pivotally mounted on the bail 735. A slot 738 of this lever engages the fulcrum 678 mounted on the associated selection plate 670. It will be recalled that the selection plates, when the latches 650 are released in the early part of the operation of the setting slides, are pulled to the rear (right in Fig. 27) by the springs 675 until the plates are stopped by the noses of the corresponding selection segments 174. Such movement of the plates 670 positions the fulcrum 678 in positions corresponding to the value selected. Such adjustment of each fulcrum 678 causes a differential reciprocation of the forward end of the associated lever 737 from the constant rocking of bail 735. This differential reciprocation is utilized to impart a differential rotation to the associated driving gear 750. To accomplish this purpose the free (i. e. forward) end of the lever 737 is provided with a slot 739 which engages a roller 741 on a slide 740. It will be understood that there is a slide for each order of the register.

It will be seen by referring to Fig. 24 that each slide 740 is mounted for longitudinal reciprocation on a separator plate 674 by means of slots 742 engaging pins 743 attached to the separator plate. Slidably mounted on each slide are a number of racks 744, one for each register in the machine. In the embodiment shown and described herein there are three such registers: the accumulator 619, the grand totalizer 900, and the multiplier register, or counter 1039. In order to put the registers conveniently close together it is preferable that the racks 744 be placed alternately on the opposite sides of the slides 740, as shown in Fig. 24. Each of the racks 744 is mounted on a pair of broad headed pins or rivets 746, secured to slide 740, which are engaged by slots 745 in the racks (see also Fig. 25). These slots are relatively short, there being at least one on each rack only long enough to permit the racks to move one unit space relative to the slide. The racks are spring-urged to the rear (to the right in Figs. 24 and 25) by means of a spring 747 tensioned between the rack 744 and the slide 740, as shown. The racks 744, however, are normally locked against movement relative to the slide 740 by means of a notch 748 engaging the tens carry detent, or latch, 827. As shown in Fig. 25, the gear 750 is constantly in engagement with the rack 744, so that differential reciprocation of the slide and rack imparts a differential oscillation to the gear 750 about its supporting shaft 759. It will be recalled that prior to energizing the motor 718, the plus gear 751 or the minus gear 752 are dropped to engagement with the driving gear 750. The gears 751 and 752 are constantly in mesh, so that the engagement of either with idler gear 750 connects the accumulator cam 755 to the rack 744. Thus, the down stroke of the bail 735 results in differential rotation of the gear 750 with the consequent entry of such rotation, additively or subtractively depending upon which gear is in engagement therewith, into the accumulator cam 755. While the slide and rack are returned to their normal position by the return stroke of the bail 735, with consequent counter-rotation of gear 750, such return does not effect the accumulator gears 751 or 752 as they will have been disengaged from gear 750 before such return stroke begins.

(h) Gear disengagement

It will be recalled that the complementary cams 730 are so constructed as to provide a dwell at the end of the down stroke of the bail 735. This dwell is utilized, in a digitation cycle, to permit disengagement of the plus or minus gears 751 or 752 from the driving gears 750. Such gear disengagement permits the setting slides to return to their neutral position, which in turn causes locking of the plus-minus gears against rotation, sensing the new values on the accumulator cams and otherwise conditioning the control mechanism for a new cycle of operation. The mechanism for disengaging the accumulator gears is shown in Fig. 22.

A cam 770 is mounted on each end of the drive shaft 726, in the embodiment shown in Fig. 22 being located between the supporting plate and the complementary cams 730. Associated with each cam 770 is a cam follower arm 771 which is loosely journalled on the screw 772 mounted on the adjacent supporting plate 214, or 215. The cams 770 are so positioned on the shaft 726 that the nose of the cams engages the follower arm immediately following the beginning of the dwell on the complementary cams 730. Also pivotally mounted on the screw 772 is a second lever arm 773. The two arms 771 and 773 are connected by a spring 774 tensioned between their respective ears 780 and 781, so as to provide a yieldable connection for moving arm 773 counterclockwise when the cam follower arm 771 is rocked by the rise of cam 770. The second lever 773 is provided with a bifurcated lower end 775 which engages a pin 776 on a T-shaped slide 777. The slide 777 is provided with a pair of slots 778 which engage supporting pins, such as 580 or 894. The perpendicular free end 779 of the T-shaped slide underlies the U-shaped slot 636 of the setting slides 578 and 593, as well as similar slots in the setting plates for the grand totalizer and counter hereinafter described. It will be recalled that the two shafts 757 and 758, on which the plus gear 751 and minus gear 752 are respectively mounted, are held in this slot 636. Thus, rotation of the cam 770 and the consequent rocking of the follower arm 771 causes a forward translation of the T-shaped slide 777 to lift the shafts 757 or 758 out of the corresponding depression 643, thereby disengaging the plus-minus gears from the drive gear 750.

It was previously mentioned that the setting slides are locked in their adjusted position by the shafts 757 or 758 dropping into the corresponding depression 643. Thus, the disengagement of the register gears by the raising of the shafts 757 or 758 automatically unlocks the setting slides and permits them to be returned to their central, or neutral, position by means of the centralizing springs 581 and 582.

Return of the slides to their center, or neutral, position permits the pins 601 (Fig. 21) to drop into the camming depression 600 on the upper edge of the slides, thereby rocking bail 606 out of engagement with the gear detents 611 and the sensing arms 614. The detents and sensing arms are returned by their respective springs 613 and 615 (Fig. 25) to operative position. The detent, of course, will become seated between adjacent gear teeth to lock the accumulating gears against rotation. The sensing arm 614, on the other hand, will rotate counter-clockwise until its nose 616 engages one of the steps of the accumulator cam 756, thus registering on the dial 621 the new value accumulated in the accumulator cam.

Similarly, the return of the setting slide 593 to its neutral position permits the cam nose 631 (Fig. 22) of the lever 632 to become seated in the bottom of the depression 630, thereby returning the selection plate latch disengaging bail 641 to its neutral position. Return of the latch disengaging bail 641 to its neutral position conditions the latches 660 to re-engage the slides 670 when the latter are restored to their normal, inactive position. The hook 650 will continue to engage the stud 666, but rocking of the bail 641 will rock hook 650 counter-clockwise. This rocking of hook 650 permits latch 660 to be pulled by its spring 663 counter-clockwise to its plate engaging position.

After the dwell, caused by the shape of the complementary cams 730, the bail 735 is rocked back to its raised position (Fig. 27). This return of bail 735 returns the slotted lever 737 and the slide 740 to their neutral, or normal position. Such return movement of the slide, however, has no effect on the register as the gears have been disengaged during the slight dwell.

(i) *Selection plate return*

Rotation of the drive shaft 726 also operates to reciprocate a plate restoring bail 799 (Figs. 22 and 27) to return the selection plates 670 to their normal position. The mechanism for accomplishing this reciprocation of the bail 799 is shown in Fig. 22. A second cam 790 is mounted adjacent each end of the drive shaft 726, in the drawings being shown as lying between the complementary cams 730 and the gear disengaging cams 770. Cam follower arms 791 are also pivotally mounted on screws 772. A link 792 is pivotally mounted on the lower end of each bail restoring arm 791 by any suitable means, such as pin 793. Each link 792 is also rockably connected, as by pin 795, to a lever 794 which is pivoted to the supporting plate, as by pin 800. The upper or free end of each lever 794 is rotatably connected, as by pin 798, to a link 797—the bail 799 being carried by these links 797. A spring 796 tensioned between the pin 795 and the left side supporting plate pulls the levers 794 counterclockwise to normally keep the bail 799 in its extreme disengaged position and to also pull the follower arms 791 clockwise to engage the cam 790. Thus the selection plates 670 are restored to normal immediately after the plus or minus gears 751 or 752 have been disengaged and the bail 641 has moved to allow latches 660 to return to their operative position.

(j) *Automatic carriage return*

It is not only necessary to restore the selection plates 670 to their normal position, it also is necessary to restore the carriage to its home position and thereby also operate the clearing solenoid to restore the selection segments to their home position to erase any values set therein. This operation can be accomplished from the operation of the clearing bail 799. A preferred form of construction is to provide the lever 794 (Fig. 22) with a roller 810 extending through an arcuate slot 809 in the adjacent supporting plate 214. Movement of the lever 794 and its roller 810 operates to rock a bellcrank lever 811 rotatably mounted on the left end of the shaft 183, on which is mounted the segment detent 182 (Fig. 24).

In normal operation the rocking of the bellcrank 811 will operate to rock the shaft 183 on which it is rotatably mounted. The mechanism for this is shown in Fig. 30. An arm 930 is pinned or otherwise rigidly secured to the shaft 183, and located immediately adjacent the loosely mounted arm 811, as shown. The upper arm of the bellcrank 811 carries a pusher bar 931 which is pinned thereto by any suitable means, such as pin 932. The pusher 931 is normally urged clockwise by a suitable spring 933 tensioned between the pusher plate 931 and the bellcrank 811. The right-hand end of the pusher 931 has a notch 934 which cooperates with a pin or stud 935 on the arm 930. Thus, in normal operation the rocking of the clearing bail lever 794 will rock the bellcrank 811 (clockwise in Fig. 30), and the pusher 931, being in latching position, will also rock the arm 930 and shaft 183 in the same direction. The rocking of shaft 183 will rock the segment detent 182 (Fig. 12) away from the selection slides 174, thereby releasing them for free movement. Rocking of shaft 183 also operates to release the carriage as hereinafter described.

It will be understood that in repeat operations such as in multiplication, it will be necessary to disengage the pusher 931 from the arm 930, in order to prevent carriage return. The mechanism for this purpose will be described in connection with the repeat controls hereafter described.

Referring now to Figs. 8 and 24, it will be seen that the shaft 183 is provided with a depending arm 812, which is pinned thereon adjacent the carriage releasing mechanism heretofore described. The arm 812 is pivotally connected by any suitable means, such as pin 806, to an intermediate point of a link 813. In effect this connection causes the link to operate also as a two-armed lever pinned at 806, as shown in Fig. 24. The rearward end 805 of the lever 813 is attached to mechanism hereinafter to be described which, in some operations, will rock the lever 813 counterclockwise. The forward end of the lever 813 is provided with a stud 809 which is adapted to engage a centralizing slot 808 formed in the lower end of a lever 815. The lever 815 is pivotally mounted by any suitable means such as pin 814 on a bracket 816 extending from bracket 231. The upper portion of the lever 815 is shaped as a cam 817 to engage and lift the tail 392 of the h-shaped member 379 to latch the holding pawl 385 in disengaging position. The link 813 is normally held in its elevated position, with pin 809 embraced within the slot 808 of arm 815, by any suitable means such as spring 807 tensioned between the pin 809 on the link 813 and the pin 814. Normally, therefore, the rocking of the segment detent 182 by means of the mechanism described and shown will rock the lever 815 clockwise to lift arm 392 of the h-shaped member and thereby latch the holding pawl in disengaged position. When this happens, the carriage will be returned to its home position and the clearing solenoid will be operated to erase the values in the segments 174 as heretofore described. As mentioned above, however, there are occasions on which it is necessary to disengage the lever 813 from the cam lever 815 so that rocking of the segment detent 182 will not operate to restore the carriage to its home position, such as in back transferring hereinafter described.

Before the drive shaft 726 completes its single cycle of operation, it also actuates mechanism to restore the tens-carry devices to their set position, as will be described in detail under the heading of "Tens carry."

(k) Termination of cycle

It has already been mentioned that the clutch is preferably of a form which positively locks itself against disengagement before the end of a cycle, as in the form shown in Fig. 18. The form shown comprises a depression 717 in the periphery of the clutch plate, in which is seated the clutch pawl roller 716 when the clutch is in disengaged position. As the clutch plate rotates, the roller engages the periphery of the clutch plate, and thereby, prevents disengagement of the clutch.

It will be seen by referring to Fig. 19 that when the setting slide 578 returns to its neutral position, the nose of the two-armed lever 691 will lie in the center portion of the depression 690. The lever 691 will, therefore, rock to a position in which the clutch can become disengaged and the motor deenergized. Such movement of the slide and lever merely conditions the switch mechanism and clutch for opening movement, as actual motion of these parts is prevented by the roller on the clutch pawl holding the switch-engaging arm and the clutch pawl in their rotated positions. However, as soon as the clutch has completed a full cycle and returns to its full-cycle position, the roller 716 will again drop into the depression 717, thereby, disengaging the clutch and opening the motor switch.

TENS CARRY

A simple and positive tens-carry, which is best shown in Fig. 25, is provided for the registration mechanism. A single tens-carry tooth 760 is rigidly connected to each plus gear 751 and a similar carry tooth 761 is rigidly secured to each minus gear 752. The "plus" carry tooth 760, when the plus gear is in engagement with the drive gear 750, and when the cam 756 passes from the 9 to 0 position, engages the nose 822 of a carry lever 820 rockably mounted on the adjacent separator plate, as by pin 818. Similarly the "minus" carry tooth 761, when the minus gear is in engagement with the drive gear 750 and the accumulator cam 756 passes from 0 to 9 position, engages the nose 823 of a minus carry lever 821, also rockably mounted on the adjacent separator plate, as by pin 819. Preferably the minus carry lever 821 is provided with a nose 824 which engages a projection 825 on the plus carry lever 820. Thus, when a negative-carry lever 821 is rocked (counterclockwise in Fig. 25) it rocks the positive-carry lever clockwise. The nose and projection, respectively, serve also as stops for the two carry levers.

The lower end of the plus-carry lever 820 is provided with an ear 826 which extends over to the next higher order, and is adapted to engage the tens-carry pawl 827 mounted on the slide 740 of such next higher order. The pawls 827 are rockably mounted on the slide 740, as by stud 767, and normally the nose of each pawl engages the depression 748 in the digitation rack 744. The pawl 827 is rocked clockwise to hold it in engagement with the depression 748 by any suitable means, such as torsion spring 828. At least one of the slots 745 in the digitation rack 744 is of a length to permit the spring 747 to pull the rack one, and only one, additional tooth space when the pawl is disengaged from the rack. Thus, the tripping of the carry levers 820 or 821 by their respective teeth disengages the pawl 827 and permits the spring 747 to pull the rack one additional step (to the right in Figs. 25 and 24) to enter or subtract an additional digit as the case may be.

The means herein provided for the carry of tens is positive in its operation, and although the tens-carry operates during digitation it is impossible for the additional value to be lost.

The tens-carry mechanism is restored to its normal position by means of a bail 830 (Figs. 23 and 24) which is rocked during the operative stroke of bail 799 to restore the selection plates to their latched position.

Referring first to Fig. 24 it will be seen that the bail 830 engages the lower arm of a rocker 831, which is pivoted to the slide 740, as by pin 832. It will be understood that there is a rocker and related mechanism, for each order of the machine, all of which will be operated in unison by the common bail 830. The upper end of each rocker is pinned to a tens-restoring slide 833, as by pin 839. The slides 833 are provided with an ear 834 adapted to engage each rack 744 and return it to its normal forward position. Upon such rocking the pawls 827 again become seated in the depressions 748 in the racks, thereby holding them in their normal position. The tens-restoring slide 833 is mounted on the slide 740 by suitable pin and slot connections 837, and is normally pulled upwardly by a tension spring 838.

The mechanism for rocking the bail 830 is best shown in Fig. 23. The ends of the bail 830 are mounted in arms 835 which are pivoted on the screws 840. The arms 835 carry a strong spring member 836 which is formed to lie perpendicular to the plane of the arm. The springs 836 are engaged by cam follower arms 791 which activate the plate restoring bail 799. Thus, oscillation of the follower arm 791 serves to simultaneously restore the selection plates to their normal position and to restore the carry mechanisms to their normal position.

GRAND TOTALIZER REGISTER

The machine of the present invention is particularly adapted for use as a duplex machine. By "duplex" we mean a machine which has a plurality of totalizers. We show two such totalizers, or registers: the first of which is herein generally called the "accumulator" 619 while the second is herein generally called the "grand totalizer" 900. It will be obvious that, with our mechanism for registers and actuators, as many registers could be added as might be desirable. Generally speaking such a machine need contain only two such registers; the accumulator in which answers of particular problems, such as the product of a multiplication, can be accumulated; and a grand totalizer in which the answers of a number of such problems can be accumulated in a grand total. Machines have heretofore been known in which the accumulator and the grand totalizer may be operated simultaneously, with separate clearing devices, so that the value in the accumulator can be cleared at the end of a particular problem (the answer remaining in the grand totalizer and the answer of the next problem being superimposed thereon). Other duplex machines have been known in which totals were accumulated in the accumulator and at the termination of a problem, the answer transferred into the grand totalizer with the clearing of the accumulator. The mechanism of our invention adapts itself particularly well to both types of duplexing so that, at the election of the operator, grand totals can be accumulated simultaneously in the grand totalizer with their accumulation in the accumulator, or can be accumulated only in the accumulator and then transferred to the grand totalizer with the clearing of the accumulator.

(a) Operation of grand totalizer

The grand totalizer 900 is, as shown in Fig. 1, preferably placed immediately above the accumulator 619. The construction of the grand totalizer register is identical in all respects with that of the accumulator 619. It derives differential rotation from a drive gear 750a which in turn is driven by a rack 744 heretofore described. Preferably the racks 744 will be placed on the opposite sides of the selection plates 740, relative to the racks serving the accumulator, as is shown in Fig. 24. This permits decreasing the spacing between registers, as the actuating racks 744 can overlap insofar as their lengthwise extension on the slide 740 is concerned. This alternate spacing will require that the plus-minus gears and sensing cam be reversed, as is shown in Fig. 24 in connection with cam 756 and 756a. It is believed obvious that the operation of the register 900 will in all respects be similar to that of the accumulator 619, it deriving differential rotation from the differential movement of slide 740 as explained in connection with the operation of the accumulator.

In our preferred form the grand totalizer can be selectively disconnected from the slides 740 so that digitation can take place only in the accumulator 619; or it can be operated simultaneously with the accumulator, in either the same or opposite sign from the accumulator. That is, values can be added to the grand totalizer, or subtracted therefrom, simultaneously with the addition to or subtraction from a like value from the accumulator, or the operation of the grand totalizer can be reversed with respect to that of the accumulator, so that a value will be subtracted from the grand totalizer while being added to the accumulator, or vice versa. Such selective operation necessitates that the plus-minus shafts 757a and 758a (the shafts on which the plus-minus gears are mounted) be positioned by separate setting slides and not by the slides 593 and 578 which control the operation of the accumulator. These slides are shown particularly in Figs. 21 and 22. As shown in Fig. 21 the totalizer setting slide 901 is mounted on pins 580 immediately adjacent the setting slide 578. The slide 901 is similarly provided with a flat generally U-shaped aperture 636a having a central elevated portion 644a with deeper depression 643a at the end thereof. The aperture 636a operates to control the engagement of the plus-minus gears of the grand total register with the driving gear 750a in the same manner as the aperture 636 controls the engagement of the plus-minus gears in the accumulator. Similarly a second grand totalizer setting plate 902 (Fig. 22) is mounted on pins 594, on the left side of the left side plate immediately adjacent the accumulator setting plate 593. It also is centralized by springs 581a and 582a connected to pins on the slide and to a pin 904 on which the T slide 777 is mounted. These springs serve to centralize both setting slides, as the two slides must move together at all times.

The operation of the two slides 901 and 902 is controlled respectively by two arms 905 and 906, which are pinned or otherwise rigidly secured to a common shaft 907 journaled in the left and center frame plates. The two arms 905 and 906 have pin-and-slot connections 908 with their respective slides, as shown in these two figures. Thus, the two setting plates 901 and 902 are moved simultaneously from rocking of the shaft 907.

(b) Simultaneous duplexing

The mechanism for controlling the rocking of shaft 907 is shown principally in Fig. 23. It comprises an arm 910 which is likewise pinned, or keyed, to the shaft 907. The free end of the arm 910 is pinned to a link 911 by any suitable means such as rivet 912. The link 911 is provided with an intermediate slot 913 and its forward end is provided with a pin 914.

The arm 590, previously described in connection with the actuation of setting slide 593 has an integral arm 917 which is bent back upon itself in U shape. The bent over portion 917 is extended back past the axis of the shaft 977, as shown. The bent over extension is provided with an arcuate slot 915 and an intersecting slot 916 radial thereto. It will be apparent that if the pin 914 lies at the intersection of the two slots 915 and 916 rocking of the shaft 977 and the arm 590 can operate to impart no movement to the link 911 and arm 910. In this position any movement of link 911 is impossible as the pin 914 is not only axially aligned with the shaft 977 but it can move freely in the radial slot 916. In this position, the grand totalizer 900 will remain inactive during digitation in the accumulator 619.

In certain operations the shaft 907 may be rocked by operation of the plus or minus keys. When this occurs, and the pin 914 lies at the intersection of the slots 915 and 916, the pin 914 will move in the slot 916, and thus prevent rocking of shaft 977 and arm 590.

However, if the link is rocked clockwise from the center position, so that the pin 914 lies in the lower part of the slot 915, then rocking of shaft 977 and arm 590 will cause a simultaneous rocking of arm 910, and in the same direction as arm 590. In this position the arms 590 and 910 are, in effect, pinned together to operate in unison and operate the slides 901 and 902 not only simultaneously with, but in the same direction as the setting slides 578 and 583. In this situation the two registers, the accumulator register 619 and the grand totalizer register 900, will be operated in unison and with the same sign character (that is, the amount set in the carriage will either be added to both or subtracted from both).

If, on the other hand, the link 911 is rocked counterclockwise so that the pin 914 lies in the upper part of the slot 915, then the arms 590 and 910 will be connected by the link 911 on opposite sides of the axis of rotation of arms 590 and 910, so that clockwise rocking of arm 590 will cause counterclockwise rocking of arm 910. In such a condition, the operation of the grand totalizer 900, while simultaneous with that of the accumulator 619, will be of an opposite sign character. That is, if an amount is added into the accumulator, it will be subtracted from the grand totalizer.

The link 911 is positioned by means of a duplex registration control lever 920 which extends through the casing 32, and preferably is mounted on the left side of the left frame plate as shown in Fig. 1. This control lever 920 is preferably pivotally mounted on the shaft 997, and is provided with an arm 921 which carries a pin 922 lying within the slot 913 previously mentioned. Thus rocking of the lever 920 toward the front of the machine (clockwise in Fig. 23) lowers the link 911 so that the pin 914 lies within the lower part of slot 915, and like registration is secured in both registers; while rocking of the lever toward the rear of the machine (counter-clockwise in Fig. 23) raises the link 911 so that the pin 914 lies within the upper part of the slot 915 and unlike registration is secured. When the lever 920 is in its central or intermediate position, the pin 914 lies at the intersection of the slots 915 and 916 and there is no simultaneous registration. The lever 920 is held in any adjusted position by means of a detent 923 pinned to the frame plate, as at 924. The detent is provided with notches 925 which engage pin 926 on lever 920. The assembly is held in either adjusted position by any yieldable means such as spring 927.

It has been mentioned that with the machine of the present invention it is possible also to transfer values accumulated in the accumulator into the grand total register. This operation includes the clearing of the accumulator and will therefore be explained subsequent to the description of the register clearing mechanism and control. For the present it can be mentioned that a value accumulated in either accumulator 619 or the totalizer 900 can be transferred to the other register and simultaneously transferred into the selection mechanism.

REPEAT MECHANISM

The machine of the present invention preferably has a repeat mechanism, by which is meant a machine that disables the carriage return at the end of an operating cycle so that the value in the carriage will be retained in the adjusted position to reinsert the same value into the machine a multiplicity of times. The repeat mechanism is shown particularly in Fig. 30. It comprises a lever 940 pivotally mounted on the inside of the left-hand supporting plate 214 by any suitable means, such as screw 941. The lever 940 is located toward the front of the machine, as shown in Fig. 1. This lever has two operating positions: the rearward position shown in Fig. 30 in which it is inoperative to block carriage return, and a forward, or active, position in which the carriage return is disabled. The lever is held in either adjusted position by means of a detent 942 pinned to the supporting plate by any suitable means, such as pin 943. The detent is urged in a counter-clockwise position by a suitable spring 944, and is provided with suitable detent notches 939 cooperating with pin 938 on the lever.

A long link 945 is pinned to the lower end of the repeat lever by any suitable means, such as pin 946. The link 945 extends longitudinally through the machine, the rear end being supported by a bellcrank 947 to which the link is pinned by any suitable means, such as pin 948. The bellcrank 947 is pivotally supported at the rear of the supporting plate 214, as by pin 949. An upwardly extending link 1026 also is pinned to the other arm of the bellcrank 947 as by pin 1027. This latter link is used to control the counter-actuating mechanism, as will be hereafter described.

Associated with the link 945 is a bellcrank 950, rotatably mounted on the left-hand supporting plate 214 by any suitable means such as stud 951. A slot 952 in the vertical arm of the bellcrank lever embraces a pin 953 in the link. Thus, the forward movement of the link 945 (resulting from the movement of the lever 940 to its active forward position) rocks the bellcrank 950 in a clockwise direction. A pin 954 in the end of the horizontal arm of the bellcrank engages the upper surface of the push rod 931, to the left of its pivoting pin 932. Thus, the clockwise rotation of the bellcrank 950 rocks the pusher arm 931 counter-clockwise to lift the notch 934 off of the pin 935. In this condition the clockwise rocking of the bellcrank 911, which occurs during plate restoration at the end of the digitation cycle, is inoperative to rock fixed arm 930 and shaft 183. It will be recalled that the rocking of shaft 183 caused the disengagement of the carriage holding pawl and the release of the carriage for return to its home position. By the mechanism described, rocking of the lever 940 to its forward position breaks the connection between the restoring mechanism and the carriage return mechanism so that the carirage is held by its holding pawl in its adjusted position, with its value selection segments still retaining the value previously set therein.

REGISTER CLEARING

It will be recalled that depression of the clear key 370 operates to restore the carriage to its home position, which in turn causes operation of the restoring solenoid and consequent oscillation of the bail 186 for restoring the selection segments 174 to normal position. Such operation erases values from the selection mechanism. It is also desirable to clear the values accumulated in the registering mechanism at the same time. The theory of the clearing operation is to run the values accumulated in the accumulator cam to zero by the automatic subtraction of the number then accumulated therein. The clearing key must, therefore, automatically operate the mechanism which sets a value in the selection plates corresponding to the values in the accumulator dials, and concurrent therewith automatically subtract the values so set. The mechanism utilized for this operation is shown in Figs. 22 and 23, and for the most part utilizes the value entering mechanism heretofore described.

It can be mentioned that clearing of both the accumulator 619 and grand totalizer 900 is identical. For sake of simplicity, therefore, the clearing operation will be described in relation to the accumulator. It will be understood that the clearing of the grand totalizer will be accomplished in the same manner, by merely setting the proper controls as will be mentioned later.

It will be recalled that the clear key lever 371 carries an elongated pin 850 which engages the upper portion of a key slide 851 mounted on the center supporting plate (as shown in Fig. 22). The slide is provided with slots 852 which engage the studs 853 mounted on the supporting plate. A tension spring 855, one end of which is pinned to the supporting plate and the other to the foot of the slide, normally holds the key slide in a raised position. A stud 854 on the lower end of the key slide immediately overlies an arm 860 which is rigidly secured to transverse shaft 861 that extends to the left through the left side supporting plate 214. A two-armed lever 862 is mounted at the left end of the shaft 861 (see Fig. 23). The lower arm of lever 862 is provided with a slot 863 engaging pin 864 on the clearing slide 865.

The clearing slide 865 is mounted for longitudinal movement by means of slots 866 engaging suitable pins such as 633. The upper end (left-hand end as viewed in Fig. 23) of the slide 865 terminates in an ear 867 lying adjacent the pin 637 on the link 635 which connects the selector plate latch disengaging arm 632 to the bail lever 639. The parts are so designed that depression of the clear key immediately causes translation of the slide 865 to the left sufficient to rock the link 635 counterclockwise to disengage the pin 634 carried by the selector plate latch disengaging arm 632 from the slot in the link. Thus, the subsequent operation of the plus-minus slide, as hereinafter described, will fail to release the selector plate latches, the release of such latches being timed differently in the clearing of values from the register.

The slide 865 carries a perpendicular arm 869 on which is mounted a pin 870 engaged by the latch arm 871. The arm 871 is pivotally mounted on the supporting plate 214 by any suitable means such as pin 875. A spring 873 tensioned between the arm 871 and a pin 872 pulls the arm 871 in a counter-clockwise direction. The free end of the lever 871 is provided with a notch 874 which is adapted to latch under the pin 870, thereby locking the slide 865 in operative position until the clearing operation is completed.

The outer end of the perpendicular arm 869 carries a pin 876 adapted to cooperate with the camming face 845 of the lever 842 which is pivotally mounted on cam follower 840 (see Fig. 22) by any suitable means, such as pin 843. The cam follower 840 is pivotally mounted on the supporting plate by any suitable means such as stud 841. A spring 844 (Fig. 23) tensioned between an ear on the lever 842 and a pin on the side plate 214 normally pulls the lever 842 in a clockwise direction and holds the cam follower 840 against cam 770. However, the translation of the slide 865 causes the pin 876 to engage the camming face 845 of the lever to rotate the lever 842 counter-clockwise against the force of its spring 844. Such counter-clockwise rocking of the lever 842 causes a slot 846 formed therein to engage the pin 642 on a two-armed lever 646, also pivoted on screw 640. The two-armed levers 646, one adjacent each of the left-hand and the center supporting plates 214 and 215, carry a common bail 647 which, when the levers are rocked, engage the tails of the latches 660 (Figs. 12 and 24), thereby releasing all of the selection plates in the machine. Thus, the latch bail 647 is conditioned so as to be unaffected by movement of the setting slides but to be actuated later in the cycle when the cam follower 840 is rocked by the cam 770.

The upper arm of the two-armed lever 862 (see Fig. 23) forms an ear 890 which is adapted to engage either the slot 891 of link 892 or slot 893 of link 894 (Fig. 30). The links 892 and 894 are pinned to slides 895 and 896, respectively. The two links 892 and 894 are urged towards each other by a suitable spring 897 tensioned between them. The two links are positioned by the pin 962 mounted on the clear control lever 960, heretofore described. Thus, if the lever 960 is in its forward position, both links will be rocked counter-clockwise so that the ear 890 will engage the slot 893 of the upper lever 894, while if the clear control lever is rocked to the rear (clockwise from the position shown in Fig. 30), the links will be rocked clockwise and the ear 890 will engage in the slot 891 of the lower lever 892. The two slides 895 and 896 are mounted for longitudinal movement by suitable pin-and-slot connections 898 as shown.

Forward movement of slide 895 will cam a transverse comb 980 (also shown in Fig. 24). This comb 980 lies immediately in front of the arm 829 of the negative tens-carry levers of the grand totalizer. Movement of the slide 895 forwardly and downwardly conditions the comb 980 to block rocking of the minus tens-carry levers when the noses of those levers are engaged by the single carry teeth of the minus gears. Similarly the slide 896, on its forward and downward movement, cams the comb 981 (see also Figs. 24 and 25) to block rocking of the minus levers 821 when the noses 823 of those levers are engaged by the single teeth 761 of the minus gears in the accumulator.

Associated with the key slide 851 (Fig. 22) is a slide 880 similar in construction to the slide 554 underlying the plus and minus keys. The slide 880 is mounted for longitudinal movement on the center supporting plate by means of slots 881 therein which embrace pins 882 on the supporting plate. The key slide 851 carries a pin 856 which is adapted to engage the camming face 883 of the slide 880 after a short travel of the key slide and subsequent to the rocking of the arm 860, shaft 861 and the movement of the slide 865. The cam face 883 is similar to the minus cam face 553 on the plus-minus slide 554. The slide 880 is connected by a suitable pin and slot connection 884 to an arm 885 which is likewise pinned on the quill shaft 562. Thus, depression of the clear key, subsequent to the conditioning of the control mechanisms above-mentioned, rotates the control shafts 563 and 562 to move the setting slides in a negative direction and engage the digitation mechanisms in the same manner as if the minus key had been depressed. Such movement of the setting slide, as heretofore described, will engage the minus gear 752 with the drive gear 750, release the gear detents, disengage the sensing arms and close the motor switch and engage the clutch. As previously mentioned, translation of the setting slides cannot trip the selection plate latches at this time.

As the selection plates 670 are maintained in their latched, or inoperative, position, the down stroke of the common bail 735 will be ineffective to shift the actuator slides 740. However, there is a prolonged dwell at the end of the down stroke of the common bail 735, caused by the shape of the cams. During this period of dwell, the cam 770 rocks the follower 840 to shift the link 842, thereby rocking the levers 646 to operate the selector plate latch disengaging bail 647. The selector plates are, therefore, free to travel (to the right in Figs. 12 and 24) under the force of their respective springs 675. The travel of these plates, as the bail 735 is temporarily in its lowermost position, will move the fulcrum members 678 to raise the left end of the slotted levers 737. As the left end of the slide 737 is raised by the travel of the selection plate 670, the slides 740 are moved rearwardly carrying with them the racks 744 to rotate the driving gear 750 and the minus gear 752 until such time as the tens-carry tooth 761 on the minus gear engages the tens-carry lever 821. As the tens-carry lever is locked against rotation by the comb 981, rotation of the gears 752 and 750 is effectively stopped, thereby stopping the travel of the slide 740. This upward movement of the slides 740 has erased the values from the accumulator cams 756 and stopped the gears in the zero position. Immediately thereafter, the cams 770 and 790 engage their respective follower arms 771 and 791 to return the various mechanisms to their normal position.

By the means described the value accumulated in the accumulator cams has automatically been subtracted therefrom to return the cams to their zero positions and completely clear the register. In addition, the follower arm 791 strikes the ear 877 on the latching member 871, thereby disengaging it from the pin 870, permitting the slide 865 to return to its normal position. The machine is then clear and ready for further operation.

Depression of the clear key will operate, by means of the mechanism just described, to erase the values out of either the accumulator or the grand total register depending upon the setting of the clear control lever 960. If the lever is in its forward position, the accumulator register will be cleared, but there will be no clearing of the grand totalizer. On the other hand, if the lever is in its rearward position, the mechanism just described will be set to clear the grand totalizer, but will not effect operation of the accumulator. Normally, during a clearing operation the digitation control lever 920 will be in its neutral position, which disengages the setting slides of the accumulator from those of the grand totalizer. It is impossible in the mechanism just described to block tens-carry in both registers, as values are usually different in the two registers and jamming of the mechanism would occur if both could be set to clear at the same time. For this reason, when it is desired to clear either register, but not to transfer the value therein into the other, the digitation control key 920 will be in its neutral or central position. The only time when both registers will be cleared, will be when the digitation control lever 920 is set in its forward position (for like registration in both registers) and the values in both registers are identical. In this situation the clearing of one register would automatically clear the other. Normally, however, if the digitation control lever is in either of the operative positions, the value cleared out of one register will be transferred into the other either additively or subtractively depending upon the position of the lever 920. This operation is generally called "back transferring," and comprises the transposing of the value in one register into the other during the clearing operation of the former.

BACK TRANSFER

*(a) From accumulator register into grand totalizer (sometimes called "delayed duplexing")*

In the machine of our invention, clearing can occur in any register simultaneously with the transfer of the value cleared from that register to another, or from that register into the carriage. In the event a value is accumulated in the accumulator, and it is desired to transfer such value into the grand total register, the digitation control lever 920 is set to either like or unlike registration. The clear control lever 960 is then set to its forward position, which connects the accumulator with the clearing mechanism just described, and the clear key depressed. This operates the clearing mechanism to erase the values standing in the accumulator. The movement of the slide 740 which results from the clearing operation will also operate the register of the grand totalizer, as the setting slides of the two registers have been connected by the setting of lever 920. If the lever 920 has been set in its forward position, the value erased from the accumulator will be subtracted from the value standing in the grand totalizer, but if the lever has been set to its rearward position the value will be added in the grand totalizer.

Similarly, if it is desired to transfer a value from the grand totalizer into the accumulator, the clearing control lever 960 is set to its rearward position which connects the grand totalizer register with the clearing mechanism. Thereafter, depression of the clearing key will clear the value from the grand totalizer and in so doing will transpose the value either additively or subtractively into the accumulator.

As both registers receive their differential actuation from the same slide 740, it is clear that the movement of this slide during the clearing operation of either register can readily be utilized to either add or subtract the same value in the other register by selectively controlling which of gears 751 or 752 are permitted to engage the drive gear 750.

*(b) Back transfer from either register into the carriage*

In the present machine it is a rather simple matter to transfer a value from either register, or even from the counter hereinafter described, into the internal carriage. This is often desirable in problems of the nature of $a \times b \times c$, or where it is desired to multiply the sum of a number of factors such as $(a+b+c) \times d$. This operation is also associated with the clearing of the register as heretofore described. It has already been explained how the clearing of a register causes the unlatching of the selection slides 670, which are permitted to move rearward (to the right in Fig. 24) until stopped in a position corresponding to the differential movement of the drive gear of that order. Thus, in order to transfer a value from a register into the internal carriage it is only necessary to set the segments 174 of the carriage in a differential position corresponding to the position of the selection slides 670. This is done by a back transfer mechanism which comprises a back transfer lever 990 preferably located in the lower left-hand corner of the machine, as shown in Fig. 1. The lever (as shown in Fig. 30) is pinned to the left-hand supporting plate by a suitable screw 991 and is held in either of its two positions by means of a detent 992 pivoted on shaft 563 and pulled into latching engagement with pin 993 on lever 990 by any suitable means, such as spring 994. The lever 990 carries a pin 995 which is embraced in slot 996 in the repeat link 945. Pulling the back transfer lever 990 forward from its inoperative position (the clockwise position shown in Fig. 30) operates to pull the link 945 forward, thereby rocking the bellcrank 950 clockwise, and rocking the pusher arm 931 counter-clockwise to disengage the arm 930 from the arm 811. The result of this disengagement is to break the connection between the restoring lever 794 and the carriage releasing mechanism heretofore described in connection with the "repeat" operation.

A longitudinally arranged link 1000 is pivotally connected to the lower end of the back transfer lever 990 and also to an arm 1001 integral with bail 1004, which is pivotally mounted on shaft 183. The bail or gate 1004 extends to the right of the selection plate latch 182 as is shown in Figs. 12 and 24. An arm 1005 (Fig. 24) integral with the right-hand end of the gate 1004 extends upwardly to a point above the detent 182 and terminates in a short ear 1006 (see also Fig. 8) so positioned to lock movement of any selection segment lying immediately to the right of the detent 182 in the 9 position. Thus, simultaneously with the disengagement of the carriage releasing mechanism from the restoring mechanism, movement of the back transfer lever sets the gate 1004 and the ear 1006 in a position to block each selection segment in the 9 position immediately prior to the shifting of the carriage. Thus, when the carriage is shifted to the left, the selection segments 174 are blocked in the 9 position and in the movement from under the ear 1006 pass upon the long value holding bail 182 in the same value position.

A second arm 1007 of the gate 1004, extends to the rear, and has rockably pinned thereto a link 1008, which is also pinned to the right-hand end 805 of the link 813. It will be recalled that this link normally operates, on rocking of the shaft 183, to release the carriage for return to its home position. Thus, movement of the link 1000 operates not only to set the ear 1006, but to disengage the carriage return mechanism from the shaft 183 so that subsequent rocking of the shaft 183 and detent 182 will be ineffective to shift the carriage to its home position.

Following the setting of the back transfer lever in its forward or operative position the carriage must be shifted from its home position to the left so that the various selection segments 174 will underlie the selection slides 670. This is done by inserting a plurality of zeroes, either manually or automatically through the operation of the multiple zero mechanism heretofore described. As soon as the carriage has been shifted sufficiently to the left, the clearing key is depressed. Depression of the clearing key will operate to clear the values from the selected register and to cause the positioning of the selection plates 670 as heretofore described.

The link 1000 carries a pin 1009 which cooperates with the camming face 1010 of a rockable link 1011. The link 1011 is rockably mounted, as by pin 1012, on the lower end of a two-armed lever 1013 which is pivotally mounted on the left-hand supporting plate by any suitable means, such as stud 1014. The rockable link 1011 has a hook-shaped member 1015 formed on its rear end, which is adapted to latch over a pin 1016 affixed to the lower end of lever 1017. The lever 1017 is pinned, or otherwise rigidly secured, to the shaft 183. The link 1011 is normally pulled to a disengaged position (counter-clockwise in Fig. 30) by any suitable means such as spring 1018 tensioned between the link 1011 and the two-armed lever 1013, as shown. The upper end of the two-armed lever 1013 is provided with a slot 1019 which embraces a pin 1020 which is riveted or otherwise affixed to the two-armed cam follower 1021 mounted on the other side of the supporting plate, as is shown in Fig. 23. A suitable slot 1024 in the plate permits the stud 1020 to extend through the plate and engage the slot 1019.

The cam follower lever 1021 is mounted on the left side of the left-hand supporting plate by any suitable means such as stud 1022. The nose 1025 on the cam follower 1021 engages a cam 1023 mounted on the drive shaft 726. The force of the spring 1018 normally pulls the two-armed lever 1013 (counter-clockwise in Fig. 30 and clockwise in Fig. 23) to keep the nose 1025 of the cam follower in contact with the cam 1023. The rise in the cam 1023 is so located that it engages the nose 1025 immediately after the selection plates 670 have been released and have completed their movement toward the rear of the machine. The engagement of the rise of the cam with the nose of the cam follower rocks the latter (clockwise in Fig. 23) which rocks the two-armed lever 1013 (clockwise in Fig. 30). As the link 1011 has been rocked clockwise to engage the pin 1016, the rocking of the cam follower and lever 1013 operate to pull the arm 1017 clockwise. This arm is pinned to the shaft 183 and therefore rocks the shaft to disengage the long selection segment latch 182 for a period sufficiently long to permit the selection segments thus released to rise until stopped by the selection slides 670. At this point the selection segments 174 have assumed differential positions corresponding to the position of the respective slides 670, which in turn correspond to the value erased from the corresponding order of the register being cleared. As the setting of the back transfer lever has rocked the connecting link 813, (counter-clockwise in Fig. 24) the rocking of the shaft 183 is ineffective to rock the lever 815 to release the carriage for return to its home position. Therefore the carriage is locked in its adjusted position and the values in the various selection segments are the values which have been cleared from the register in question. By this means a value can be transferred from either of the registers into the selection mechanism and thereafter used as desired by the operator.

The clockwise rotation of the cam follower 1021 also serves to restore the back transfer lever 990 to its inoperative position simultaneous with the clockwise rocking of shaft 183 (Fig. 30). For this purpose, a stud or pin 1028 is provided on the link 1000 for translation therewith to the right upon operative manipulation of the back transfer lever 990. It will be evident that this movement of the link 1000 positions the stud 1020 for engagement by the lever 1013 when rocked clockwise by the cam follower 1021. As the lever 1013 is so rocked, the hook 1015 of the link 1011 is held in engagement with the pin 1016 by the pin 1009. Therefore the back transfer lever 990 and the arm 1005 (Figs. 24 and 30) are restored to their inactive position as the shaft 183 is rocked clockwise to release the segment latch 182.

COUNTER

Preferably the machine of our invention is provided with an item counter. The counter can be used for either making a count of the items in addition and subtraction operations, or can be used as a multiplier register in multiplication. The mechanism for the counter is shown particularly in Figs. 23, 24, 30, 31, 32, 33 and 34. In our preferred construction the item counter can be set in a neutral or non-registering position, or to count positively or negatively to give either a true item count or the complement thereof, respectively. Preferably, operation of the counter is controlled from a suitable control lever 1040 which is mounted in any suitable place, preferably on the right-hand side of the center supporting plate, as shown in Figs. 1 and 31. This lever 1040 has four positions, the rearward (or positive) position, a neutral (or disengaged) position, a forward (or negative) position, and an extreme forward position (for clearing) as will be described hereafter. The counter setting lever 1040 is mounted on a shaft 1041 that extends between the left-hand and center supporting plates, the lever being pinned or keyed to the shaft. As shown in Fig. 31, this lever is preferably formed with two integral arms, forward arm 1042, used in connection with clearing of the counter register, and an upper or vertically extending arm 1043. A bellcrank 1044 is pinned or otherwise rigidly secured to the left-hand end of shaft 1041 (see Fig. 23). The bellcrank 1044 has a forwardly extending arm and an upwardy extending arm which are similar in size and shape (being right and left-hand images of each other) of the arms 1042 and 1043 on the lever 1040.

The lever 1040 is held in either of its first three adjusted positions (for positive counting, disengaged, or for negative counting, respectively), by a suitable detent 1045 pivotally mounted on the center supporting plate. The detent arm 1045 is pulled clockwise by a suitable spring 1048, thereby holding the lever in any adjusted position. The fourth or clearing position of the lever used in connection with the clearing of the counter has no notch 1046 in the detent arm, as it is desirable that for a clearing operation the lever set the control mechanism but be permitted to return to one of the three operative positions so that all of the mechanisms can be returned automatically to normal position.

It is obvious that as both the three-armed lever 1040 and the bellcrank 1044 are rigidly secured to the shaft 1041 that the two will rotate in unison. The mechanism controlled by these two bellcranks is identical so that for purposes of simplification only one reference character for similar parts will be used, it being understood that there are duplicate parts (one associated with each of the above-mentioned levers).

The counter control mechanism, operated by the lever 1040 will be explained particularly with reference to Fig. 31, which is an enlarged view of the clearing mechanism mounted on the right-hand side of the center supporting plate. A link 1050 connects the upper arm 1043 of the levers 1040 and 1044 with a second bellcrank 1051 mounted at the rear of the supporting plates. The bellcrank 1051 is mounted on the supporting plate by any suitable means, such as stud 1052, and has a forwardly extending arm 1053 which is in a substantially horizontal poistion in the neutral or disengaged position of the counter control lever. A short link 1054 is pivotally suspended from the forward end of the arm 1053. The link 1054 supports an actuating link 1055, to which it is rotatably connected. The rear end of the actuating link 1055 is pivotally mounted on the upper arm of a bellcrank cam follower 1056 which is pivotally mounted on the supporting plate by a suitable means, such as screw 1057. The bellcrank 1056 is pulled (counter-clockwise in Fig. 31) by a suitable spring 1058 into engagement with a cam 1059 keyed to the drive shaft 726. Thus, at the proper time in each cycle of operation, the cam 1059 rocks the bellcrank 1056 clockwise against the tension of its spring 1058, pulling the actuating link 1055 to the rear of the machine (right in Fig. 31). The forward end of the actuating link 1055 carries a pin 1060 adapted to cooperate with a counter direction setting lever 1065. It will be obvious that the pin 1060 will be in raised position if the counter control lever is set to the upper or positive counting position and will be lowered, from the position shown in Fig. 31 when the counter control lever 1040 is pulled to a forward or lower position.

The counter register is an exact duplicate of the accumulator and grand totalizer registers heretofore described. The only difference between the mechanism of the counter register and that of the accumulator or grand totalizer lies in the means for causing the engagement of the plus gear 751 or minus gear 752 with the drive gear 750. Instead of a slide such as 578 or 593 we prefer to utilize a setting lever 1065. The lever 1065 is pivotally mounted on the adjacent supporting plate by any suitable means such as a stud, not shown, which is axially aligned with the pin 1060 when the setting mechanism is in the neutral, or disengaged, position. The forward arm of the lever 1065 is provided with an arcuate slot 1066, drawn with the axis of the lever as the center point. Either end of the slot 1066 is provided with a depression 1067. The shafts for the plus and minus gears of the counter are embraced in the slot: when the lever is in its neutral or disengaged position, the two shafts being supported on the high portion of the slot to prevent engagement of either the plus or minus gears with the drive gear 750. However, as the arm 1065 is rocked in either direction, the plus or the minus gear shaft will fall into the slot 1067 to permit engagement of one or the other of the plus-minus gears with the drive gear, as was explained in connection with the accumulator register heretofore. Normally the lever 1065 is pulled to its neutral position by a pair of opposed springs 1068 and 1069 which are tensioned between a stud 1070 on the arm and suitable pins or studs on the supporting plate, as shown. The other arm of the lever 1065, extending toward the rear of the machine, is bent back upon itself and is provided with a generally T-shaped outer end as shown at 1071. A slot 1072 is provided in the T-shaped end 1071 so positioned that when the link 1055 is in its neutral or disengaged position the pin 1069 will enter the slot 1072 and movement of link 1055 can effect no operation of the lever 1065. However, if the link 1055 is either raised or lowered, the pin 1069 will engage the edge of the bent over arm 1071, on one side or the other of the axis of rotation of the lever 1065. Thus, subsequent operation of the actuator link 1055, by means of the cam 1059 and bellcrank cam follower 1056, will rock the lever 1065 either in one direction or the other to permit the plus or minus gear to become engaged with the drive gear 750.

The nose of the cam 1059 is so located on shaft 726 that the bellcrank 1056 and link 1055 are not rocked until after the slides 740 have completed their forward movement. Immediately after the digitation cams 730 have reached the period of dwell, the cam 1059 rocks the bellcrank 1056 which in turn rocks the setting lever 1065 to permit either the plus or the minus gear to become engaged with the drive gear 750. At this instant the negative tens-carry lever 821b of the counter register is tripped so that the rack 744 associated with the counter register is released for movement of one additional tooth, thereby entering a value of "1" in the stepped cam associated with this register. In normal operation the carry lever of the units order of the register is the only one actuated, except for transfers between orders of the register.

The mechanism for tripping the tens-carry lever 821b is shown particularly in Figs. 24, 30 and 30A. A cam 1080 is rigidly secured to the drive shaft 726, as shown in Fig. 30. Associated with the cam 1080 is a two-armed cam follower 1081 pivotally mounted on the central supporting plate by any suitable means, such as stud 1082. On the free end of the follower 1081 is an extensible link formed by two short links 1083 and 1084 connected to each other by suitable pin-and-slot connections 1085 pulled into a retracted position by a suitable spring, such as tension spring 1086. The upper end of the extensible link is pivotally mounted on an arm 1087 which is non-rotatably mounted on a square shaft 1088 (Fig. 30A). By this means the square shaft 1088 is rocked during each digitation cycle, immediately following the rocking of the bellcrank 1056 and actuating link 1055 previously described.

An arm 1089 (Fig. 24) is non-rotatably, but slidably mounted on shaft 1088. An arm 1090 is rotatably mounted on the hub of the non-rotatable arm 1089 (as shown in Fig. 34). The two arms are urged toward the right of the machine by a suitable compression spring 1091 which surrounds the square shaft 1088. Thus, the arm 1089 is normally pushed to the right-hand, or units, order of the register and is given a rocking movement (clockwise in Fig. 24) at each cycling of the machine. The end of the arm 1089 engages a negative tens-carry arm 821b mounted immediately to the right of the units order, thereby tripping the tens-carry in the units order. Thus, with each cycle of the machine the value of "1" is entered in the units order of the counter.

In most operations it is desired to leave the counter in the units order regardless of the number of digits in the values being added or subtracted in the machine. However, in operations like multiplication, it is necessary for the counter to shift ordinally. It is of course desirable that the counter not shift until a multiplicand value has been inserted in the carriage. Our invention therefore proposes means for selectively shifting the counter actuator in step with the carriage, so as to give true counts in multiplication and such operations. A rack 1100 is mounted on the bottom of the carriage (see Fig. 24). A gear 1101 mounted on flexible shaft 1102 engages the rack 1100 and is therefore rotated with movement of the carriage from one position to another. The flexible shaft 1102 is suitably journaled in the machine as by brackets 1103 at the bottom and 1106 adjacent the upper edge of the machine. A gear 1107 is pinned or otherwise rigidly secured to the upper end of the shaft. Associated with the gear 1107 is a sliding bar 1108, the rear edge of which is provided with teeth 1109 meshing with the gear 1107 (Fig. 34). The forward edge of the bar 1108 is provided with slots 1110 ordinally spaced thereon. The bar 1108 is slidably mounted in the machine as by studs 1111 riveted to the bar which are engaged in a slot 1112 of a supporting bar 1113. In this manner the bar 1108 constantly shifts with the carriage, and in the same direction as the carriage.

Means are provided for selectively rocking the rotatable arm 1090 into or out of engagement with the slots 1110 of bar 1108. This arm is normally rocked (counter-clockwise in Fig. 24) by any suitable means such as spring 1092. It can be rocked clockwise, however, to engage the outer end thereof in the slots 1110 of the bar 1108. When the arm 1090 has been rocked clockwise to engage the slots in bar 1108 the two arms 1089 and 1090 will be shifted with movement of the carriage, thus permitting actuation in the various orders of the register.

The means for rocking the register 1090 is shown in Figs. 24 and 34 and comprises a gate 1120 pivotally mounted on the left-hand and center supporting plates by any suitable means such as studs 1121. The gate 1120 has a rearwardly extending arm 1122 integral therewith, to which is pinned a link 1123. The link 1123 in turn is pivotally mounted on one arm of a bellcrank 1124 which is rockably mounted on the center supporting plate by any suitable means such as pin 1125. The other arm of the bellcrank 1124 is pivotally connected to the link 1026 previously described, which is rocked upwardly by the movement of the repeat lever from its disabled to its enabled position. Thus, rocking of the repeat lever to its forward, or operative, position rocks the gate 1120 (counter-clockwise in Fig. 24) to depress the arm 1090, thus locking the actuating arm 1189 to the shifting bar 1108. By this means the counter actuator is shifted ordinally with the movement of the carriage.

This shifting mechanism is used particularly in multiplication operations in which the multiplicand is inserted in the keyboard of the machine. This sets the multiplicand in the selection segments of the carriage. The repeat lever is then pulled forward and the plus key depressed to register the amount on the carriage in the accumulator or grand total registers, or both. The plus key is depressed a number of times corresponding to the value of the units order of the multiplier. Then a zero is inserted in the keyboard which adds a value to the carriage and shifts the carriage one step to the left. Simultaneously, the counter actuator, which had been locked to the shifting bar 1108 with the movement of the repeat key, is also shifted one space to the left. Then the plus key is depressed a number of times corresponding to the value of the tens order of the multiplier. Such operation continues until the entire multiplier value has been inserted. In this fashion the multiplier value is recorded in the counter register, as the counter actuator arm 1089 shifts across the counter register with each ordinal shifting of the carriage.

The counter can be cleared at any time by pulling the counter control lever 1040 to its extreme forward position and then depressing the clear key, it being immaterial in what position the digitation control key 920 is located, as both registers are automatically latched from engagement with the actuators. The two levers 1040 and 1044 are provided with forwardly extending arms 1042 on which is provided an ear 1130 (see Fig. 32). When the levers 1040, 1044 are rocked to their extreme forward position, each ear 1130 engages the forward camming edge 1131 of a gate 1132. Gate 1132 is affixed to a shaft 1133 by any suitable means, such as pins shown. The shaft 1133 is journaled in suitable brackets 1134 and 1135 mounted on the supporting plate. The rearward edge of the gate 1132 is bent over to form an extended ear 1136, which, when the gate is rocked, drops below the plus-minus shafts 757 and 758, respectively, of the accumulator and grand totalizer. This ear latches the shafts in their elevated position, so that regardless of the movement of the setting slides the accumulator and register cannot become engaged with the slides 740. Normally the gate 1132 is rocked to disengaged position (clockwise in Fig. 33) by any suitable means such as spring 1137.

A latch member 1140 (see Fig. 32) is associated with the gate 1132, being slidably mounted on the supporting plate by any suitable means such as pin-and-slot connections 1141. The latch member is pulled downward (to the left in Fig. 32) by suitable means, such as spring 1142 tensioned between one of the pins of the pin-and-slot connection and a stud on the latch member. The latch is therefore normally pulled to the left, but is held elevated by a nose 1143 on the latch member which rests upon the edge of the gate 1132. However, when the gate 1132 is rocked (counter-clockwise in Fig. 33) by the momentary pulling of the counter-control lever 1040 to the extreme forward position, the latch member is allowed to move to the left behind it, thereby latching it in position to engage the shafts as above described. The latch member on its lower left-hand end is provided with a pin 1144 which is acted upon by the T-shaped restoring member 777 previously mentioned. Thus, at the end of the clearing cycle the translation of the T-shaped member to the right unlatches the gate 1132 and restores the mechanism to normal.

An arm 1150 is pinned to the shaft 1133 and to tens-carry latching comb 1151. Rocking of gate 1132 also shifts comb 1151 to lock the tens-carry of the counter register against actuation. Depression of the clear key then operates the clearing mechanism above described, the counter tens-carry being the only ones locked against operation. The mechanism just described then operates to clear the value out of the counter register.

It is impossible to simultaneously clear either of the registers and the counter, regardless of the position of the digitation control lever 920, as the operation of the counter clearing mechanism latches the gate 1132 in a position to block engagement of the plus and minus gears of the accumulator and grand totalizer from engagement with their respective drive gears. However, a value can be transferred from the counter to the carriage in the same manner as the value can be transferred from either of the accumulator or grand totalizer registers into the carriage. The operation is simply to momentarily rock the counter control lever to its extreme forward position and then operate the back transfer lever. This operates to clear the value from the counter and to insert that value into the carriage. It is, however, impossible to simultaneously transfer this value into either of the other registers as they have been blocked from engagement with the actuator slide 740 as previously described.

We claim:

1. A calculating machine comprising a frame, a displaceable carriage mounted within said frame, a plurality of settable value storing segments mounted in said carriage, value selecting means mounted in said frame and operative to position said value storing segments, detent means for holding said segments in adjusted position, means for shifting said carriage ordinally in conjunction with operation of the value selecting means, a plurality of register dials mounted in said frame, a selection plate for each of said register dials positionably mounted in said frame, means operative to cause said plates to be moved to a differential position determined by the value in the underlying value storing segment, a fulcrum member carried by each of said plates, a lever engaging each of said fulcrum members for cooperation therewith, a rockable bail common to one end of said levers, motor means for rocking said bail through a constant path, a registering slide associated with the free end of each lever for transferring a value from said value storing segment to its respective register dial, a rack slidably mounted on each slide for differential movement therewith, a spring means tending to move said rack to one extreme position, a latching means holding said rack in the other extreme position, a gear associated with each of said register dials deriving reversible differential rotation from said racks, a step cam associated with each of said gears, sensing means positionable to engage said cams and to position said dials differentially according to the position of said cams, means for disengaging said sensing means from said cam, a tens-carry tooth associated with said gears and so arranged as on passage through the 9–0 position to unlatch said rack of the next higher order, a plus key, a minus key, a control member positioned by said plus key and said minus key to cause operative engagement of said gear with said rack and disengagement of said sensing means from said step cams, to initiate operation of all the value selection plates which overlie a value storing segment, and to cause operation of said motor means, means also driven by said motor means to disengage said gears from said rack at the end of said rocking movement, to restore the selection plates to a normally inoperative position, and to return all unlatched racks to their latched position.

2. The apparatus of claim 1 comprising also means for returning said carriage to its home position, selectively operable means for initiating such carriage return substantially simultaneously with the restoration of said selection plates, and means operatively initiated by movement of the carriage to its home position to restore said value storing segments to their inoperative position.

3. In a calculating machine, the combination of a longitudinally displaceable rack, a gear adapted to derive rotation from said rack, a tens transfer mechanism associated with said gear, means for operatively connecting said gear to said rack during movement of said rack in one direction and for disconnecting the two during movement in the other direction, a lever one end of which is connected to said rack to move the same and the other end of which is operatively connected for rocking of said other end through a path of constant length, a positionable fulcrum member for said lever, resilient power means operative to move said fulcrum member to one extreme position, latching means operative to hold said fulcrum member in the other extreme position, a power means for rocking said lever and restoring said fulcrum member to its latched position, a value storage mechanism ordinarilly shiftable adjacent said positionable fulcrum member and carrying a plurality of differentially settable elements each of which is adapted to block the superposed fulcrum member after a movement of such member corresponding to a differential setting of said element, a value selection mechanism operable to differentially position said settable elements, means for shifting said storage mechanism upon the entry of an ordinal value thereinto, means operative with the ordinal shifting of said storage mechanism for retaining said settable elements in an adjusted position, a second resilient power means operative to return said value storage mechanism to its home position, means operable to release said latching means to permit movement of said fulcrum member, a sign character control means normally operative to control said latch releasing means, to selectively engage said gear with said rack for positive or negative rotation, and to initiate rocking of said lever, a clear key, means operated by said clear key for enabling operation of said second resilient power means to return the value storage mechanism to its home position, means for restoring said settable elements to their home position operated as an incident of the return of the value storage mechanism to its home position, adjustable means for locking the tens transfer mechanism against negative carry from the 0 to 9 position, means controlled by said clear key for adjusting said sign character control means to effect a negative rotation of said gear, to effectively adjust said locking means, and to disable the operation of said latch releasing means by said sign character control means, and selective means effective with the operation of said clear key to release said latching means intermediate the rocking movement of said lever when the movement of said fulcrum member is operable to displace said rack and rotate said gear until stopped by said adjustable locking means.

4. A calculating machine comprising a ten key value-entering keyboard, an ordinally shiftable carriage having a plurality of value storing elements mounted therein, means operated by the keys of said keyboard to differentially position the value storing elements of said carriage and to ordinally shift said carriage into an operative position, a plurality of ordinally arranged displaceable members mounted adjacent the operative position of said carriage, a plurality of registers containing ordinally arranged dials, an accumulating gear for each dial of each register adapted to derive differential rotation from the displaceable members of like order, means for angularly positioning the register dials according to the angularly displaced rotation of their respective gears, a tens-transfer mechanism associated with each of said gears, a lever for each of said displaceable members having one end connected thereto, means for rocking said levers, a positionable fulcrum member operative with each such lever for determining the differential movement of each displaceable member, means for positioning each said fulcrum member to correspond with the differential position of the ordinally adjacent value storing element, selective means for enabling operation of said positioning means relative to the rocking of said rocking means, means associated with said gears to connect same reversibly with said displaceable members, digitation control means selectively operable to adjust said associated means of a selected register, to effect operation of said positioning means by said selective means, to initiate operation of said rocking means and thereafter cause a disengagement of said gears from said displaceable members, to restore the fulcrum members to their inoperative position, and effect a return of the carriage to its inoperative position, a register clearing control means operative to lock the tens-transfer mechanism associated with one selected register against a carry from the 0 to 9 position, to adjust said associated means for a negative rotation of the accumulator gears of the same register, to condition said selective means for control in timed relation to the rocking of said rocking means, and to initiate operation of said rocking means, and control means operative with said clearing means to adjust the said associated means for engaging said gears of a second selected register with said displaceable members whereby the negative rotation of the gears for the one register effects the transfer of a value from the one register to the second register.

5. A calculating machine comprising a frame, a motor means, a displaceable carriage mounted within said frame, a plurality of settable value storing segments mounted in said carriage, value selecting means mounted in said frame and operative to differentially set said value storing segments, detent means for holding said segments in adjusted position, means for shifting said carriage ordinally in conjunction with operation of the value selecting means, a plurality of register dials mounted in said frame, a plurality of selection plates for differentially controlling a registration in each of said register dials positionably mounted in said frame for ordinal adjacency with said storing segments upon shifting of said carriage, means operative to position said plates differentially corresponding to the value of the ordinally adjacent value storing segment, a fulcrum member carried by each of said plates, a lever engaging each of said fulcrum members, a power driven rockable bail common to one end of said levers, a registering slide associated with the free end of each lever, a gear deriving selective reversible differential rotation from each said slide upon engagement therewith, means for positioning said dials differentially from said gears, a plus key, a minus key, a control member positioned by said plus key and said minus key to operatively connect said gears to said slides, to cause operation of all the value selection plates which are ordinally adjacent a value storing segment and to enable said motor means to operate said bail, and means also driven by said motor means to disconnect said gears from said slides at the end of said rocking movement in one direction, and to restore the selection plates to their inoperative position.

6. A calculating machine comprising a frame, a power means, a diplaceable carriage mounted within said frame, a plurality of settable value storing segments mounted in said carriage, value selecting means mounted in said frame and operative to differentially position said value storing segments, detent means for holding said segments in adjusted position, means for ordinally shifting said carriage to an operative position in conjunction with operation of the value selecting means, a plurality of registers containing dials mounted in said frame, a selection plate for each order of said registers positionably mounted in said frame ordinally adjacent the value storing segments in the operative position of said carriage for cooperation therewith, means operative to position said plates differentially corresponding to the value of the ordinally adjacent value storing segment, a fulcrum member carried by each of said plates, a lever engaging each of said fulcrum members, a power driven rockable bail common to one end of said levers, a registering member associated with the free end of each lever for a differential movement thereby determined by the position of said fulcrum member, a gear for each register deriving selective reversible differential rotation from the ordinally respective member, means for positioning the dials of said registers differentially from their respective gears, selectively operated means for determining whether the gears related to a particular register shall be additively or subtractively connected to or disconnected from said members, digitation control means operative to connect said gears to said registering members and to cause cooperation of all the value selection plates which are ordinally adjacent a value storing segment with said segment, and to enable said power means for said bail, means also driven by said power means to disconnect said gears from said members at the end of said rocking movement in one direction and to restore the selection plates to their inoperative position.

7. A calculating machine comprising a frame, a displaceable carriage mounted within said frame, a plurality of settable value storing segments mounted in said carriage, value selecting means mounted in said frame and operative to differentially position said value storing segments, detent means for holding said segments in adjusted position, means for ordinally shifting said carriage to an operative position in conjunction with operation of the value selecting means, a register having a plurality of ordinal register dials mounted in said frame, a selection plate for each order of said register positionably mounted in said frame for cooperation with said storing segments in the operative position of said carriage, means operative to position said plates differentially corresponding to the value of the ordinally adjacent value storing segments, a fulcrum member carried by each of said plates, a lever for each of said fulcrum members, a power driven rockable bail common to one end of said levers, a registering slide associated with the free end of each lever for movement therewith, a gear deriving selective reversible differential rotation from the ordinally respective slide, means for positioning said dials differentially from their respective gears, selectively operated means for determining the direction of rotation of said gears with respect to said slides for positive or negative registration, digitation control means operative to adjust said selectively operated means, to effect the operation of said positioning means for those plates which are ordinally adjacent a value storing segment and to initiate operation of said bail, means operative to disconnect said gears from said slides at the end of said rocking movement in one direction and to restore the selection plates to their inoperative position, a clearing mechanism for said register operative to lock said gears against rotation beyond the 0 position, to disable the control of said plate positioning means by said digitation control means, and to adjust said digitation control means to effect a negative rotation of said gears, and means operative to enable said plate positioning means when the said levers are rocked to an extreme position by said bail thereby moving the free end of the said levers and their associated slides for rotation of the correlated gears until stopped by the locking means.

8. A calculating machine comprising a frame, a displaceable carriage mounted within said frame, a plurality of value storing segments rotatably mounted within said carriage, power means operative to rotate said value storing segments to a value entering position, latching means normally holding said value storing segments in a blank position, detent means for holding said segments in adjusted position, value selecting arms rockably mounted in said frame and operative to unlatch said latching means and to stop movement of said value storing segments in a position corresponding to the value to be entered, a spring-pressed actuating arm for each selection arm operative to move said selection arm to operative position, a latch for holding said actuating arm in inoperative position, a ten-key keyboard mounted in said frame, means operated by each of said keys for unlatching the corresponding actuating arm, a register mounted in said frame, a selection plate for each order of said register slidably mounted in said frame and adapted to cooperate with an ordinally adjacent value storing segment to stop movement of said plates in a position corresponding to the value stored in the underlying value storing segments, spring means urging said plates to an extreme value entering position, latching means normally holding said plates in the other extreme position, means carried by said carriage for conditioning said last-mentioned latching means for disengagement, a fulcrum member carried by each of said plates, a lever engaging said fulcrum member, a rockable bail common to one end of said levers, motor means for operating said bail through a constant path, a plurality of registering slides one of which is associated with the free end of each lever and each of which is slidably mounted in said frame adjacent the operative position of said carriage, a rack slidably mounted on each slide, a spring means tending to move said racks to one extreme position, a latching means holding said racks in the other extreme position, a gear in constant engagement with each said rack, a pair of gears associated with said first gear, means for positioning either or neither of said pair of gears into engagement with said first gear, a step cam associated with one of said pair of gears, a register dial for each order of said register, sensing means positionable to engage said cam and to position said dial differentially according to the position of said cam, means for disengaging said sensing means from said cam, a carry tooth mounted on one of said gears and so arranged as on passage through the 0-9 position to unlatch said rack of the next higher order, digitation control means operative to connect a selected one of said pairs of gears with said first-mentioned gears, to operate the means for disengaging the sensing means from said step cams, to unlatch all of the value selection plates ordinally adjacent to a value storing segment in which a value has been entered, and to connect said motor means to its source of power, means driven by said motor to disengage said pairs of gears from said first-mentioned gears at the end of said rocking movement in one direction, to restore the selection plates to latched position, to return all unlatched racks to their latched position.

9. The apparatus of claim 8 comprising also means for returning said carriage to its original position, power means for returning said value storing segments to their blank position, and manually operable control means for selectively initiating such carriage return substantially simultaneously with the disengagement of said gears.

10. A calculating machine comprising a frame, a displaceable carriage mounted within said frame, a plurality of value storing segments rotatably mounted within said carriage, power means operative to rotate said value storing segments to a value entering position, latching means normally holding said value storing segments in a blank position, a detent for holding said segments in adjusted position, value selecting arms rockably mounted in said frame and operative to unlatch said latching means and to stop movement of said value storing segments in a position corresponding to the value to be entered, a power operated actuating arm for each selection arm operative to move said selection arm to operative position, a ten-key keyboard mounted in said frame, means operated by each of said keys for operating the corresponding actuating arm, means for ordinally shifting said carriage to an operative position from operation of said actuating arms, a register mounted in said frame, a selection plate for each order of said register slidably mounted in said frame and adapted to cooperate with an underlying value storing segment to stop movement of said plates in a position corresponding to the value stored in the underlying value storing segments, spring means urging said plates to an extreme value entering position, latching means normally holding said plates in the other extreme position, means carried by said carriage for conditioning said last-mentioned latching means for disengagement, a fulcrum member carried by each of said plates, a lever engaging each of said fulcrum members, a rockable bail common to one end of said levers, a crank for operating said bail through a constant path, motor means for driving said crank, a motor switch controlling flow of power to said motor, a plurality of registering slides one of which is associated with the free end of each lever and each of which is slidably mounted in said frame adjacent the operative position of said carriage, a rack slidably mounted on each slide, a spring means tending to move each rack to one extreme position, a latching means holding said rack in the other extreme position, a gear in constant engagement with each rack, a pair of gears associated with said first gear, means for positioning either or neither of said pair of gears into engagement with said first gear, a step cam associated with one of said pair of gears, a register dial for each order of said register, sensing means positionable to engage said cams and to position said dials differentially according to the position of said cams, means for disengaging said sensing means from said cam, a carry tooth mounted on one of said pair of gears and so arranged as on passage through the 0-9 position to unlatch said rack of the next higher order, digitation control means operative to selectively position said means for positioning said pair of gears, to disengage the sensing means from said step cams, to unlatch all of the value selection plates adjacent to a value storing segment lying in the operative position of said carriage, and to close the switch to said motor to rock said crank, means driven by said motor to disengage said pair of gears from said first-mentioned gear at the end of said rocking movement in one direction, to restore the selection plates to latched position, and to return all unlatched racks to their latched position, a register clearing mechanism operative to disengage the digitation control means from the selection plate unlatching means, to position a stop member operative to prevent rotation of said minus gear from the 0 to the 9 position, to subsequently move the digitation control means to effect engagement of said pairs of gears with said first mentioned gears in a manner to cause subtractive operation of said pairs of gears and to disengage the selection plate latches at the end of the first rocking movement of said crank and prior to its return to normal position, and means for selectively positioning said value storing segments in accordance with the position of said slides.

11. A calculating machine comprising a frame, a displaceable carriage mounted within said frame, a plurality of value storing segments rotatably mounted within said carriage, spring means operative to rotate said value storing segments to a value entering position, latching means normally holding said value storing segments in a blank position, a detent for holding said segments in adjusted position, value selecting arms rockably mounted in said frame and operative to unlatch said latching means and to stop movement of said value storing segments in a position corresponding to the value to be entered, a spring-pressed actuating arm for each selection arm operative to move said selection arm to operative position, a latch for holding said actuating arm in inoperative position, a ten-key keyboard mounted in said frame, means operated by said keys for unlatching the corresponding actuating arm, means for ordinally shifting said carriage initiated by operation of said actuating arms, a power operated restoring means for said actuating arms, a detent for holding said carriage in adjusted position, power means for returning said carriage to its inoperative position, a restoring bail for said value storing segments operative only in the space occupied by said carriage while in its normally inoperative position, an electrical power means for operating said restoring bail, a switch controlling the flow of power to said electrical means, means operated by said electrical means for opening said switch, a tabulating element for each order of the carriage selectively positioned by the value selecting arms, a tabulating stop member, a multiple zero key, means controlled by the multiple zero key for setting the tabulating stop member into its operative position, for enabling the value selecting arms to effect an entry of zero, and for connecting the zero key operated release means to the actuating arm restoring means for the successive entry of zero into said value storing segments, a register mounted in said frame, a selection plate for each order of said register slidably mounted in said frame and adapted to cooperate with an underlying value storing segment to stop movement of said plates in a position corresponding to the value stored in said value storing segments, spring means urging said plates to an extreme value entering position, latching means normally holding said plates in the other extreme position, means carried by said carriage for conditioning said last-mentioned latching means for disengagement, a fulcrum member carried by each of said plates, a lever engaging said fulcrum member, a rockable bail common to one end of said levers, a crank for operating said bail through a constant path, power means including a motor and motor switch for driving said crank, a plurality of ordinal registering slides each of which is associated with the free end of each lever for movement by said bail and each of which is slidably mounted in said frame, a rack slidably mounted on each slide, a spring means tending to move each rack to one extreme position, a latching means holding said racks in the other extreme position, a gear in constant engagement with each rack for rotation thereby upon movement of said slides, a pair of plus-minus gears associated with said first gear, means for positioning either or neither of said plus-minus gears into engagement with said first gear, a step cam associated with one of said plus-minus gears, a register dial for each order of said register, sensing means positionable to engage said cam and to position said dial differentially according to the position of said cam, means for disengaging said sensing means from said cam, carry teeth associated with said plus-minus gears and so arranged as on passage of said gears through the 0–9 position to unlatch the said rack of the next higher order and cause a predetermined angular rotation of the associated gear in that order, a plus key, a minus key, a common slide positioned by said plus key and said minus key for controlling said positioning means, to disengage the sensing means from said step cams, to unlatch all of the value selection plates for differential movement determined by the respective underlying value storing segments in the adjusted position of the carriage, and to close the motor switch and thereby rock said crank for translation of said registering slides, means driven by said motor to disengage said pairs of gears from said first-mentioned gears at the end of said rocking movement, to restore the selection plates to latched position, to return all unlatched racks to their latched position, and to release said detent for holding said carriage in adjusted position, a manually operated control means for disabling said release of said detent, a clear key, a linkage operated by said clear key to disengage said detent from said carriage, means for holding said detent in disengaged position, means operated by the return of said carriage to its inoperative position to disengage said holding means, a linkage operated by the return of said carriage to its inoperative position to close said first-mentioned switch, a clear slide operated by said clear key to disengage the common slide from the selection plate unlatching means, a stop member operated with said clear slide to prevent rotation of said minus gear from the 0 to the 9 position, means for retaining said clear slide in its operative position, means operated by said clear key to subsequently move the common slide to adjust said positioning means for a negative registration in said dials, and means controlled by said clear slide upon movement of said common slide for disengaging the selection plate latches at the end of the first rocking movement of said crank and prior to its return to normal position, a second clear key for selective control of said first clear key operated linkage and in operative to control said clear slide, a correction key, a mechanism operated by said correction key to disengage said detent from the carriage but to maintain said holding means inoperative, a second detent means of said mechanism so constructed and arranged as to be positioned for engagement with said carriage upon release of said first detent permitting return of said carriage by said first power means a partial ordinal distance only, said mechanism operative upon release of said correction key to disengage said second detent from said carriage and to re-engage said first detent thereby effecting a full ordinal return shift of said carriage, and a link operatively associated with said second detent means for closing said first mentioned switch to restore the value storing segment in the ordinally returned inoperative position of the carriage prior to repositioning of such restored segment by one of said keys.

12. A calculating machine comprising a frame, a displaceable carriage mounted within said frame, a plurality of settable value storing segments mounted in said carriage, value selecting means mounted in said frame and operative to position said value storing segments, detent means for holding said segments in adjusted position, means for ordinally shifting said carriage to an operative position in conjunction with operation of the value selecting means, a register having a plurality of register dials mounted in said frame, a selection plate for each order of said register positionably mounted in said frame ordinally adjacent the cooperative position of said segments in said carriage, means operative to position said plates differentially corresponding to the value in the ordinally adjacent value storing segment, a fulcrum member carried by each of said plates, a lever engaging each of said fulcrum members, a power driven rockable bail common to one end of said levers, a registering slide associated with the free end of each lever, a gear deriving selective reversible differential rotation from each slide, means for positioning said dials differentially from said gears, selectively operated means for determining the direction of rotation of said gears with respect to said slides, digitation control means operative to adjust said selectively operated means, to enable said positioning means for said selection plates which are ordinally adjacent a value storing segment, to initiate operation of said bail, and disabling of said selectively operated means with respect to said slides at the end of said rocking movement in one direction, a counter register having a plurality of counter dials ordinally associated with said registering slides, a rack mounted on each of said slides and displaceable a predetermined extent relative to said slides, a latching means for retaining each said rack in its inoperative position, sign character control gears intermediate the dials of said counter register and said racks for selective engagement therewith subsequent to the rocking movement of said bail, a tens carry mechanism ordinally operative to release the said latching means in the adjacent order, a counter actuator normally operative in connection with the units order slide to operate the respective tens carry mechanism thereby effecting a displacement of the associated rack and causing an entry of one into the units order counter dial, and means for shifting said counter actuator ordinally with the shifting of said carriage.

13. A counter for a calculating machine comprising a plurality of gears arranged to form a plural order register, a tens-carry mechanism associated with each of said gears, a counter actuator normally operative in units order of said register and including means for operating the tens-carry mechanism into the associated order of said register, an ordinally selective shifting means for said actuator, and a control means for rendering said shifting means operable to position said actuator for a unit by unit entry into any selected order of said register.

14. In a calculating machine having a keyboard, a selection mechanism, a register, the combination of a longitudinally displaceable slide, an accumulating gear for said register deriving differential rotation from said slide, a lever having one end connected to said slide for moving same, power means for rocking the other end of said lever a constant arcual extent, a positionable power operated fulcrum member for said lever, a latch for restraining said fulcrum member in an inoperative position, a control key, and means operative by said control key to release said latch for differential positioning of said fulcrum member corresponding to the value set in said selection mechanism and to initiate said power means.

15. The apparatus of claim 14 comprising also a counter dial, a gear intermediate said counter dial and said displaceable slide, means for selectively engaging said gear with said displaceable slide subsequent to displacement of said slide, a tens-carry mechanism associated with said gear, means operatively associated with said slide for control by said tens-carry mechanism to effect a predetermined angular rotation of said gear, and means operative with said engaging means to operate the tens-carry mechanism thereby rendering operable said associated means.

16. In a calculating machine, the combination of a longitudinally displaceable rack slide, an accumulating gear deriving selective positive or negative differential rotation from said slide, a tens transfer mechanism rendered operative with the rotation of said gear from 9 to 0 or 0 to 9, means for locking the tens transfer mechanism against a tens-carry from the 0 to 9 position, a lever having one end connected to said slide to move the same, cyclic means for rocking the other end of said lever, a positionable fulcrum member for said lever, a differentially settable element for predetermining the position of said fulcrum member, a value selection mechanism operable to receive a value and adjust said settable element in accordance therewith, means for initiating operation of said cyclic means and the subsequent restoration of said fulcrum member to an inoperative position, a clear key, means operatively initiated by said clear key for restoring said settable element to its inoperative position, means controlled by said key for effecting operation of said locking means, rendering said accumulating gear operative to receive a negative rotation from said slide, and controlling said initiating means, and means operable during the cyclic operation of said rocking means to effect a movement of said fulcrum member thereby rendering said lever operative to displace said slide and rotate the accumulator gear until stopped by said locking means.

17. In an adding machine having a plurality of value storing segments rotatably mounted within said machine and shiftable ordinally as a unit with each value inserted therein, and means to rotate said segments corresponding to the value inserted therein; a register, a selection plate for each order of said register adapted to cooperate with an underlying value storing segment to stop movement of said plates in a position corresponding to the value stored in said value storing segments, spring means urging said plates to an extreme value entering position, latching means normally holding said plates in the other extreme position, means operative with the ordinal shift of said storing segments for conditioning said last-mentioned latching means for disengagement, a fulcrum member carried by each of said plates, a lever engaging said fulcrum member, motor means common to one end of said levers for rocking same, a plurality of ordinal registering slides one of which is associated with the free end of each lever and each of which is slidably mounted in said machine, a rack slidably mounted on each slide for longitudinal movement relative thereto equivalent to one unit space, a resilient means tending to move each rack to one extreme position, means for retaining said rack in the other extreme position for movement with said slide, a gear in constant engagement with said rack, a pair of gears for selective engagement with said first gear, means for positioning either or neither of said gears into engagement with said first gear, a step cam associated with one of said pair of gears, a register dial for each order of said register, means cooperative with said cam to position said dial differentially according to the position of said cam, means for disabling said cooperative means with respect to said cam, a carry tooth mounted on each of said pair of gears and so arranged on one as on passage through the 0-9 position to unlatch said rack, a plus key, a minus key, a common slide for movement by said plus key and said minus key to selectively control said positioning means, to render operative said disabling means, to release said latching means and enable said spring means to move all of the value selection plates overlying a value storing segment ordinally shifted from its original position, and initiate operation of said motor means, means driven by said motor means to disengage said second-mentioned gears from said first-mentioned gears at the end of said rocking movement, to restore the selection plates to latched position, and to return all unlatched racks to their latched position, a manually positioned clearing device operative to disable release of the selection plate latching means by said common slide, a stop member operated by said clearing device to prevent passage of said carry tooth from the 0 to the 9 position, means operated by said clearing device to subsequently move the common slide to control said positioning means for a negative registration, and means controlled by said clearing device to enable release of the selection plate latches at the end of the first rocking movement of said levers and prior to their return to normal position.

18. A calculating machine comprising an ordinally settable value selecting means, a register, a longitudinally displaceable selection plate for each order of said register adapted to cooperate with the ordinal value selecting means to stop movement of said plates in a position corresponding to the value to be entered, means for urging said plates to an extreme value entering position, latching means normally holding said plates in the other extreme position, means operative to condition said latching means for release only of said plates for cooperation with those orders of the value selecting means in which a value has been set, a fulcrum member carried by each of said plates, a lever engaging said fulcrum member, a rockable bail common to one end of said levers, motor means for operating said bail through a constant path, an actuating slide connected to the free end of each lever for differential movement thereby, a gear train for actuating said register from the differential movement of said slides, a plus key, a minus key, a plus-minus slide positioned by said plus key and said minus key to adjust said gear train for selective positive or negative operation of said register, to release the latching means for the value selection plates which have been conditioned for release by said conditioning means, and to energize said motor, means driven by said motor to disadjust said gear train at the end of the first rocking movement of said bail and prior to its return to normal position and to restore the selection plates to latched position, a clear key, a clear slide positioned by said clear key and operative to disable release of said latching means by said plus-minus slide, a latch for said clear slide, a stop member operated by said clear slide to prevent rotation of said gear train from the 0 to the 9 position, means controlled by said clear key to subsequently move the plus-minus slide in a negative direction, and means controlled by said motor upon energization by the movement of said plus-minus slide to release said latching means at the end of the first rocking movement of said bail and prior to its return to normal position.

19. A register for an adding machine comprising a selection plate for each order of said register, means operable to stop movement of said plates in a position corresponding to a preselected numerical value, spring means urging said plates to an extreme value entering position, latching means normally holding said plates in the other extreme position, a fulcrum member carried by each of said plates, a lever engaging said fulcrum member, motor means common to one end of said levers for rocking said levers, a plurality of registering slides one of which is associated with the free end of each lever and each of which is slidably mounted in said machine, a rack slidably mounted on each slide for longitudinal movement relative thereto equivalent to one unit space, a spring means tending to move each rack to one extreme position, a latching means holding said rack in the other extreme position, a gear in constant engagement with said rack, a pair of gears associated with said first gear, means for positioning either or neither of said gears into engagement with said first gear, a step cam associated with one of said gears, a register dial for each order of said register, sensing means positionable to engage said cam and to position said dial differentially according to the position of said cam, means for disengaging said sensing means from said cam, a carry tooth mounted on one of said gears and so arranged as on passage through the 0–9 position to unlatch the rack of the next higher order, a plus key, a minus key, a common slide positioned by said plus key and said minus key operable to cause engagement of one or the other of said second-mentioned gears with said first-mentioned gears, to disengage the sensing means from said step cams, to unlatch the value selection plates, and to control operation of said motor means, and means driven by said motor means to disengage said second-mentioned gears from said first-mentioned gears at the end of said rocking movement, to restore the selection plates to latched position, and to return all unlatched racks to their latched position.

20. A calculating machine comprising a settable value selecting means, a register, a longitudinally displaceable selection plate for each order of said register adapted to cooperate with an underlying value selecting means to stop movement of said plate in a position corresponding to the value to be entered, spring means urging said plates to an extreme value entering position, latching means normally holding said plates in the other extreme position, means operative in the orders in which the value selecting means is operated for conditioning said last-mentioned latching means for disengagement, a fulcrum member carried by each of said plates, a lever engaging said fulcrum member, a rockable bail common to one end of said levers, motor means for operating said bail through a constant path, an actuating slide connected to the free end of each lever, a gear train arcuately adjustable for actuating said register from movement of said slides, a sign character control means for adjusting said gear train and initiating said motor means, a control member, and means operated by said control member to lock said gear train against rotation through the 0 to 9 position and enable disengagement of the conditioned latching means by said motor means, and to operate said sign character control means for rotating said gears in the negative direction until stopped by said locking means.

21. A calculating machine comprising a register containing ordinally arranged accumulator gears, an ordinal complement of reciprocable slides having rack teeth thereon engageable with said gears, a lever associated with each of said slides for the control thereof, means for rocking one end of said levers a constant arcual extent, a positionable fulcrum member for each lever operable to determine the extent of movement of said slides with the rocking of said levers, a value entering mechanism for determining differential positioning of said fulcrum members, and digitation control means operative to position said fulcrum members relative to said value entering mechanism, to initiate operation of said rocking means and to connect said gears to said slides in timed relation to the rocking of said levers when a machine operation is initiated.

22. A calculating machine comprising a frame, a displaceable carriage mounted within said frame, a plurality of settable value storing segments mounted in said carriage, value selecting means mounted in said frame and operative to position said value storing segments, detent means for holding said segments in adjusted position, means for shifting said carriage ordinally in conjunction with operation of the value selecting means, a plurality of positionable fulcrum members mounted in said frame, adjacent the path of travel of said carriage, means operative to position said fulcrum members in a position determined by the position of the ordinally associated value storing segments, a lever engaging each of said fulcrum members, a power operated rocking means common to one end of said levers, a registering slide associated with the free end of each lever, a plurality of gears deriving reversible differential rotation from said slides, a plurality of register dials in said frame; and means operative to position said dials differentially according to the position of said gears.

23. A calculating machine comprising a frame, a displaceable carriage mounted within said frame, a plurality of settable value storing segments mounted in said carriage, value selecting means mounted in said frame and operative to position said value storing segments, detent means for holding said segments in adjusted position, means for shifting said carriage ordinally in conjunction with operation of the value selecting means, a plurality of positionable fulcrum members mounted in said frame adjacent the path of travel of said carriage, means operative to position said fulcrum members in a position determined by the position of the ordinally associated value storing segment, a lever engaging each of said fulcrum members, a power operated rocking means common to one end of said levers, a registering slide associated with the free end of each lever, a rack slidably mounted on each slide, a spring means tending to move said racks to one extreme position, a latching means holding said racks in the other extreme position, a gear deriving reversible differential rotation from each said rack, a carry tooth associated with said gears and so arranged as on passage through the 0-9 position to unlatch the rack of the next higher order, a plurality of register dials in said frame, and sensing means operable to position said dials according to the position of said gears.

24. In combination in one order of an accumulator register and a counter register of a calculating machine: a reciprocating member, means for imparting differential reciprocation to said member, a rack associated with each register mounted on said member for longitudinal movement relative thereto equivalent to one unit space, latching means normally holding said racks in one extreme position on said member, spring means adapted to move the racks to the other extreme position on said member, a gear in each register associated with the respective rack, means for connecting said gears to their respective racks, a tens-carry tooth on each gear, means operable by said tooth to release the latching means on the next higher order of the same register, and operational control means operative to cause engagement of the accumulator gear with its rack, differential reciprocation of said rack, disengagement of said accumulator gear from said rack, engagement of said counter gear with its associated rack, tripping of the latching means of one order of the counter tens-carry mechanism, and disengagement of said counter gear from its associated rack, and thereafter the restoring of said racks to their latched position and returning of said member to its original position.

References Cited in the file of this patent
UNITED STATES PATENTS

| Number | Name | Date |
|---|---|---|
| 923,269 | Johantgen | June 1, 1909 |
| 975,180 | Trinks | Nov. 8, 1910 |
| 1,028,135 | Rein | June 4, 1912 |
| 1,045,258 | Church | Nov. 26, 1912 |
| 1,527,407 | Harmsen | Feb. 24, 1925 |
| 1,568,800 | Coss | Jan. 5, 1926 |
| 2,177,817 | Anderson | Oct. 31, 1939 |
| 2,360,005 | Mehan | Oct. 10, 1944 |
| 2,427,271 | Friden | Sept. 9, 1947 |
| 2,459,862 | Avery | Jan. 25, 1949 |
| 2,557,457 | Nolde | June 19, 1951 |